(12) United States Patent
Gressel et al.

(10) Patent No.: US 6,748,410 B1
(45) Date of Patent: Jun. 8, 2004

(54) APPARATUS AND METHOD FOR MODULAR MULTIPLICATION AND EXPONENTIATION BASED ON MONTGOMERY MULTIPLICATION

(75) Inventors: Carmi David Gressel, Mobile Post Negev (IL); Isaac Hadad, Beer Sheva (IL); Itai Dror, Omer (IL); Alexey Molchanov, Beer Sheva (IL); Michael Mostovoy, Beer Sheva (IL)

(73) Assignee: M-Systems Flash Disk Pioneers, Ltd., Kfar Saba (IL)

( * ) Notice: Subject to any disclaimer, the term of this patent is extended or adjusted under 35 U.S.C. 154(b) by 0 days.

(21) Appl. No.: 09/480,102

(22) Filed: Jan. 10, 2000

Related U.S. Application Data

(63) Continuation-in-part of application No. 09/050,958, filed on Apr. 1, 1998.

(30) Foreign Application Priority Data

May 4, 1997 (IL) .................................. 120776
Jul. 14, 1997 (IL) .................................. 121311

(51) Int. Cl.[7] .............................................. G06F 7/38
(52) U.S. Cl. .................................................... 708/491
(58) Field of Search ................................. 708/491–492

(56) References Cited

U.S. PATENT DOCUMENTS

| | | |
|---|---|---|
| 3,621,218 A | 11/1971 | Nishimoto |
| 4,110,832 A | 8/1978 | Leininger et al. |
| 4,514,592 A | 4/1985 | Miyaguchi |
| 4,538,238 A | 8/1985 | Circello et al. |
| 4,587,627 A | 5/1986 | Omura et al. |
| 4,745,568 A | 5/1988 | Onyszchuk et al. |
| 4,908,038 A | 3/1990 | Matsumura et al. |
| 5,073,870 A | 12/1991 | Morita |
| 5,101,431 A | 3/1992 | Even |
| 5,185,714 A | 2/1993 | Nakayama |
| 5,206,824 A | 4/1993 | Arazi |
| 5,261,001 A | 11/1993 | Dariel et al. |
| 5,321,752 A | 6/1994 | Iwamura et al. |
| 5,349,551 A | 9/1994 | Petro |
| 5,448,639 A | 9/1995 | Arazi |
| 5,513,133 A | 4/1996 | Gressel et al. |
| 5,742,530 A | 4/1998 | Gressel et al. |
| 5,954,788 A | 9/1999 | Suh et al. |

FOREIGN PATENT DOCUMENTS

| | | |
|---|---|---|
| EP | 0566498 | 10/1993 |
| GB | 2332542 | 6/1999 |
| WO | WO 99/35782 | 7/1999 |
| WO | WO 99/63696 | 12/1999 |
| WO | WO 99/67909 | 12/1999 |
| WO | WO 99/67919 | 12/1999 |

OTHER PUBLICATIONS

D. Knuth, *The Art of Computer Programming, vol. 2: Seminumerical Algorithms*, Addison–Wesley, Reading, MA, 1981.

A.J. Menezes et al., *Handbook of Applied Cryptography*, CRC Press, Boca Raton, FL, 1997, Chapter 4, 4.49.

W. Diffie et al., "Privacy on the Line", MIT Press, Cambridge, MA, 1998, p. 27.

ANSI Standard x9.31–1997, p. 25.

ANSI Standard x9.30–2 Standard, May 31, 1994.

B. Arazi, "On Primality Testing Using Purely Divisionless Operations", Computer Journal, GB, Oxford University Press, Surrey vol. 37, No. 3, Jan. 1, 1994, pp. 219–222.

(List continued on next page.)

*Primary Examiner*—Tan V. Mai
(74) *Attorney, Agent, or Firm*—Merchant & Gould P.C.

(57) ABSTRACT

This invention discloses apparatus and methods for accelerating processing, loading and unloading of data, from and to a plurality of memory addresses in a CPU having an accumulator, and to a memory-mapped coprocessing device for continuous integer computations.

7 Claims, 27 Drawing Sheets

OTHER PUBLICATIONS

European Search Report, dated Jan. 28, 2000, which corresponds to Applicant's European Patent Application No. EP 98 91 0967.

P. Kocher et al., "Differential Power Analysis", Cryptography Research, Inc., San Francisco, CA, 1998, pp. 1–10, http://www.cryptography.com (web page).

P.L. Montgomery, "Modular Multiplication Without Trial Division", Mathematics of Computation, vol. 44, pp. 519–521.

S.R. Dusse and B.S. Kaliski Jr., "A Cryptographic Library for the Motorola DSP 56000", Proc Eurocrypt '90, Springer–Verlag, Berlin.

| ROUND | B | SA | SUBT | R=B-(N)*SUBT N=1001 | 2R+NewLS | B(n) | Borrow | Next Subt | Quotient SB | Quotient SA | New LS |
|---|---|---|---|---|---|---|---|---|---|---|---|
| 0 INIT | 1011 | 1101 | 0 | 1011 | - | 0 | 0 | 1 | 0000 | 1101 | 1 |
| 1 | 1011 | 0110 | 1 | 0010 | 00101 | 0 | 1 | 0 | 1000 | 0110 | 0 |
| 2 | 0101 | 0011 | 0 | 0101 | 01010 | 0 | 0 | 1 | 0100 | 0011 | 1 |
| 3 | 1010 | 0001 | 1 | 0001 | 00011 | 0 | 1 | 0 | 1010 | 0001 | 1 |
| 4 | 0011 | 0000 | 0 | 0011 | 00111 | 0 | 1 | 0 | 0101 | 0000 | 0 |
| 5 | 0111 | 1000 | 0 | 0111 | - | - | - | - | 0010 | 1000 | - |
| 6 | | | | | | | | | FINAL QUOTIENT 00010100 | | |

INITIAL CONDITION: DIVIDEND = 187₁₀ = 10111011 ₂
DIVISOR = 9₁₀ = 1001 ₂

QUOTIENT = 20₁₀ = 00010100 ₂
REMAINDER = 7₁₀ = 0111 ₂

Fig.4

| ROUND | B | SA | SUBT | R=B-(N)*SUBT N=101 | 2R+NewLS | B(n) | Borrow | Next Subt | Quotient SB | Quotient SA | New LS |
|---|---|---|---|---|---|---|---|---|---|---|---|
| 0 INIT | 1010 | 10<u>11</u> | 0 | 1010 | 1010 | 0 | 0 | 1 | | | |
| 1 | 1010 | 01<u>01</u> | 1 | 0000 | 00001 | 0 | 1 | 0 | 0000 | 10<u>11</u> | 1 |
| 2 | 0001 | 00<u>10</u> | 0 | 0001 | 00011 | 0 | 1 | 0 | 1<u>000</u> | 01<u>01</u> | 1 |
| 3 | 0011 | 000<u>1</u> | 0 | 0011 | 00110 | 0 | 1 | 0 | 01<u>00</u> | 00<u>10</u> | 0 |
| 4 | 0110 | 0000 | 0 | 0110 | 01101 | 0 | 0 | 1 | 001<u>0</u> | 000<u>1</u> | 1 |
| 5 | 1101 | 0000 | 1 | 0011 | 00110 | 0 | 1 | 0 | 0001 | 0000 | 0 |
| 6 | 0110 | 0000 | 0 | 0110 | | | | | 1000 | 1000 | 0 |
| 7 | 0011 SHIFT | | | | | | | | 0100 | 0100 | |
| | INITIAL CONDITION: DIVIDEND = $173_{10}$ = $10101101_2$ DIVISOR = $5_{10}$ = $101_2$ | | | | | | | | FINAL QUOTIENT 00100010 QUOTIENT = $34_{10}$ = $100010_2$ | | |

Fig.5

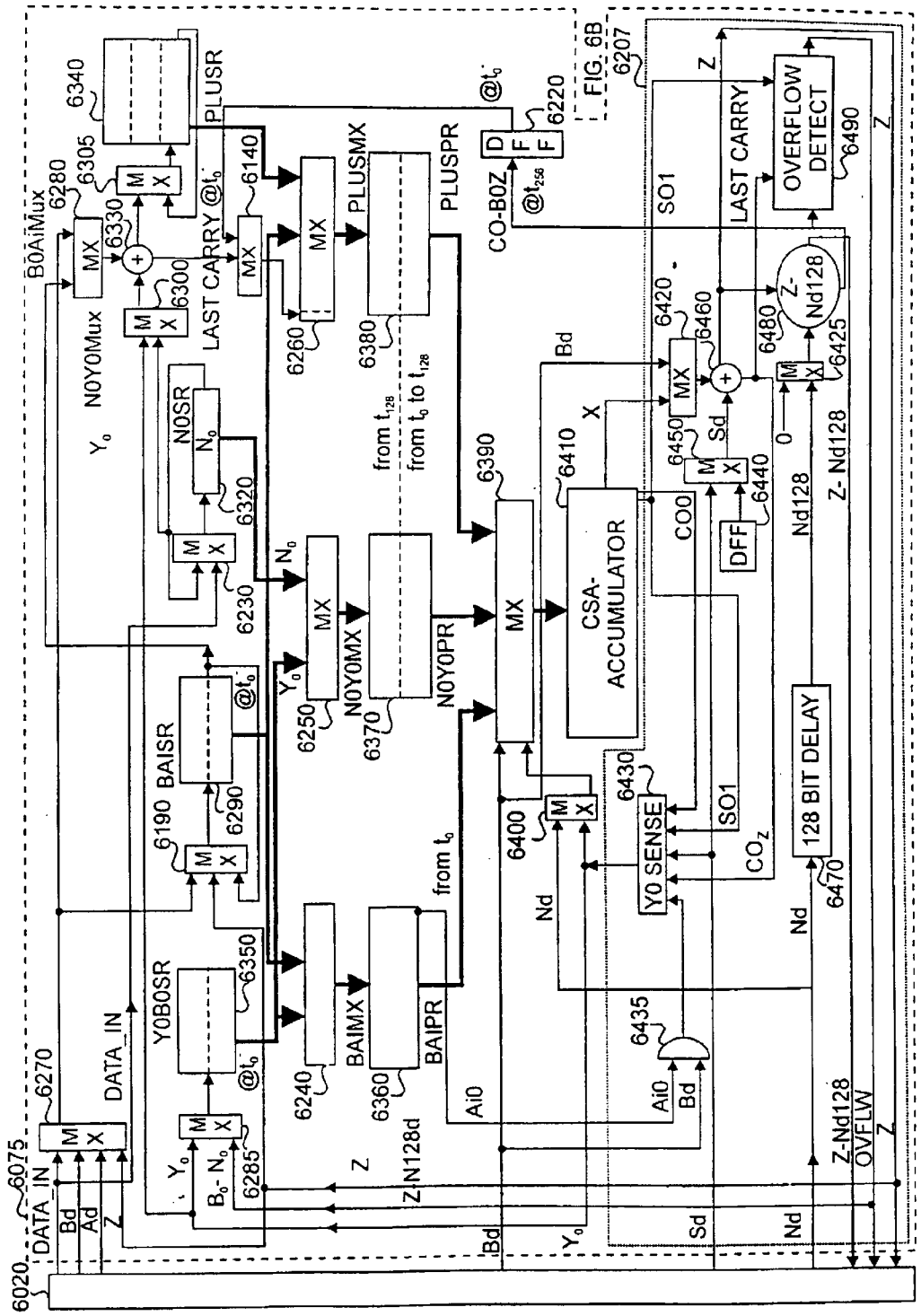

FIG. 11

| $S_0^*$ | $N_0$ | | $Borrow_1$ | $S_0=(S_0^*-N_0)$ | $Carry_2$ | $(S_0^*-N_0)+N_0$ | $Borrow_1=Carry_2$ | $S_0^*=S_0+N_0+Borrow_1$ |
|---|---|---|---|---|---|---|---|---|
| 0 | 0 | 0 | 0 | 0 | 0 | 0 | Yes | Yes |
| 0 | 0 | 1 | 1 | 1 | 1 | 0 | Yes | Yes |
| 0 | 1 | 0 | 1 | 1 | 1 | 0 | Yes | Yes |
| 0 | 1 | 1 | 1 | 0 | 1 | 0 | Yes | Yes |
| 0 | 0 | 0 | 0 | 0 | 0 | 1 | Yes | Yes |
| 0 | 0 | 1 | 1 | 1 | 0 | 1 | Yes | Yes |
| 0 | 1 | 0 | 1 | 1 | 1 | 1 | Yes | Yes |
| 0 | 1 | 1 | 0 | 0 | 0 | 0 | Yes | Yes |
| 1 | 0 | 0 | 0 | 1 | 0 | 0 | Yes | Yes |
| 1 | 0 | 1 | 0 | 1 | 1 | 0 | Yes | Yes |
| 1 | 1 | 0 | 0 | 0 | 0 | 1 | Yes | Yes |
| 1 | 1 | 1 | 0 | 1 | 0 | 1 | Yes | Yes |
| 1 | 0 | 0 | 0 | 1 | 0 | 1 | Yes | Yes |
| 1 | 0 | 1 | 0 | 0 | 0 | 1 | Yes | Yes |
| 1 | 1 | 1 | 0 | 0 | 0 | 1 | Yes | Yes |
| 1 | 1 | 1 | 0 | 0 | 0 | 1 | Yes | Yes |

APPARATUS AND METHOD FOR MODULAR MULTIPLICATION AND EXPONENTIATION BASED ON MONTGOMERY MULTIPLICATION

REFERENCE TO RELATED APPLICATIONS

This application is a continuation-in-part of assignee's pending application U.S. Ser. No. 09/050,958, filed on Apr. 1, 1998, and entitled "Apparatus & Method For Modular Multiplication & Exponentiation Based On Montgomery Multiplication."

FIELD OF THE INVENTION

The present invention relates to apparatus and methods for modular multiplication and exponentiation and for serial integer division, and to apparatus operative to accelerate and secure computer peripherals, especially coprocessors used for cryptographic computations.

BACKGROUND OF THE INVENTION

A compact microelectronic device for performing modular multiplication and exponentiation over large numbers is described in Applicant's U.S. Pat. No. 5,513,133, the disclosure of which is hereby incorporated by reference.

Security enhancements and performance accelerations for computational devices are described in Applicant's U.S. Pat. Nos. 5,742,530, 5,513,133, 5,448,639, 5,261,001; and 5,206,824 and published PCT patent application PCT/IL98/00148 (WO98/50851); and U.S. patent application Ser. No. 09/050958, Onyszchuk et al's U.S. Pat. No. 4,745,568; Omura et al's U.S. Pat. No. 4,587,627, the disclosures of which are hereby incorporated by reference.

The disclosures of all publications mentioned in the specification and of the publications cited therein are hereby incorporated by reference.

SUMMARY OF THE INVENTION

The present invention seeks to provide improved apparatus and methods for modular multiplication and exponentiation and for serial integer division, and for accelerating and securing modular arithmetic processors and accelerating memory transfers to computer peripheral that need simplified accelerated memory to peripheral data transfers with limited CPU core changes.

There is thus provided, in accordance with a preferred embodiment of the present invention, a modular multiplication and exponentiation system including a serial-parallel arithmetic logic unit (ALU) including a single multiplier including a single carry-save adder and preferably including a serial division device operative to receive a dividend of any bit length and a divisor of any bit length and to compute a quotient and a remainder.

Further in accordance with a preferred embodiment of the present invention, the system is operative to multiply at least one pair of integer inputs of any bit length.

Still further in accordance with a preferred embodiment of the present invention, the at least one pair of integer inputs includes two pairs of integer inputs.

Additionally in accordance with a preferred embodiment of the present invention, the ALU is operative to generate a product of integer inputs and to reduce the size of the product without previously computing a zero-forcing Montgomery constant, $J_0$.

Also provided, in accordance with another preferred embodiment of the present invention, is serial integer division apparatus including a serial division device operative to receive a dividend of any bit length and a divisor of any bit length and to compute a quotient and a remainder.

Further in accordance with a preferred embodiment of the present invention, the apparatus includes a pair of registers for storing a pair of integer inputs and which is operative to multiply a pair of integer inputs, at least one of which exceeds the bit length of its respective register, without interleaving.

Also provided, in accordance with yet another preferred embodiment of the present invention, is a modular multiplication and exponentiation system including a serial-parallel multiplying device having only one carry-save accumulator and being operative to perform a pair of multiplications and to sum results thereof.

Additionally provided, in accordance with still another preferred embodiment of the present invention, is a modular multiplication and exponentiation method including providing a serial-parallel arithmetic logic unit (ALU) including a single modular multiplying device having a single carry-save adder, and employing the serial-parallel ALU to perform modular multiplication and exponentiation.

Further provided, in accordance with yet another preferred embodiment of the present invention, is a method for natural (not modular) multiplication of large integers, the method including providing a serial-parallel arithmetic logic unit (ALU) including a single modular multiplying device having a single carry-save adder, and employing the serial-parallel ALU to perform natural (not modular) multiplication of large integers.

Further in accordance with a preferred embodiment of the present invention, the employing step includes multiplying a first integer of any bit length by a second integer of any bit length to obtain a first product, multiplying a third integer of any bit length by a fourth integer of any bit length to obtain a second product, and summing the first and second products with a fifth integer of any bit length to obtain a sum.

Still further in accordance with a preferred embodiment of the present invention, the employing step includes performing modular multiplication and exponentiation with a multiplicand, multiplier and modulus of any bit length.

Additionally in accordance with a preferred embodiment of the present invention, the system also includes a double multiplicand precomputing system for executing Montgomery modular multiplication with only one precomputed constant.

Further in accordance with yet another preferred embodiment of the present invention, is the employing step includes performing Montgomery multiplication including generating a product of integer inputs including a multiplier and a multiplicand, and executing modular reduction without previously computing a Montgomery constant $J_0$.

Further in accordance with a preferred embodiment of the present invention, the Montgomery constant $J_0$ includes a function of N mod $2^k$, where N is a modulus of the modular reduction and k is the bit-length of the multiplicand.

Still further in accordance with a preferred embodiment of the present invention, the employing step includes performing a sequence of interleaved Montgomery multiplication operations.

Additionally in accordance with a preferred embodiment of the present invention, each of the interleaved Montgomery multiplication operations is performed without previously computing the number of times the modulus must be summated into a congruence of the multiplication operation in order to force a result with at least k significant zeros.

Still further in accordance with a preferred embodiment of the present invention, the system also includes a data preprocessor operative to collect and serially summate multiplicands generated in an i'th interleaved Montgomery multiplication operation thereby to generate a sum and to feed in the sum to an (i+1)'th Montgomery multiplication operation.

Additionally in accordance with a preferred embodiment of the present invention, the function includes an additive inverse of a multiplicative inverse of N mod $2^k$.

Further in accordance with a preferred embodiment of the present invention, the method also comprises computing $J_0$ by resetting $A_i$ and B to zero and setting $S_0=1$.

The present invention also relates to a compact microelectronic arithmetic logic unit, ALU, for performing modular and normal (natural, non-negative field of integers) multiplication, division, addition, subtraction and exponentiation over very large integers. When referring to modular multiplication and squaring using Montgomery methods, reference is made to the specific parts of the device as a modular arithmetic coprocessor, and the acronym, MAP, is used. Reference is also made to the Montgomery multiplication methods as MM.

The present invention also relates to arithmetic processing of large integers. These large numbers can be in the natural field of (non-negative) integers or in the Galois field of prime numbers, GF(p), and also of composite prime moduli. More specifically, the invention relates to a device that can implement modular multiplications/exponentiations of large numbers, which is suitable for performing the operations essential to Public Key Cryptographic authentication and encryption protocols, which work over increasingly large operands and which cannot be executed efficiently with present generation modular arithmetic coprocessers, and cannot be executed securely with software implementations. The invention can be driven by any 4 bit or longer processor, achieving speeds which can surpass present day digital signal processors.

The present invention also relates to the hardware implementation of large operand integer arithmetic, especially as concerns the numerical manipulations in a derivative of a procedure known as the interleaved Montgomery multiprecision modular multiplication method often used in encryption software oriented systems, but also of intrinsic value in basic arithmetic operations on long operand integers; in particular, A·B+C·D+S, wherein there is no theoretical limit on the sizes of A, B, C, D, or S. In addition, the device is especially attuned to perform modular multiplication and exponentiation. The basic device is particularly suited to be a modular arithmetic co-processor (MAP), also including a device for performing division of very large integers, wherein the divisor can have a bit length as long as the modulus register N and the bit length of the dividend can be as large as the bit length of two concatenated registers.

This device preferably performs all of the functions of U.S. Pat. No. 5,513,133, with the same order of logic gates, in less than half the number of machine clock cycles. This is mostly because there is only one double action serial/parallel multiplier instead of two half size multipliers using the same carry save accumulator mechanism, the main component of a conventional serial parallel multiplier. The new arithmetic logic unit, ALU, or specifically the modular arithmetic coprocessor, MAP, preferably intrinsically obviates a separate multiplication process which would have preceded the new process. This process would also have required a second Montgomery constant, $J_0$, which is now also preferably obviated. Stated differently, instead of the two constants in the previous Montgomery procedures, and the delays encountered, only one constant is now computed, and the delay caused by the now superfluous J type multiplications (explained later) is preferably removed.

Further, by better control of the data manipulations, between the CPU and this peripheral device, operands which are performed on operands longer than the natural register size of the device, can preferably be performed at reduced processing times using less temporary storage memory.

Three related methods are known for performing modular multiplication with Montgomery's methodology. [P. L. Montgomery, "Modular multiplication without trial division", *Mathematics of Computation*, vol. 44, pp. 519–521, 1985], hereinafter referred to as "Montgomery", [S. R. Dussé and B. S. Kaliski Jr., "A cryptographic library for the Motorola DSP 56000", *Proc Eurocrypt '90*, Springer-Verlag, Berlin, 1990] hereinafter referred to as "Dussé" the method of U.S. Pat. No. 4,514,592 to Miyaguchi, and the method of U.S. Pat. No. 5,101,431, to Even, and the method of U.S. Pat. No. 5,321,752 to Iwamura, and the method of U.S. Pat. No. 5,448,639, to Arazi, and the method of U.S. Pat. No. 5,513,133 to Gressel.

The preferred architecture is of a machine that can be integrated to any microcontroller design, mapped into the host controller's memory; while working in parallel with the controller which for very long commands constantly swap or feed operands to and from the data feeding mechanism, allowing for modular arithmetic computations of any popular length where the size of the coprocessor volatile memory necessary for manipulations should rarely be more than three times the length of the largest operand.

This solution preferably uses only one multiplying device which inherently serves the function of two multiplying devices, in previous implementations. Using present popular technologies, it enables the integration of the complete solution including a microcontroller with memories onto a 4 by 4.5 by 0.2 mm microelectronic circuit.

The invention is also directed to the architecture of a digital device which is intended to be a peripheral to a conventional digital processor, with computational, logical and architectural novel features relative to the processes published by Montgomery and Dussé, as described in detail below.

A concurrent process and a unique hardware architecture are provided, to perform modular exponentiation without division preferably with the same number of operations as would be performed with a classic multiplication/division device, wherein a classic device would perform both a multiplication and a division on each operation. A particular feature of a preferred embodiment of the present invention is the concurrency of operations performed by the device to allow for unlimited operand lengths, with uninterrupted efficient use of resources, allowing for the basic large operand integer arithmetic functions.

The advantages realized by a preferred embodiment of this invention result from a synchronized sequence of serial processes, which are merged to simultaneously (in parallel) achieve three multiplication operations on n bit operands, using one multiplexed k bit serial/parallel multiplier in (n+k) effective clock cycles, accomplishing the equivalent of three multiplication computations, as prescribed by Montgomery.

By synchronizing and on the fly detecting and on the fly preloading and simultaneous addition of next to be used operands, the machine operates in a deterministic fashion, wherein all multiplications and exponentiations are executed in a predetermined number of clock cycles. Conditional branches are replaced with local detection and compensation devices, thereby providing a basis for the simple type control mechanism, which, when refined, typically include a series of self-exciting cascaded counters. The basic operations herein described can be executed in deterministic time using the device described in U.S. Pat. No. 5,513,133 as manufactured both by Motorola in East Kilbride, Scotland under the trade name SC-49, and by SGS-Thomson in Rousset, France, under the trade name ST16-CF54.

The machine has particularly lean demands on volatile memory for most operations, as operands are loaded into and stored in the device for the total length of the operation, however, the machine preferably exploits the CPU onto which it is appended, to execute simple loads and unloads, and sequencing of commands to the machine, whilst the machine performs its large number computations. The exponentiation processing time is virtually independent of the CPU which controls it. In practice, no architectural changes are necessary when appending the machine to any CPU. The hardware device is self-contained, and can be appended to any CPU bus.

Apparatus for accelerating the modular multiplication and exponentiation process is preferably provided, including means for precomputing the necessary constants.

The preferred embodiments of the invention described herein provide a modular mathematical operator for public key cryptographic applications on portable Smart Cards, typically identical in shape and size to the popular magnetic stripe credit and bank cards. Similar Smart Cards (as per U.S. Pat. No. 5,513,133) are being used in the new generation of public key cryptographic devices for controlling access to computers, databases, and critical installations; to regulate and secure data flow in commercial, military and domestic transactions; to decrypt scrambled pay television programs, etc. It should be appreciated that these devices are also incorporated in computer and fax terminals, door locks, vending machines, etc.

The hardware described carries out modular multiplication and exponentiation by applying the P operator in a novel way. Further, the squaring can be carried out in the same method, by applying it to a multiplicand and a multiplier that are equal. Modular exponentiation involves a succession of modular multiplications and squarings, and therefore is carried out by a method which comprises the repeated, suitably combined and oriented application of the aforesaid multiplication, squaring and exponentiation methods.

When describing the workings of a preferred embodiment of the ALU we describe synchronization in effective clock cycles, referring to those cycles when the unit is performing an arithmetic operation, as opposed to real clock cycles, which would include idle cycles whence the ALU may stand, and multiplexers, flipflops, and other device settings may be altered, in preparation for a new phase of operations.

In a preferred embodiment, a method for executing a Montgomery modular multiplication, (with reference to squaring and normal multiplication) wherein the multiplicand A (which may be stored either in the CPU's volatile RAM or in the $S_A$ register, 130, the multiplier B in the B register 1000, which is a concatenation of 70 and 80 and the modulus N in the N register, 1005, which is a concatenation of 200 and 210; comprise m characters of k bits each, the multiplicand and the multiplier generally not being greater than the modulus, comprises the steps of:

1)—loading the multiplier B and the modulus, N, into respective registers of n bit length, wherein n=m·k;
 {multiplying in normal field positive, natural, integers, N is a second multiplier}
 {if n is longer than the B, N and S registers, values are typically loaded and unloaded in and out of these registers during the course of an iteration, allowing the machine to be virtually capable of manipulating any length of modulus}
2)—setting the output of the register $S_B$ to zero, S*d Flush (250)=1 for the first iteration;
3)—resetting extraneous borrow and carry flags (controls, not specified in the patent),
4)—executing m iterations, each iteration comprising the following operations:

$(0 \leq i \leq m-1)$ a) transferring the next character $A_{i-1}$ of the multiplicand A from volatile storage to the Ai Load Buffer, 290.
b) simultaneously serially loading the Ci Load Buffer, 320, with $N_0$ (the LS k bits of N), while rotating the contents of the Ai Load Buffer, thereby serially adding the contents of the Ai load buffer with $N_0$ by means of the serial adder FA1, 330, thereby serially loading the Ai+Ci Load Buffer with the sum $N_0+A_{i-1}$.

The preloading phase ends here. This phase is typically executed whilst the MAP was performing a previous multiplication iteration. Processes a) and b) can be executed simultaneously, wherein the $A_{i-1}$ character is loaded into its respective register, whilst the Ai stream is synchronized with the rotation of the $N_0$ register, loading R2, 320. Simultaneously, the Ai stream and the $N_0$ stream are summated and loaded into the R3 register, 340.

Squaring a quantity from the B register, can be executed wherein at the initialization, Steps a) and b) the first k bits of Bd are inserted into R1, as the $B_0$ register is rotated, simultaneously with the $N_0$ register. Subsequent k bit $B_i$ strings are preloaded into the R1 register, as they are fed serially into the ALU.

c) the machine is stopped. Operands in buffers R1, R2, and R3 are latched into latches L1, 360; L2, 370; and L3, 380.
 The L0—"0" latch, is a pseudo latch, as this is simply a literal command signal entering each of the AND gates in the inputs or outputs of the 390, multiplexer.
d) for the next k effective clock cycles
 i) at each effective clock cycle the Y0 SENSE anticipates the next bit of $Y_0$ and loads this bit through M3 multiplexer, 300, into the Ci Load Buffer, while shifting out the Ai bits from the R1 register and simultaneously loading the Ci Load Buffer with k bits of $Y_0$ and adding the output of R1 with $Y_0$ and loading this value into the R3 Buffer,
 ii) simultaneously multiplying N0 (in L2, Ci Latch) by the incoming Y0 bit, and multiplying Ai by the next incoming bit of Bd, by means of logically choosing through the M_K multiplexer, 390, the desired value from one of the four latches, L0, L1, L2 or L3; thereby adding the two results. If neither the Y0 bit nor the B bit is one, an all zero value is multiplexed into the CSA, if only the Y0 bit is one, N0 alone is multiplexed/added into the CSA, if only the B bit is a one, the (i−1)th bit of A is added into the CSA, if both the B bit and the Y0 bit are ones, then the sum of the (i−1)th bit of A, and N0 is added into the CSA,
 iii) then adding to this summation; as it serially exits the Carry Save k+1 Bit Accumulator bit by bit, (the X stream); the next relevant bit of Sd in through the serial adder, FA2, 460, In MM these first k bits of the Z stream are zero. In this first phase the result of $Y_0 \cdot N_0 + A_{i-1} \cdot B_0 + S_0$ has been computed, the LS k all zero bits appeared on the Z*out stream, and the MS k+1 bits of the multiplying device are saved in the CSA Carry Save Accumulator; the R1, R2 and R3 preload buffers hold the values $A_{i-1}$, $Y_0$ and $Y_0 + A_{i-1}$, respectively.

e) at the last effective, (m+1)·k'th, clock cycle he machine is stopped, buffers R2, and R3 are latched into L2, and L3

The value of L1 is unchanged.

The initial and continuing conditions for the next k·(m−1) effective clock cycles are:

the multipliers are the bit streams from B, starting from the k'th bit of B and the remaining bit stream from N, also starting from the k'th bit of N;

and the multiplicands in L1, L2, and L3 are $A_{i-1}$, $Y_0$, and $Y_0 + A_{i-1}$, at the start the CS adder contains the value as described in d), and the S stream will feed in the next k·(m−1) bits into the FA2 full adder; during the next k·m effective clock cycles, Nd, delayed k clock cycles in unit 470, is subtracted in serial subtractor, 480, from the Z stream, to sense if $(Z/2^k \bmod 2^{k*m})$, the result which is to go into the B or S register, is larger than or equal to N. Regardless of what is sensed by the serial subtractor, 460, if at the {(m+1)·k}'th effective clock cycle, the $SO_1$ flip-flop of the CSA is a one, then the total result is certainly larger than N, and N will be subtracted from the result, as the result, partial or final, exits its register.

f) for the next k·(m−1) effective clock cycles:

the $N_0$ Register, 210, is rotated either synchronously with incoming $A_i$ bits, or at another suitable timing, loading R1, R2, and R3, as described in a) and b), for the next iteration, for these k·(m−1) effective clock cycles, the remaining MS bits of N now multiply $Y_0$, the remaining MS B bits continue multiplying $A_{i-1}$. If neither the N bit nor the B bit is one, an all zero value is multiplexed into the CSA. If only the N bit is one, $Y_0$ alone is multiplexed/added into the CSA. If only the B bit is a one, $A_{i-1}$ is added into the CSA. If both the B bit and the $Y_0$ bit are ones, then $A_{i-1} + Y_0$ are added into the CSA.

Simultaneously the serial output from the CSA is added to the next k·(m−1) S bits through the FA2 adder, unit 460, which outputs the Z stream, the relevant part of the Z output stream is the first non-zero k·(m−1) bits of Z.

The Z stream is switched into the $S_B$ register, for the first m−1 iterations and into the $S_B$ or B register, as defined for the last iteration;

on the last iteration, the Z stream, which, disregarding the LS k zero bits, is the final B* stream. This stream is directed to the B register, to be reduced by N, if necessary, as it is used in subsequent multiplications and squares;

on the last iteration, Nd, delayed k clock cycles, is subtracted by a serial subtractor from the Z stream, to sense if the result, which goes into B, is larger than or equal to N.

At the end of this stage, all the bits from the N, B, and $S_B$ registers have been fed into the ALU, and the final k+1 bits of result are in the CSA, ready to be flushed out.

g) the device is stopped. The S flush, 250; the B flush, 240; and the N flush, 260, are set to output zero strings, to assure that in the next phase the last k+1 most significant bits will be flushed out of the CSA. (In a regular multiplication, the M7 MUX, 450, is set to accept the Last Carry from the previous iteration of S.) S has m·k+1 significant bits, but the S register has only mk cells to receive this data. This last bit is intrinsically saved in the overflow mechanism.

As was explained in e, Nd, delayed k clock cycles in 470, is subtracted from the Z stream, synchronized with the significant outputs from X, to provide a fine-tune to the sense mechanism to determine if the result which goes into the B or S register is larger than or equal to N. 480 and 490 comprise a serial comparator device, where only the last borrow command bit for modular calculations, and the (k·m+1)'th bit for regular multiplications in the natural field of integers are saved.

this overflow/borrow command is detected at the m·k'th effective clock cycle.

h) The device is clocked another k cycles, completely flushing out the CSA, while another k bits are exiting Z to the defined output register.

The instruction to the relevant flip flop commanding serial subtractor 90 or 500 to execute a subtract of N on the following exit streams is set at the last effective, (m+1)·k'th, clock cycle, of the iteration if $(Z/2^k - N) \geq N$ (Z includes the m·k'th MS bit), sensed by, the following signals:

the $SO_1$ bit, which is the data out bit from second least significant cell of the CSA, is a one, or if the $CO_Z$ bit, which is the internal carry out in the X+S adder, 460, is a one.

or if the borrow bit from the 480 sense subtractor is not set.

This mechanism appears in U.S. Pat. No. 5,513,133 as manufactured both by Motorola and SGS-Thomson.

For multiplication in the field of natural numbers, it is preferable to detect an overflow, if the m−k'th MS bit is a one, can happen in the superscalar multiplier, and cannot happen in the mechanism of U.S. Pat. No. 5,513,133. This overflow can then be used in the next iteration to insert a MS one in the S (temporary result) stream.

j) is this the last iteration

NO, return to c)

YES continue to m)

k) the correct value of the result can now exit from either the B or S register.

$Y_0$ bits are anticipated in the following manner in the Y0S-Y0SENSE unit, 430, from five deterministic quantities:

i the LS bit of the Ai—L1 Latch AND the next bit of the Bd Stream; $A_0 \cdot B_d$;

ii the LS Carry Out bit from the Carry Save Accumulator; $CO_0$;

iii the $S_{out}$ bit from the second LS cell of the CSA; $SO_1$;

iv the next bit from the S stream, $S_d$, v the Carry Out bit from the 460, Full Adder; $CO_Z$;

These five values are XORed together to produce the next $Y_0$ bit, $Y_{0i}$:

$$Y_{0i} = A_0 \cdot B_d \oplus CO_0 \oplus SO_1 \oplus S_d \oplus CO_Z$$

If the $Y_{0i}$ bit is a one, then another N of the same rank (multiplied by the necessary power of 2), is typically added, otherwise, N, the modulus, is typically not added. Multiplication of long natural integers in the normal field of numbers.

This apparatus is suited to efficiently perform multiplications and summations of normal integers. If these operands are all of no longer than k bit length, the process preferably is executed without interleave, where the Z stream of 2k+1 bits are directed to final storage. For integers longer than k bits, the process is similar to the predescribed interleaved modular arithmetic process, excepting that the result will now potentially be one bit longer than twice the length of the longest operand. Further the apparatus of the invention is capable, using the resources available in the described device, to simultaneously perform two separate multiplications, A, multiplicand, preferably loaded in segments in the R1-Ai register, times B, the multiplier, of A, preferably loaded into the B register as previously designated, plus N, a second multiplier, preferably loaded into the N register, times an operand, C, loaded into the R2 Register, plus S, a bit stream entering the apparatus, on the first iteration, only from the Sd, signal line, preferably from the $S_A$ register. The Y0 SENSE apparatus is not used. The multiplicands are summated into the R3 register prior to the initiation of an iteration. At initiation of the iteration, registers R1, R2, and R3 are copied into latches L1, L2, and L3 until the end of an iteration. Meanwhile, during the mk+k+1 effective clock cycles of an iteration, the next segments of A and C are again preloaded and summated in preparation for the next iteration.

At each iteration, the first LS k bits of the result on the Z stream, which are, now, (not by definition zero, as in MM) directed to a separate storage, vacated to accumulate the LS portion of the result, again suitably the $S_A$ register. The most significant mk+1 bits comprise the $S_B$, temporary quantity, for the next iteration. In the last phase, similar to g, i, and j, the CSA is flushed out of accumulated value. The LS portion, for numbers which are longer than the multiplier registers, can be exited through the normal data out register and unloader, units 60 and 30, respectively.

The MS, 2m'th bit of the result is read from the LAST CARRY bit of the FA2, unit 460, through the OVERFLOW signal line.

The present invention also relates to a compact microelectronic specialized arithmetic logic unit, for performing modular and normal (natural, non-negative field of integers) multiplication, division, addition, subtraction and exponentiation over very large integers. When referring to modular multiplication and squaring using Montgomery methods, reference is made to the specific parts of the device as a modular arithmetic coprocessor, MAP, also as relates to enhancements existing in the applicant's U.S. Patent pending Ser. No. 09/050,958 filed Apr. 31, 1998.

Preferred embodiments of the invention described herein provide a modular computational operator for public key cryptographic applications on portable Smart Cards, typically identical in shape and size to the popular magnetic stripe credit and bank cards. Similar Smart Cards (as per technology of U.S. Pat. Nos. 5,513,133 and 5,742,530) are being used in the new generation of public key cryptographic devices for controlling access to computers, databases, and critical installations; to regulate and secure data flow in commercial, military and domestic transactions; to decrypt scrambled pay television programs, etc. Typically, these devices are also incorporated in computer and fax terminals, door locks, vending machines, etc.

The preferred architecture is of an apparatus operative to be integrated to a multiplicity of microcontroller designs while the apparatus operates in parallel with the controller. This is especially useful for long procedures that swap or feed a multiplicity of operands to and from the data feeding mechanism, allowing for modular arithmetic computations of any conventional length.

This embodiment preferably uses only one multiplying device which inherently serves the function of two multiplying devices, basically similar to the architecture described in applicant's U.S. Pat. No. 5,513,133 and further enhanced in U.S. patent application Ser. No. 09/050,958 and PCT application PCT/IL98/0048. Using present conventional microelectronic technologies, the apparatus of the present invention may be integrated with a microcontroller with memories onto a 4 by 4.5 by 0.2 mm microelectronic circuit.

The present invention also seeks to provide an architecture for a digital device which is a peripheral to a conventional digital processor, with computational, logical and architectural novel features relative to the processes described in U.S. Pat. No. 5,513,133.

A concurrent process and a unique hardware architecture are provided, to perform modular exponentiation without division preferably with the same number of operations as are typically performed with a classic multiplication/division device, wherein a classic device typically performs both a multiplication and a division on each operation. A particular feature of a preferred embodiment of the present invention is the concurrency of operations performed by the device to allow for unlimited operand lengths, with uninterrupted efficient use of resources, allowing for the basic large operand integer arithmetic functions.

The advantages realized by a preferred embodiment of this invention result from a synchronized sequence of serial processes. These processes are merged to simultaneously (in parallel) achieve three multiplication operations on n bit operands, using one multiplexed k bit serial/parallel multiplier in (n+k) effective clock cycles. This procedure accomplishes the equivalent of three multiplication computations, as described by Montgomery.

By synchronizing loading of operands into the MAP and on the fly detecting values of operands, and on the fly preloading and simultaneous addition of next to be used operands, the apparatus is operative to execute computations in a deterministic fashion. All multiplications and exponentiations are executed in a predetermined number of clock cycles. Additional circuitry is preferably added which on the fly preloads, three first k bit variables for a next iteration Montgomery squaring sequence. A detection device is preferably provided where only two of the three operands are chosen as next iteration multiplicands, eliminating k effective clock cycle wait states. Conditional branches are replaced with local detection and compensation devices, thereby providing a basis for a simple control mechanism, which, when refined, typically include a series of self-exciting cascaded counters. The basic operations herein described are typically executed in deterministic time using a device described in U.S. Pat. No. 5,513,133 to Gressel et al or devices as manufactured by Motorola in East Kilbride, Scotland under the trade name MSC501, and by STMicroelectronics in Rousset, France, under the trade name ST16-CF54.

The apparatus of the present invention has particularly lean demands on external volatile memory for most operations, as operands are loaded into and stored in the device for the total length of the operation. The apparatus preferably exploits the CPU onto which it is appended, to execute simple loads and unloads, and sequencing of commands to the apparatus, whilst the MAP performs its large number computations. Large numbers presently being implemented on smart card applications range from 128 bit to 2048 bit natural applications. The exponentiation processing time is virtually independent of the CPU which controls it. In practice, architectural changes are typically unnecessary when appending the apparatus to any CPU. The hardware device is self-contained, and is preferably appended to any CPU bus.

In general, the present invention also relates to arithmetic processing of large integers. These large numbers are typically in the natural field of (non-negative) integers or in the Galois field of prime numbers, GF(p), and also of composite prime moduli. More specifically, a preferred embodiment of the present invention seeks to provide a device that can implement modular exponentiation of large numbers. Such a device is suitable for performing the operations of Public Key Cryptographic authentication and encryption protocols, which work over increasingly large operands and which cannot be executed efficiently with present generation modular arithmetic coprocessors, and cannot be executed securely in software implementations. The methods described herein are useful for the most popular modular exponentiation computation methods, where sequences of square and multiply have been made identical in the steps executed. Both operations are enacted simultaneously, where the unused result is switched to an unused data register segment. Mock squaring operations, often called dummy squaring operations, are performed preferably using a result of a previous square which precedes a multiplication operation, as the next multiplicand operand. If a square result is not reused, the sequence is more difficult to detect. The terms, "mock" or "dummy" are used to describe an operation in particular which acts in many ways like another operation, and in particular leaving temporary unused [trashed] results. Usually the intent is to dissuade an adversary from attempting to probe a given device. Further, the present invention seeks to modify aspects of loading and unloading operands, and the computations thereof, in order to both accelerate the system response, and to secure computations against potential attacks on public key cryptographic systems.

A preferred embodiment of the present invention seeks to provide a hardware implementation of large operand integer arithmetic. Especially as concerns the numerical manipulations in a derivative of a procedure known as the interleaved Montgomery multiprecision modular multiplication (MM) method as described herein. MM is often used in encryption software oriented systems. The preferred embodiment is of particular value in basic arithmetic operations on long operand integers; in particular, $A*B+C*D+S$, wherein there is no theoretical limit on the sizes of A, B, C, D, or S. In addition, a preferred embodiment of the present invention is especially attuned to perform modular multiplication and exponentiation and to perform elliptic curve scalar point multiplications over the GF(p) field.

For modular multiplication in the prime and composite field of odd numbers, A and B are defined as the multiplicand and the multiplier, respectively, and N is defined as the modulus in modular arithmetic. N, is typically larger than A or B. N also denotes the register where the value of the modulus is stored. N, is, in some instances, typically smaller than A. A, B, and N are defined as m·k=n bit long operands. Each k bit group is called a character, the size of the group defined by the size (number of cells) of the multiplying device.

Then A, B, and N are each m characters long. For ease in following the step by step procedural explanations, assume that A, B, and N are 512 bits long, (n=512); assume that k is 128 bits long because of the present cost effective length of such a multiplier, and data manipulation speeds of simple CPUs. Accordingly, m=8 is the number of characters in an operand and also the number of iterations in a squaring or multiplying loop with a 1024 bit operand. All operands are positive integers. More generally, A, B, N, n, k and m may assume any suitable values.

In non-modular functions, the N and S registers can preferably be used for temporary storage of other arithmetic operands.

The symbol, ≡, or in some instances =, is used to denote congruence of modular numbers, for example 16≡2 mod 7. 16 is termed "congruent" to 2 modulo 7 as 2 is the remainder when 16 is divided by 7. When Y mod N≡X mod N; both Y and X may be larger than N however, for positive X and Y, the remainders are identical. Note also that the congruence of a negative integer Y, is Y+uN, where N is the modulus, and if the congruence of Y is to be less than N, u is the smallest integer which gives a positive result.

The Yen symbol, ¥, is used to denote congruence in a more limited sense. During the processes described herein, a value is often either the desired value, or equal to the desired value plus the modulus. For example X¥2 mod 7. X can be equal to 2 or 9. X is defined to have limited congruence to 2 mod 7. When the Yen symbol is used as a superscript, as in $B^¥$, then $0 \leq B^¥ < 2N$, or stated differently, $B^¥$ is either equal to the smallest positive B which is congruent to $B^¥$, or is equal to the smallest positive congruent B plus N, the modulus.

When X=A mod N, X is defined as the remainder of A divided by N; e.g., 3=45 mod 7.

In number theory, the modular multiplicative inverse of X is written as $X^{-1}$, which is defined by $XX^{-1}$ mod N=1. If X=3, and N=13, then $X^{-1}$=9, i.e., the remainder of 3·9 divided by 13 is 1.

The acronyms MS and LS are used to signify "most significant" and "least significant", respectively, when referencing bits, characters, and full operand values, as is conventional in digital nomenclature.

Characters in this document are words which are k bits long. Characters are denoted by indexed capitals, wherein the LS character is indexed with a zero, e.g., $N_0$ is the least significant character of N, and the MS character is typically indexed, n−1, e.g., $N_{n-1}$ is the most significant character of N.

Throughout this specification N designates both the value N, and the name of the shift register which stores N. An asterisk superscript on a value, denotes that the value, as stands, is potentially incomplete or subject to change. A is the value of the number which is to be exponentiated, and n is the bit length of the N operand. After initialization when A is "Montgomery normalized" to $A*(A*=2^nA$—to be explained later) A* and N are typically constant values throughout the intermediate step in the exponentiation. During the first iteration, after initialization of an exponentiation, B is equal to A*. B is also the name of the register wherein the accumulated value that finally equals the desired result of exponentiation resides. S or S* designates a temporary value, and S also designates the register or registers in which all but the single MS bit of S is stored. (S* concatenated with this MS bit is identical to S.) S(i−1) denotes the value of S at the outset of the i'th iteration; $S_0$ denotes the LS character of an S(i)'th value.

Montgomery multiplication, MM, is actually $(X \cdot Y \cdot 2^{-n})$ mod N, where n is typically the length of the modulus. This is written, P(A·B)N, and denotes MM or multiplication in the P field. In the context of Montgomery mathematics, we refer to multiplication and squaring in the P field as multiplication and squaring operations.

The apparatus of the present invention preferably performs all of the functions described in U.S. Pat. No. 5,513,133, and in U.S. patent application Ser. No. 09/050,958, [same as PCT/IL98/00148]. with the same order of electronic gates, in less than half the number of machine clock cycles, in the first instance, and an additional savings in clock cycles in the second instance. Reduction in performance clock cycles is advantageous on short operand computations, e.g., for use in elliptic curve cryptosystems. This is mostly because there is only one double action serial/parallel multiplier instead of two half size multipliers using the same carry save accumulator (CSA, 410) mechanism. Another explanation is that many of the intrinsic hardware delays have been eliminated, and a CPU loading/unloading hardware method has been developed to greatly shorten memory to peripheral and peripheral to memory data transfers. Furthermore, an "on the fly" preload operation has preferably replaced a time consuming preload operation for the first iteration of a squaring operation, and also replaces a complementary mock preload on a multiplication operation. In addition sequences and methods have been developed which simultaneously accelerate computations and prevent external analysis of secret operations, e.g., determining the secret exponent used in $RS_A$ signatures, or determining the secret random number used in the NIST Digital Signature Standard or in Elliptic Curve Signatures.

Much attention is addressed to dissuading adversaries from non-invasively monitoring the current dissipated in the cryptocomputer. Signal in the sense of taking such measurements is that current which is dissipated in sequences, and is used in statistical tests to determine secret values used in a computation. Pseudo-signal is in this sense, current which is dissipated, in a random or pseudo-random fashion to compensate for, and add to signal, thereby helping to deceive and adversary. Added noise is randomly generated noise, which is typically not synchronized to variations in signal. Noise in this sense is that part of the detected data, which in any way interferes with the detection of signal. Energy decoupling refers to the process of arbitrarily causing energy to be drawn from the power supply that the adversary can measure, and forcibly inserted into the circuit, irrespective of the energy dissipated in signal and pseudo-signal. The excess of this energy is preferably dissipated over the entire surface of the monolithic cryptocomputer.

A pseudo signal is defined as an intentionally superfluously generated noise that in many or all respects mocks a valid signal using similar or identical resources and synchronized to the system clocks. Pseudo-signals, which are effectively noise, can be generated simultaneously with a valid signal, or alone in a sequence.

Montgomery Modular Multiplication

A classical modular multiplication procedure consists of both a multiplication and a division process, e.g., A·B mod N where the result is the remainder of the product A·B divided by N. Implementing a conventional division of large operands is more difficult to perform than serial/parallel multiplications.

Using Montgomery's modular reduction method, division is typically replaced by multiplications using two precomputed constants. In the procedure demonstrated herein, there is only one precomputed constant, which is a function of the modulus. This constant is, or can be, computed using this specialized arithmetic Operational Unit device.

A simplified presentation of the Montgomery process, as is used in this device is now provided, followed by a complete preferred description.

If the number is odd (an LS bit one), e.g., 1010001 ($=81_{10}$) the odd number is typically transformed to an even number (a single LS bit of zero) by adding to it another fixing, compensating odd number, e.g., 1111 ($=15_{10}$); as 1111+1010001=1100000 ($96_{10}$). In this particular case, a number is produced five with LS zeros, because we know in advance the whole string, 81, and easily determine a binary number which we when added to 81, and produces a new binary number that has at least k LS zeros. The added in number is odd. Adding in an even number has no effect on the progressive LS bits of a result.

This is a clocked serial/parallel carry save process, where it is desired to have a continuous number of LS zeros. Thus at each clock cycle only the next bit emitting from the CSA, 410, may need a change of polarity. At each clock it is sufficient to add the fix, if the next bit is potentially a one or not to add the fix if the potential bit were to be a zero. However, in order not to cause interbit overflows (double carries), this fix is preferably summated previously with the multiplicand, to be added into the accumulator when the relevant multiplier bit is one, whenever the $Y_0$ Sense, 430, detects a one.

Only the remainder of a value divided by the modulus is of interest. To maintain congruency it is sufficient to add the modulus any number of times to a value, and still have a value that has same remainder. This means typically that $Y_0 \cdot N = \Sigma y_i 2^i N$ added to any integer typically produces a result with the same remainder. $Y_0$ is typically the number of times we add the modulus, N, to the summation to produce the necessary LS zeros. As described, the modulus that is added to the value is odd.

Montgomery interleaved variations typically reduce the limited working register storage used for operands. This is especially useful when performing public key cryptographic functions where typically one large integer, e.g., n=1024 bit, is multiplied by another large integer; a process that conventionally produces a double length 2048 bit integer.

Typically a sufficient number of Ns (the moduli) are add in to A·B=X or A·B+S=X during the process of multiplications (or squaring) so that the result is a number, Z, that has n LS zeros, and, at most, n+1 MS bits.

The LS n bits may be disregarded, typically, while performing P field computations, if at each stage, the result is realized to be the natural field modular arithmetic result, divided by $2_n$.

When the LS n bits are disregarded, and only the most significant n (or n+1) bits are used, then effectively, the result has been multiplied by $2^{-n}$, the modular inverse of $2^n$. If subsequently this result is re-multiplied by $2^n$ mod N (or $2^n$) a value is typically obtained which is congruent to the desired result (having the same remainder) as A*B+S mod N.

Example:

A*B+S mod N=(12*11+10) mod 13=(1100*1011+1010)$_2$ mod 1011$_2$.

$2_i$ N is added in whenever a fix is necessary on one of the n LS bits.

```
        B     1011
  x     A     1100
  add   S     1010
  add A(0)*B  0000
              ----  sum of LS bit = 0 not add N
  add 2⁰ (N*0) 0000
  sum         0101   →0 LS bit leaves CSA, 410
  add A(1)*B  0000
              ----  sum of LS bit = 0 - add N
  add 2¹ (N*1) 1101
```

-continued

| | | |
|---|---|---|
| sum | 1001 | →0 LS bit leaves CSA |
| add A(2)*B | 1011 | |
| | ---- | sum LS bit = 0 don't add N |
| add $2^2$ (N*0) | 0000 | |
| sum | 1010 | →0 LS bit leaves CSA |
| add A(3)*B | 1011 | |
| | ---- | sum LS bit = 1 add N |
| add $2^3$ (N*1) | 1101 | |
| sum | 10001 | →0 LS bit leaves CSA |

And the result is $10001\ 0000_2 \bmod 13 = 17 * 2^4 \bmod 13$.
As 17 is larger than 13, 13 is subtracted, and the result is:

$$17 * 2^4 = 4 * 2^4 \bmod 13.$$

formally $2^{-n}(AB+S) \bmod N = 9\ (12*11+10) \bmod 13 \equiv 4$

In Montgomery arithmetic only the MS non-zero result is utilized, and in the P field, it is typically assumed that the real result is divided by $2_n$; n zeros having been forced onto the MM.

In the example, $(8+2)*13 = 10*13$ was added in, which effectively multiplied the result by $2^4 \bmod 13 \equiv 3$. In effect, with the superfluous zeros the result is, $A*B+Y*N+S- (12*11+10*13+10)$ in one process. This process, on much longer numbers, is executable on a preferred embodiment.

Check—$(12*11+10) \bmod 13 = 12$; $4*3 = 12$.

To retrieve an MM result back into a desired result using the same multiplication method, the previous result is Montgomery Multiplied $2^{2n} \bmod N$, the term which is defined as H, as each MM leaves a parasitic factor of $2^{-n}$.

The Montgomery Multiply function P(A·B)N performs a multiplication modulo N of the A·B product into the P field. (In the above example, where we derived 4). The retrieval from the P field back into the normal modular field is performed by enacting the operator P on the result of P(A·B)N using the precomputed constant H. Now, if P≡ ₚ(A·B)N, it follows that P(P·H)N≡A·B mod N; thereby performing a normal modular multiplication in tow P field multiplications.

Montgomery modular reduction averts a series of multiplication and division operations on operands that are n and 2n bits long, by performing a series of multiplications, additions, and subtractions on operands that are n or n+1 bits long. The entire process yields a result which is smaller than or equal to N. For given A, B and odd N, there is always a Q, such that A·B+Q·N results in a number whose n LS bits are zero, or:

$$P \cdot 2^n = A \cdot B + Q \cdot N$$

This means that the result is an expression 2n bits long, whose n LS bits are zero.

Now, let $I \cdot 2^n = 1 \bmod N$ (I exists for all odd N). Multiplying both sides of the previous equation by I yields the following congruences:

from the left side of the equation:

$P \cdot I \cdot 2^n \equiv P \bmod N$; (Remember that $I \cdot 2^n = 1 \bmod N$)

and from the right side:

$A \cdot B \cdot I + Q \cdot N \cdot I \equiv AB \cdot I \bmod N$; (Remember that $Q \cdot N \cdot I \equiv 0 \bmod N$)

therefore:

$P \equiv A \cdot B \cdot I \bmod N$.

This also means that a parasitic factor $I = 2^{-n} \bmod N$ is introduced each time a P field multiplication is performed.

The P operator is defined such that:

$P \equiv A \cdot B \cdot I \bmod N \equiv P(A \cdot B)_N$.

and we call this "multiplication of A times B in the P field", or Montgomery Multiplication.

The retrieval from the P field can be computed by operating P on P·H, making:

$P(P \cdot H)_N \equiv A \cdot B \bmod N$;

H is typically derived by substituting P in the previous congruence:

$P(P \cdot H)_N \equiv (A \cdot B \cdot I)(H)(I) \bmod N$;

(any Montgomery multiplication operation introduces the parasitic I)

If H is congruent to the multiple inverse of $I^2$ then the congruence is valid, therefore:

$H = I^{-2} \bmod N = 2^{2n} \bmod N$ (H is a function of N and is called H parameter)

In conventional Montgomery methods, to enact the P operator on A·B, the following process may be employed, using the precomputed constant J:

1) $X = A \cdot B$
2) $Y = (X \cdot J) \bmod 2^n$ (only the n LS bits are necessary)
3) $Z = X + Y \cdot N$
4) $S^¥ = Z/2^n$ (The constraint on J is that it forces Z to be divisible by $2^n$)
5) P¥S mod N (N is to be subtracted from S, if S≧N)

Finally, at step 5):

$P¥(A \cdot B)_N$,

[After the subtraction of N, if necessary:

$P = P(A \cdot B)_N.$]

Following the above:

$Y = A \cdot B \cdot J \bmod 2^n$ (using only the n LS bits);

and:

$Z = A \cdot B + (A \cdot B \cdot J \bmod 2^n) \cdot N$.

In order that Z be divisible by $2^n$ (the n LS bits of Z are preferably zero) and the following congruence exists:

$[A \cdot B + (A \cdot B \cdot J \bmod 2^n) \cdot N] \bmod 2^n \equiv 0$

In order that this congruence can exist, N·J mod $2^n$ are congruent to −1 or:

$J \equiv -N^{-1} \bmod 2^n$.

and the constant J is the result.

J, therefore, is preferably a precomputed constant which is a function of N only. However, in a apparatus operative to output a MM result, bit by bit, provision is typically made to add in Ns at each instance where the output bit in the LS string would otherwise have been a zero, thereby obviating the necessity of precomputing J. Y is detected bit by bit using hardwired logic instead of precomputing $Y = A \cdot B \cdot J \bmod 2^n$. The method described is typically executable only for odd Ns.

It is to be noted that if the bit length of the MAP is equal to the bit length, n, of the modulus, only one iteration is necessary to perform a multiplication or a square. In reality the whole computation is performed in approximately n (the length of the operands) effective clock cycles. However, the last n effective clock cycles, in this embodiment, are necessary to flush the result out of the Carry Save Accumulator and also to perform the "Compare to N" which sets the borrow detect. Another preferred embodiment can be constructed wherein a parallel compare can be executed in one clock cycle, and the result left in a MAP register which can serve both as a result and an operand register.

Therefore, as is apparent, the process described employs three multiplications, one summation, and a maximum of one subtraction for the given A, B, N. Computing in the P field typically requires an additional multiplication by a constant to retrieve P(A·B)N into the natural field of modular arithmetic integers. As A can also be equal to B, this basic operator can be used as a device to square or multiply in the modular arithmetic.

Interleaved Montgomery Modular Multiplication is Now Described:

The previous section describes a method for modular multiplication which involved multiplications of operands that were all n bits long, and results which typically occupied 2n+1 bits of storage space.

Using Montgomery's interleaved reduction as described previously, it is possible to perform the multiplication operations with shorter operands, registers, and hardware multipliers; enabling the implementation of an electronic device with relatively few logic gates.

First, if at each iteration of the interleave, using the device of U.S. Pat. No. 5,742,530, the number of times that N is added is preferably computed, using the $J_0$ constant. To interleave, using a hardwire derivation of $Y_0$, preferably eliminates the $J_0$-phase of each multiplication {2) in the following example}. Eliminating the $J_0$ phase enables integration of the functions of two separate serial/multipliers into the new single generic multiplier which preferably performs A·B+$Y_0$·N+S at better than double speed of previous similar sized devices.

Using a k bit multiplier, it is convenient to define characters of k bit length, there are m characters in n bits; i.e., m·k=n.

$J_0$ is defined as the LS character of J.
Therefore:

$$J_0 = -N_0^{-1} \bmod 2^k \; (J_0 \text{ exists as } N \text{ is odd}).$$

Note, the J and $J_0$ constants are compensating numbers that when enacted on the potential output, tell how many times to add the modulus, in order to have a predefined number of least significant zeros. Following is a description of an additional advantage to the present serial device; since, as the next serial bit of output can be easily determined, it is preferred to add the modulus (always odd) to the next intermediate result. This is the case if, without this addition, the output bit, the LS serial bit exiting the CSA, is typically a "1". Adding in the modulus to the previous even intermediate result, and thereby typically outputs another LS zero into the output string. Congruency is maintained, as no matter how many times the modulus is added to the result, the remainder is constant.

In the conventional use of Montgomery's interleaved reduction, P(AB)N is enacted in m iterations as described in steps (1) to (5):

Initially, S(0)=0 (the ¥ value of S at the outset of the first iteration).

For i=1, 2 . . . m:
1) X=S(i−1)+$A_{i-1}$·B ($A_{i-1}$ is the i−1 th character of A; S(i−1) is the value of S at the outset of the i'th iteration.)
2) $Y_0 = X_0 \cdot J_0 \bmod 2^k$ (The LS k bits of the product of $X_0 \cdot J_0$) (The process computes the k LS bits only, e.g., the least significant 128 bits)

In the preferred implementation, this step is hidden, as in this systolic device, $Y_0$ can be anticipated bit by bit.

3) Z=X+$Y_0$·N
4) $S^¥(i) = Z/2^k$ (The k LS bits of Z are always 0, therefore Z is always divisible by $2^k$. This division is tantamount to a k bit right shift as the LS k bits of Z are all zeros; or as is seen in the circuit, the LS k bits of Z are simply disregarded).
5) S(i)=$S^¥(i)$ mod N (N is to be subtracted from those S(i)'s which are larger than N).

Finally, at the last iteration (after the subtraction of N, when necessary), C=$S^¥(m)$=P(A·B)N. To derive F=A·B mod N, the P field computation, P(C·H)N, is performed.

It is desired to know, in a preferred embodiment, that for all $S^¥(i)$'s, $S^¥(i)$ is smaller than 2N. This also means, that the last result ($S^¥(m)$) can always be reduced to a quantity less than N with, at most, one subtraction of N.

For operands which are used in the process:
$S^¥(i-1) < 2^{n+1}$ (the temporary register can be one bit longer than the B or N register—in this MAP Sd is always less than N),
B<N<$2^n$ and $A_{i-1} < 2^k$.
By definition:
$S^¥(i) = Z/2^k$ (The value of S at the end of the process, before a possible subtraction, 0<i<n)

For all Z output, Z(i)<$2^{n+k+1}$; maximum output results for $N_{max} = 2^n - 1$ $$X_{max} = S^¥_{max} + A_i \cdot B < 2^{n+1} - 1 + (2^k - 1)(2^n - 2)[\text{Real } S < N]$$

$$Q_{max} = Y_0 N < (2^k - 1)(2^n - 1)$$

therefore:

$$Z_{max} = X_{max} + Q_{max} = 2^{n+k+1} - 2^{k+1} - 2^k + 3$$

$$S^¥ < 2^{n-1} - 2.$$

$$S^¥(m)_{max} - N_{max} < (2^{n+1} - 2) - (2^n - 1) = 2^n - 1.$$

Similarly, for the lower extremum, where $N_{min} = 2^{n-1} + 1$, $S_{max} < 2N_{min}$.

Example of a Montgomery Interleaved Modular Multiplication:

The following computations in the hexadecimal format clarify the meaning of the interleaved method:

N=a59, (the modulus), A=99b, (the multiplier), B=5c3 (the multiplicand), n=12, (the bit length of N), k=4, (the size in bits of the multiplier and also the size of a character), and m=3, as n=k·m.

$J_0 = 7$ as $7 \cdot 9 = -1 \bmod 16$ and $H = 2^{2 \cdot 12} \bmod a59 = 44b$.

The expected result is F≡A·B mod N≡99b·5c3 mod a59=375811 mod a59=$220_{16}$.

Initially: S(0)=0

Step 1

$X = S(0) + A_0 \cdot B = 0 + b5c3 = 3f61$ $Y_0 = X_0 \cdot J_0 \bmod 2^k = 7$ ($Y_0$-hardwire anticipated in MAP)

$Z=X+Y_0 \cdot N=3f61+7 \cdot a59=87d0$ $S(1)=Z/2^k=87d$

Step 2

$X=S(1)+A_1 \cdot B=87d+9 \cdot 5c3=3c58$ $Y_0=X_0 \cdot J_0 \bmod 2^k=8 \cdot 7 \bmod 2^4=8$ (Hardwire anticipated)

$Z=X+Y_0 \cdot N=3c58+52c8=8f20$ $S(2)=Z/2^k=8f2$

Step 3

$X=S(2)+A_2 \cdot B=8f2+9 \cdot 5c3=3ccd$ $Y_0=d \cdot 7 \bmod 2^4=b$ (Hardwire anticipated)

$Z=X+Y_0 \cdot N=3ccd+b \cdot a59=aea0$ $S(3)=Z/2^k=aea$, as $S(3)>N$, $S(m)=S(3)-N=aea-a59=91$ Therefore $C=P(A \cdot B)N=91_{16}$.

Retrieval from the P field is performed by computing $P(C \cdot H)N$:

Again initially: $S(0)=0$

Step 1

$X=S(0)+C_0 \cdot H=0+1 \cdot 44b=44b$ $Y_0=d$ (Hardwire anticipated in new MAP)

$Z=X+Y_0 \cdot N=44b+8685=8ad0$ $S^¥(1)=Z/2^k=8ad$ ; $S^¥(1)=S(1)<N$.

Step 2

$X=S(1)+C_1 \cdot H=8ad+9 \cdot 44b=2f50$ $Y_0=0$ (Hardwire anticipated in new MAP)

$Z=X+Y_0 \cdot N=2f50+0=2f50$ $S^¥(2)=Z/2^k=2f5$ ; $S^¥(2)<N$

Step 3

$X=S(2)+C_2 \cdot H=2f5+0 \cdot 44b=2f5$ $Y_0=3$ (Hardwire anticipated in new MAP)

$Z=X+Y_0 \cdot N=2f5+3 \cdot a59=2200$ $S^¥(3)=Z/2^k=220_{16}$, $S^¥(3)<N$ which is the expected value of 99b 5c3 mod a59.

If at each step k LS zeros are disregarded, the result is tantamount to having divided the n MS bits by $2^k$. Likewise, at each step, the i'th segment of the multiplier is also a number multiplied by $2^{ik}$, giving it the same rank as S(i).

The following explains a sequence of squares and multiplies, which implements a modular exponentiation.

After precomputing the Montgomery constant, $H=2^{2n}$, as this device can both square and multiply in the P field, it is possible to compute:

$C=A^E \bmod N$.

Let E(j) denote the j bit in the binary representation of the exponent E, starting with the MS bit whose index is 1 and concluding with the LS bit whose index is q, the process is as follows for odd exponents:

$A^*¥P(A \cdot H)N$ $A^*$ is now equal to $A \cdot 2^n$.

$B=A^*$

FOR j=2 TO q-1

$B¥P(B \cdot B)N$

IF E(j)=1 THEN $B¥P(B \cdot A^*)N$

ENDFOR $B¥P(B \cdot A)N$ E(0)=1; B is the last desired temporary result multiplied by $2^n$, A is the original A.

$C^¥=B$ $C=C^¥-N$ if $C^¥ \geq N$.

After the last iteration, the value B is ¥ to $A^E \bmod N$, and C is the final value.

To clarify, note the following example:

E=1011→E(1)=1; E(2)=0; E(3)=1; E(4)=1;

To find $A^{1011} \bmod N$; q=4

$A^*=P(A \cdot H)N=AI^{-2}$ $I=AI^{-1} \bmod N$ $B=A^*$

FOR j=2 to q $B=P(B \cdot B)N$ which produces: $A^2(I^{-1})^2 \cdot I=A^2 \cdot I^{-1}$ E(2)=0; $B=A^2 \cdot I^{-1}$ j=3 $B=P(B \cdot B)N=A^2(I^{-1})^2 \cdot I=A^4 \cdot I^{-1}$ E(3)=1$B=P(B \cdot A^*)N=(A^4 \cdot I^{-1})(AI^{-1}) \cdot I=A^5 \cdot I^{-1}$ j=4 $B=P(B \cdot B)N=A^{10} \cdot I^{-2} \cdot I=A^{10} \cdot I^{-1}$ As E(4) was odd, the last multiplication is by A, to remove the parasitic $I^{-1}$.

$B=P(B \cdot A)=A^{10} \cdot I^{-1} \cdot A \cdot I=A^{11}$ $C=B$

Apparatus for accelerating the modular multiplication and exponentiation process is preferably provided, including means for precomputing the necessary single Montgomery constant, $H=2^{2n} \bmod N$; where n is the bit length of the operand, and N is the modulus.

An exhaustive search, or a brute force attack, is an attack where the hacker knows the encryption scheme, and is able to break the scheme by trying all possible keys. In the event that the hacker is able, by physical means, to find parts of the sequence; an exhaustive search then consists of an orderly trial and error sequence of tests to determine a sequence. Exhaustive search cryptographic attacks are considered intractable if the hacker is forced to execute, on the average, at least $2^{80}$ trials in order to learn a correct sequence.

The number of trials that make a method intractable, is obviously machine dependent. Diffie' conjectures [Whitfield Diffie & Susan Landau, "Privacy on the Line", MIT Press, Cambridge, 1998 page 27, hereinafter, Diffie].states that a method of breaking a code, used by a hacker who has access to a very large percentage of the world's computing power, typically needs more than $2^{90}$ trials to be intractable for the foreseeable future. Diffie notes that to execute $2^{120}$ trials would take 30,000 years with $10^{12}$ dedicated processors each of which performs a procedural test on a secret in a picosecond. This Diffie estimates is sufficiently strong for the indefinite future. Most researchers today believe that $2^{80}$ trials pose an intractable problem. [A. J. Menezes, P C van Oorschot, S. A. Vanstone, Handbook of Applied Cryptography, CRC Press, Boca Raton, 1997, Chapter 4, 4.49]. ANSI Standard X9.31-1997 page 25 specifies $2^{100}$ iterations for banking use, which typically covers certificates from CAs [Certification Authorities].

System security in an RSA environment is dependent on the strength of the CA's secret key. These are typically long lasting, as they are preferably masked into all devices in the system. Devices with the CA's secret keys are preferably kept in a well protected environment, are not subject to reverse engineered or non-invasive attacks. However, an ordinary financial smart card, with preset reasonable credit limits and a maximum lifetime of four years typically is not be the target of a costly search and as it is typically based on a lower level of security. However, an insufficiently secured banker's certificate is a potential victim for an exhaustive search attack. A satellite television descrambler in a "pay for what you see" system that includes a potential non-paying audience of millions is a likely target for a hacker intent on cloning, as a cloned $RS_A$ smart card is typically as useful as an original card.

In an Internet disclosure, "Introduction to Differential Power Analysis and Related Attacks", by Paul Kocher, Joshua Jaffe and Benjamin Jun, Cryptography Research, San Francisco, 94102, www.cryptography.com, 1998, hereinafter, Kocher, a disclosure of methods which Kocher uses to learn cryptographic secrets in monolithic cryptocomputers of varied designs. The Kocher attacks are similar in principle but more refined in practice than previous noninvasive attacks on cryptocomputing devices. In the most refined attacks, the hacker has accurate previous knowledge of the device, the computational methods used and the hacker preferably has complete access to the software or firmware, which executes the computational method using a secret key.

In Differential Power Analysis, DPA, or any other probing method for learning cryptographic secrets, signal is referred to as the conglomerate of externally detectable features. In DPA a digitally recorded mapping over time of instantaneous current consumption transmitted by the relevant electronic components of the MAP and the host CPU while computing a cryptographic sequence traces such signal. Noise in this sense is that part of the detected data, which in any way interferes with the detection of signal. A pseudo signal is defined as an intentionally superfluously generated noise that in many or all respects mocks a valid signal using similar or identical resources. Pseudo-signals, which are effectively noise, can be generated simultaneously with a valid signal, or alone in a sequence.

As most professional rogue hackers, and most security testing laboratories typically have preliminary knowledge of the cryptocomputer and the firmware drivers, judicious designers and programmers always assume that adversaries have access to extensive resources. These adversaries have the means to reverse engineer silicon designs. These adversaries gain access to firmware, either by physically attacking the ROM or by obtaining necessary data from developers, disgruntled employees, hacking tips on an Internet bulletin boards or from another hacker who had access to an unprotected version of a cryptocomputer. Types of data that are preferably well protected are the crypto-secret keys, secret moduli, internally generated random numbers, and other secrets that are internally generated. They are preferably protected so that the programmer, the manufacturer or his employees or the cryptocomputer owner himself, do not have access to these secrets.

In most cryptographic methods, secret keys can be extricated by learning the sequence of operations performed by the cryptocomputer, and or the sequence of serial operations performed in the execution thereof.

In anticipated attacks, a plurality of devices under test simultaneously execute the same cryptographic command, on each cryptocomputer under test, and statistically learn the features of each operation in the sequence. In the simplest form, this could be an elementary timing attack to learn the sequence of squares and multiplies. In many cryptocomputers, the time to execute a squaring is approximately one half of the time necessary to execute a multiplication. A graph, as can be observed on an oscilloscope with memory, of the current consumed during a computation, is generally a sequence of disfigured bell-shapes, corresponding to the sequence of squares and multiplies. In this simplest attack, smaller bells typically represent squares and larger bells typically represent multiplications. The above described sequence of time dependent unmasked current consumption can graphically be described as a ragged skewed flat top bell, rising more quickly on the first phase of a squaring or multiplication computation, with notches of lowered consumption at phase and drastic computational changes, and finally, a fast receding decrease during the final phase of a sequence, as the CSA is being flushed out. These changes, when not carefully masked, clearly mark the status of the MAP during an iteration and can aid a hacker to synchronize onto a computational sequence.

If a hacker can learn a sequence of squares and multiplies in a secret RSA exponent, he can extricate the composite primes of the public modulus. With this knowledge a usable counterfeit cryptocomputer can be fabricated, with the extricated secret keys.

Obviously, if the chip designer has developed a procedure wherein the time and microcode sequence of squaring and multiplying are identical, a simple timing attack is typically impossible, and the adversary typically utilizes more esoteric detection techniques. As there are twice as many squaring operations as multiplications in a random sequence, this means that a combination of statistically established features, might recognize either the exponent sequence, or directly the value of the whole or part of the modulus. Learning such features, using statistical methods, entails extensive testing. A preliminary line of defense against such attacks may well be putting a lock on the number of cryptographic sequences which can be performed, before allowing acquiring an additional license, an unlock from the Certification Authority.

A preferred method for camouflaging and accelerating the squaring sequence in an exponentiation procedure is now described:

In the MAP designs of U.S. Pat. Nos. 5,742,530, 5,513,133, and the PCT patent application PCT/IL98/00148, now published, prior to each Montgomery squaring procedure, the MAP ceased computing, as the first LS k bits of the squaring multiplicand is preferably loaded into BAISR preload register. As in previous patent implementations the first serial/parallel multipliers were only 32 bits, and there were few competing designs this delay was not considered inordinately wasteful. With a 128 bit CSA, on short operands, (as are to be found in elliptic curve computations), this loading delay can account for more than 10% of procedure time in an exponentiation.

The hardware of the present invention carries out modular multiplication and exponentiation by applying Montgomery arithmetic in a novel way. Further, the squaring can be carried out in the same method, by applying it to a multiplicand and a multiplier that are equal. Modular exponentiation involves a succession of modular multiplications and squarings, and therefore is carried out by a method which comprises the repeated, suitably combined and oriented application of the aforesaid multiplication, squaring and exponentiation methods.

Final results of a Montgomery type multiplication (MM) may be larger than the modulus, but smaller than twice the modulus. In a preferred embodiment, the MAP devices can only determine the range of the result from the serial comparator, at the end of the last clock cycle of the MAP computation. In previous implementations the preload registers of the MAP were loaded in a separate k effective clock sequence, prior to the next computation, where k is the number of single bit cells in the Carry Save Accumulator (CSA), 410, which is central to the computational unit. As the drawn sizes of silicon became smaller, and factoring techniques became more sophisticated, the number of k bits in a CSA preferably becomes larger, and in a first version of this design the CSA is 128 bits long. In a less efficient and less timing wise secure procedure, the MAP does not compute whilst the first multiplicand is preloaded for a squaring operation. This preload operation in an apparatus with a 128 bit CSA causes a 128 effective clock cycle delay, and a proportionally larger loss of performance in the total process. This delay only appears naturally in the first iteration of a squaring sequence, where both the multiplicand and the multiplier are identical.

In a multiplication sequence this next original multiplicand character is preferably preloaded whilst the MAP is performing a previous squaring operation. However, if a programmer allows timing or energy differences between multiplication and squaring, the timing and energy dissipation features help a hacker learn secret square and multiplication sequences in an exponentiation procedure using non-invasive methods. It is always to be assumed that adversaries attempt to detect these and other features that indicate a process in a sequence. These differences and features are preferably eliminated or masked.

A preferred embodiment eliminates the delay caused by the wait for compare of size of the first character of the multiplicand in a squaring sequence and is achieved by preloading the first characters of the natural output of the CSA, during the end of a previous square or multiply. These characters are $S_0$ which is the LS character from $Z/2^k$, and $(S-N)_0$ which is $(Z/2^k-N)_0$. These characters are serially loaded into preload buffers Y0B0SR, 6350, and BAISR, 6290. At the end of the previous sequence, when the range of the result is determined, the proper values are latched into the parallel multiplicand registers. It is shown in the ensuing description, how the correct multiplicands are preferably derived in a hardware implementation.

This delay state is caused by the necessity to wait until the modulus is subtracted from the whole result stream in the serial comparator/detector. Only on the last MS bit of the result does the borrow/overflow detector, 490, typically flag the control mechanism to denote whether the result is larger than the modulus. In the embodiments of U.S. Pat. No. 5,713,133 and 5,742,530, only after the smallest positive congruence of the result is determined is it possible to load the first character of the squaring multiplicand. So as not to disclose the difference between a square and a multiply to an adversary who is intent on learning an exponentiation sequence using a simple timing attack, this idle period preferably also prefaces a multiplication sequence.

In a squaring operation the value in the multiplier register furnishes the values for both the multiplier and the multiplicand. If the squaring multiplier value is larger than the modulus, the modulus value is serially subtracted from the larger than modulus squaring value as the multiplier stream exits the multiplier register.

In the previous patented devices, the MAP process was halted while the first k bits were loaded after modular reduction, into the multiplicand register for the next squaring operation. As subsequent k bit multiplicand operands are modular reduced if necessary and preloaded on the fly during the squaring operation, this delay was necessitated only on the first iteration of a squaring procedure.

A primary step in masking squares and multiplication is to execute a squaring operation in a mode wherein all rotating registers and computational devices are exercised in exactly the same manner for squaring and multiplying, the only difference being the settings of data switches which choose relevant data for computation and not using [trashing] the irrelevant data.

In a preferred embodiment, the first iteration of a squaring operation, performing $B_0 \cdot B + Y_0 \cdot N$, can be accelerated and masked, when using the two outputs, $B^{\yen}_0$ and $B^{\yen}_0 - N_0$, of the last iteration of either a squaring or multiplication operation which precedes the squaring operation which is to be masked and accelerated.

Finding the proper carry bit, c, when $c2^k + S_0^{\yen} = S_0 + N_0$ is loaded on the fly from the MAP is not obvious. This explicit summation is not performed in the MAP. The carry bit, c, is determined when $S^{\yen} \geq N$, [assume that k=128] and the summation performed is:

$$Z_1 = S_0^{\yen} = \{(A_i B + Y_0 N + S_-) \bmod {}_2{}^{2k}\} \operatorname{div} 2^k$$

[$S_-$ is the temporary summation from the previous iteration.]

There is further provided in accordance with yet another preferred embodiment of the present invention a method for at least partially preventing leakage of secret information as a result of a probing operation on a cryptocomputer performing secret sequences, the method includes the step of decoupling the power supply to the cryptocomputer from the external power source wherein the cryptocomputer operates from an intermediary independent regulator dissipating excess energy.

Further in accordance with a preferred embodiment of the present invention, the intermediary stage of the power supply has a programmable energy dissipator operative to mask from a probing device the energy expended by the cryptocomputer.

Still further in accordance with a preferred embodiment of the present invention, the energy dissipator is designed to dissipate in a time dependent mode, variable amounts of energy.

There is also provided in accordance with yet another preferred embodiment of the present invention a method for at least partially preventing leakage of secret information as a result of a probing operation on a cryptocomputer performing modular exponentiation, the method includes the step of causing a balanced number of changes of status from one to zero and zero to one in an interacting shift register to shift register loading and unloading sequence.

Further in accordance with a preferred embodiment of the present invention, causing a binary change of value in a second not valid circuit, at each instance that the valid circuitry does not enact a change of binary value.

Still further in accordance with a preferred embodiment of the present invention, causing the combination of the not valid circuit together with the valid circuitry to expend an amount of energy to complement an approximate average maximum amount of energy that the valid circuitry could potentially draw.

There is also provided in accordance with a preferred embodiment of the present invention a method for at least partially preventing leakage of secret information as a result of a probing operation on a cryptocomputer performing elliptic curve point addition and point doubling, the method includes causing a balanced number of changes of status from one to zero and zero to one in an interacting shift register to shift register loading and unloading sequence.

Preferably, for at least partially preventing leakage of secret information as a result of a probing operation on a cryptocomputer where logic circuitry causes a binary change of value in a not valid circuit, at each instance that the valid circuitry does not enact a change of binary value.

Further in accordance with a preferred embodiment of the present invention, the not valid circuitry is another shift register configured so that the two registers operate together to expend an amount of energy to complement an approximate average maximum amount of energy that the valid circuitry could potentially draw.

There is further provided in accordance with yet another preferred embodiment of the present invention, a method for at least partially preventing leakage of secret information as a result of an energy probing operation on a cryptocomputer performing modular exponentiation, the method includes the step of causing a nearly constant current consumption when moving a data word from one data store to another, irrelevant of the previous status of the data source and the data destination.

There is further provided in accordance with yet another preferred embodiment of the present invention, a method for at least partially preventing leakage of secret information as a result of a probing operation on a cryptocomputer performing modular exponentiation, the method includes inserting mock square operations in difficult to detect positions in an exponentiation sequence.

There also provided in accordance with a preferred embodiment of the present invention a method for accelerating and at least partially preventing leakage of secret information as a result of a probing operation on a cryptocomputer performing modular exponentiation, the method includes the step of a multiplication procedure using addition chain procedures, wherein a plurality of single multiplication operations of the base value times the result of a previous squaring operation are replaced by single multiplications of small multiples of the base value times a previous squaring operation.

Further in accordance with a preferred embodiment of the present invention, the step of exponentiation sequence of squaring and multiplication operations is masked includes the steps of: causing mock squaring operations, normal squaring operations and multiplication operations to be identical in number of clock cycles and the amounts of energy consumed during each clock cycle of each operation are statistically similar.

There is further provided in accordance with yet another preferred embodiment of the present invention a method for at least partially preventing leakage of secret information as a result of probing operation of a cryptocomputer performing scalar multiplication of a point on an elliptic curve, including storing precomputed values of consecutive small integer multiples of the initial point value and performing elliptic curve point additions using these multiples of the initial point value and in the sequence to replace many single point addition operations.

Further in accordance with a preferred embodiment of the present invention, the method includes an addition type operation is performed at regular intervals in the scalar point multiplication sequence, and also a mock addition operation enacted when an addition operation is not necessary in the regular interval of the sequence.

Still further in accordance with a preferred embodiment of the present invention the addition type operations, and the mock point addition operation of claim 41 are masked to be almost identical in number of clock cycles and dissipate statistically similar amounts of energy during each clock cycle of each operation.

There is also provided in accordance with a preferred embodiment of the present invention, a method for accelerating and masking a first iteration in a later modular squaring operation, $B_0 \cdot B + Y_0 \cdot N$, performed on an output, $B^Y_0$ and $B^Y_0 - N_0$, of the last iteration of an earlier modular multiplication operation, each operation including a plurality of iterations, wherein an output of the last iteration of the earlier operation comprises a partially unknown quantity whose least significant portion comprises a multiplicand for the first iteration of the later operation, the partially unknown quantity having two possible values, one of which is $B_0$, the two possible values including a smaller multiplicand value and a larger multiplicand value which is one modulus value, N, greater than the smaller multiplicand value, the method includes the steps of: during the last iteration of the earlier operation, on-the-fly extricating of the least significant portions of both possible values of the multiplicand for the later operation's first iteration, summing the least significant portion of the larger multiplicand value with a least significant portion of the modulus, thereby to obtain a least significant portion of a largest multiplicand value which is one modulus value greater than the larger multiplicand value, and from among the three least significant portions, selecting the least significant portions of the two positive multiplicand values as $B_0$ and $B_0 + N_0$, relating to the first iteration of the later modular squaring operation.

Further in accordance with a preferred embodiment of the present invention, the extricating and summing steps in preparation for a squaring process and the process of preparing for a multiplication process are performed simultaneously.

Still further in accordance with a preferred embodiment of the present invention, the method also includes the extrication process and the preparation procedure for performing a multiplication are made almost identical in timed processing and energy consumption.

There is further provided in accordance with a preferred embodiment of the present invention, circuitry and method of utilizing a rotating shift register to generate programmable modulated random noise including tapped outputs of cells in the shift register each tap capable of generating fixed amounts of noise.

Further in accordance with a preferred embodiment of the present invention, the noise generated by each cell is conditioned by the binary data output of the cell wherein, the rotating data sequence in the shift register is computed to generate a predetermined range of random noise.

There is also provided in accordance with a preferred embodiment of the present invention, a method for at least partially preventing leakage of secret information as a result of a probing operation on a cryptocomputer performing modular exponentiation, the method includes anticipating specific clock cycles in an iteration wherein the average current consumption is less than a maximum value and partially masking this lowered average energy consumption with a random superfluous temporal consumption of energy whose average value is similar to the difference between the anticipated lowered average energy consumption.

There is further provided in accordance with a preferred embodiment of the present invention, a method for accelerated loading of data, from a plurality of memory addresses in a CPU having an accumulator, to a memory-mapped destination, the method includes the steps of: setting the memory-mapped destination to read said data, sending data which is desired to be loaded into the memory-mapped destination, from the memory address to the accumulator, and subsequent to such data having been snared by the memory-mapped destination, setting the memory-mapped destination to cease reading said data.

There is also provided in accordance with a preferred embodiment of the present invention, a method for accelerated loading of data from a memory-mapped source to a plurality of memory addresses associated with a CPU, the method includes the steps of: sending a first command from the CPU to disable the CPU's accumulator's connection to the CPU's data bus, and thereby providing a cue to the memory-mapped source to unload its data onto the data bus to be read by the memory at addresses specified in, performing a series of subsequent move from accumulator to specific memory destination commands, when at each command data is moved from the source address to the specific memory destination address; and until, a data batch has been transferred, after which a command is transmitted by the CPU to re-enable the accumulator's data connection with said data bus; and also to cause the memory-mapped destination to cease unloading its data onto the data bus.

BRIEF DESCRIPTION OF THE DRAWINGS

The present invention will be understood and appreciated from the following detailed description, taken in conjunction with the drawings in which:

FIG. 4 is a table showing stages of operation of a division of a dividend by a divisor using the division apparatus of FIG. 2, for an example wherein the effective bit-length of the divisor is half of the effective bit-length of the dividend; and FIG. 5 is a table showing stages of operation of a division of a dividend by a divisor using the division apparatus of FIG. 2, for an example wherein the effective bit-length of the divisor is less than half of the effective bit-length of the dividend.

FIG. 6B is a block diagram of the operational unit, 6206, of FIG. 6A according to an embodiment of the invention;

FIG. 11 is a table showing that the borrow-bit from the comparator, 6480, of FIG. 6B, at the 2k'th effective clock bit of the last iteration of a square or multiply operation preceding a squaring serves as the Most Significant Bit of the PLUSPR register when $B^Y=B+N$;

DESCRIPTION OF PREFERRED EMBODIMENTS

Figure 1A:
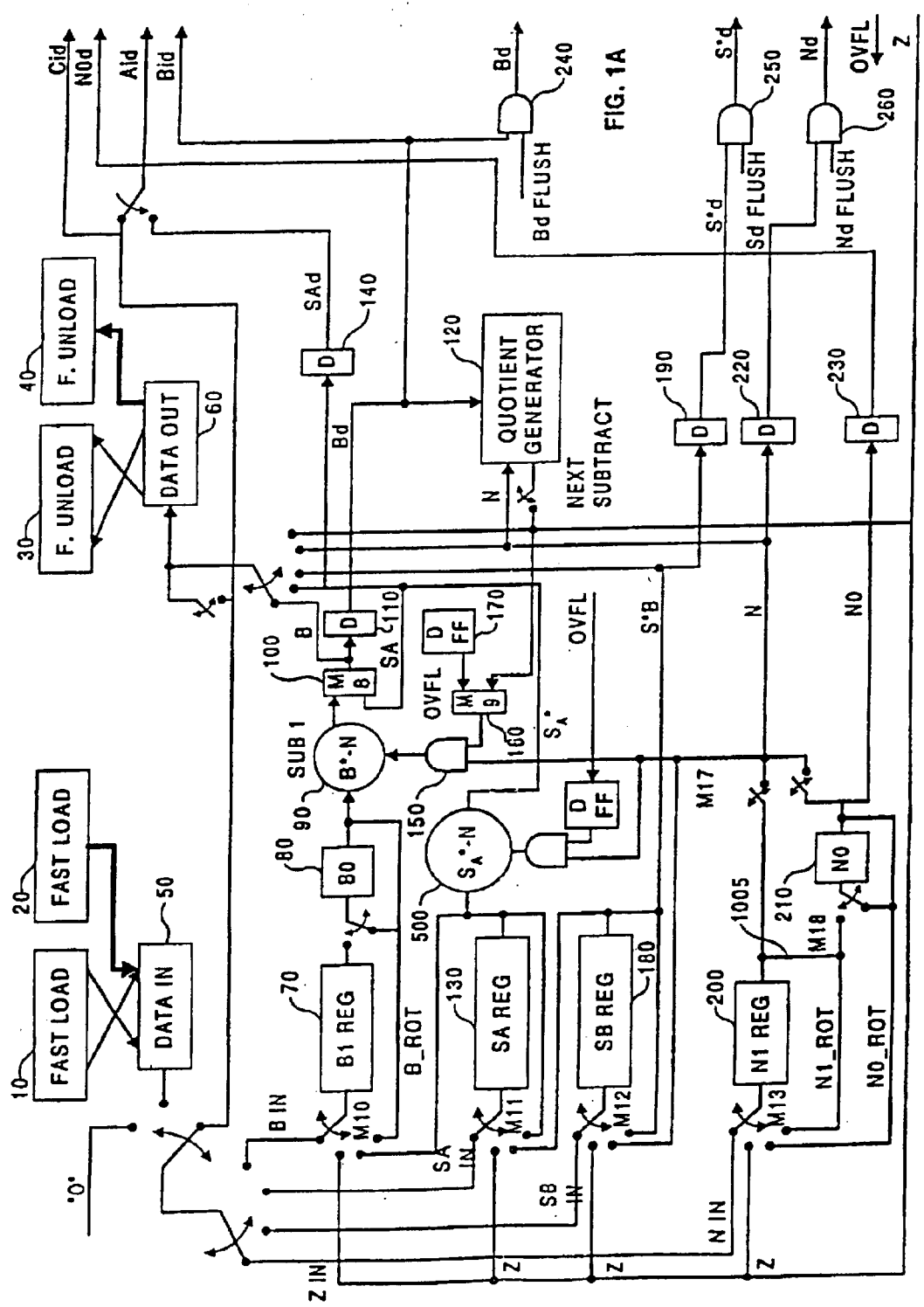
FIGS. 1A–1B, taken together, form a simplified block diagram of a serial-parallel super scalar arithmetic logic unit (ALU) constructed and operative in accordance with one embodiment of the present invention.
Figure 1B:
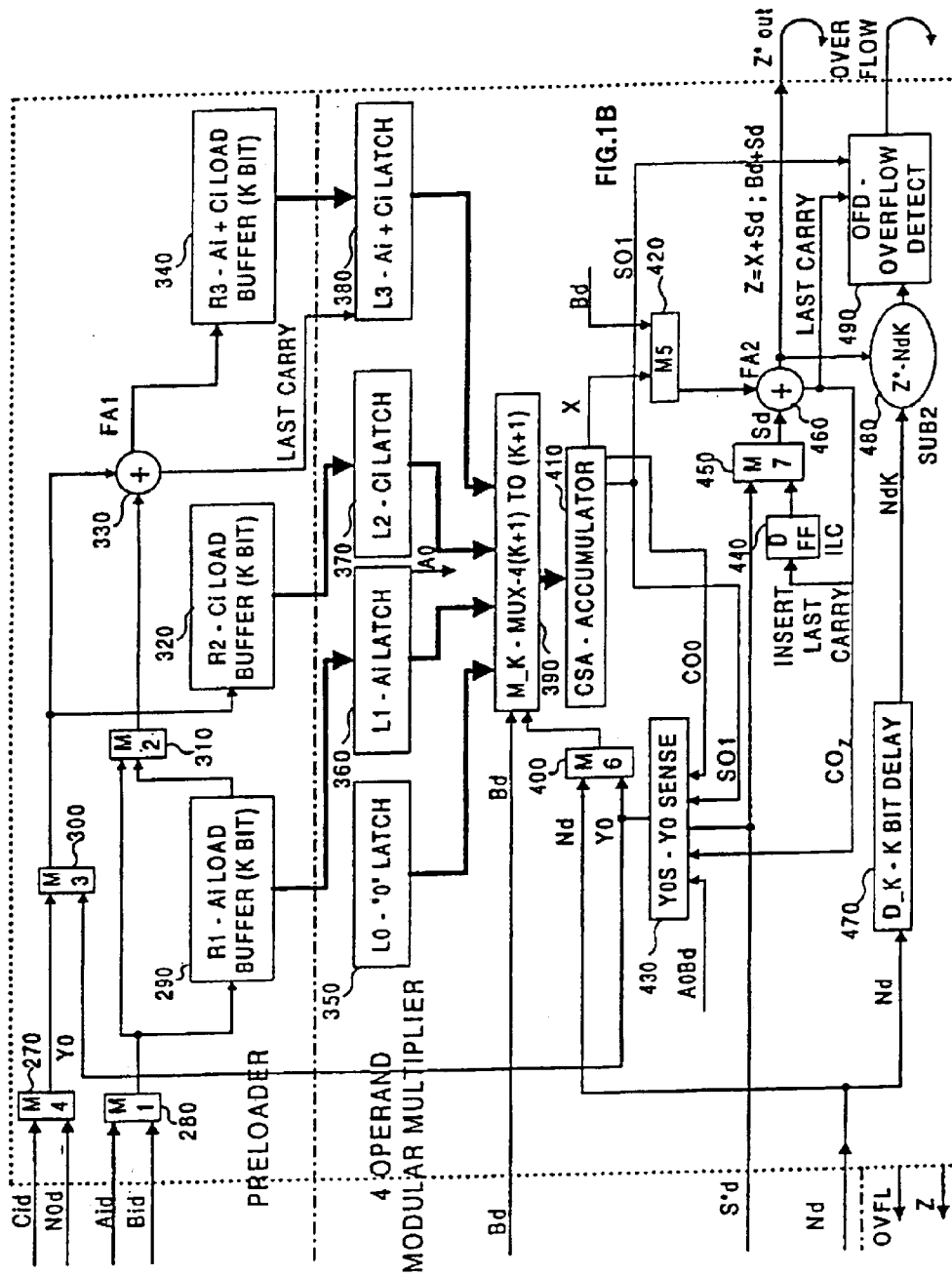

FIGS. 1A–1B, taken together, form a simplified block diagram of a serial-parallel arithmetic logic unit (ALU) constructed and operative in accordance with a preferred embodiment of the present invention. The apparatus of FIGS. 1A–1B, preferably include the following components:

Single Multiplexers—Controlled Switching Elements which select one signal or bit stream from a multiplicity of inputs of signals and direct it this chosen signal to a single output. Multiplexers are marked M1 to M13, and are intrinsic parts of larger elements.

M_K Multiplexer, 390, is an array of k+1 single multiplexers, and chooses which of the four k or k+1 inputs are to be added into the CSA, 410.

The B (1000), $S_A$ (130), $S_B$ (180), and N (1005) are the four main serial main registers in a preferred embodiment. The $S_A$ is conceptually and practically redundant, but can considerably accelerate very long number computations, and save volatile memory resources, especially in the case where the length of the modulus is 2·k·m bits long, and also simplify long division computations.

Serial Adders and Serial Subtractors are logic elements that have two serial inputs and one serial output, and summate or perform subtraction on two long strings of bits. Components 90 and 480 are subtractors, 330, and 460 are serial adders. The propagation time from input to output is very small. Serial subtractor 90 reduces B* to B if B* is larger than or equal to N. Serial Subtractor 480, is used, as part of a comparator component to detect if B* will be larger than or equal to N. Full Adder 330, adds the two bit streams which feed the Load Buffer 340, with a value that is equal to the sum of the values in the 290 and 320 Load Buffers.

Fast Loaders and Unloaders, 10 and 20, and 30 and 40, respectively, are devices to accelerate the data flow from the CPU controller. This can comprise of DMA or other hardware accelerators, in a preferred embodiment. 20 and 40 are for reversing the data word, as is necessary for reconciling the division input and output of FIG. 2.

Data In, 50, is a parallel in serial out device, as the present ALU device is a serial fed systolic processor, and data is fed in, in parallel, and processed in serial.

Data Out, 60, is a serial in parallel out device, for outputting results from the coprocessor. The quotient generator is that part of FIG. 2 which generates a quotient bit at each iteration of the dividing mechanism.

Flush Signals on Bd, 240; on S*d, 250; and on Nd, 260, are made to assure that the last k+1 bits can flush out the CSA, as the alternative would be a complicated k+1 bit parallel output element to retrieve the MS k+1 bits of the accumulator.

Load Buffers R1, 290; R2, 320; and R3, 340 are serial in parallel out shift registers adapted to receive the three possible more than zero multiplicand combinations. Latches L1, 360; L2, 370; and L3, 380; are made to receive the outputs from the load buffers, thereby allowing the load buffers, the temporal enablement to process the next phase of data before this data is preferably latched into L2, L2, and L3.

Y0 Sense, 430, is the logic device which determines the number of times the modulus is accumulated, in order that a k bit string of LS zeros will exit at Z in Montgomery Multiplications and squares.

One bit delay devices 100, 220 and 230 are inserted in the respective data streams to accommodate for synchronization problems between the data preparation devices in FIG. 1A, and the data processing devices in FIG. 1B.

The k bit delay, shift register, 470, assures that if $Z/2^k$ is larger than or equal to N, the comparison of $Z/2^k$ and N will be made with synchronization.

The Carry Save Accumulator is almost identical to a serial/parallel multiplier, excepting for the fact that three different larger than zero values can be summated, instead of the single value as usually is latched onto the input of the s/p multiplier.

The Insert Last Carry, 440, is used to insert the mk+1'th bit of the S stream, as the S register is only mk bits long.

The borrow/overflow detect, 490, can either detect if a result is larger than or equal to the modulus (from N), or if the mk'th bit is a one.

The control mechanism is not depicted, but is preferably understood to be a set of cascaded counting devices, with switches set for systolic data flow.

For modular multiplication in the prime and composite prime field of numbers, we define A and B to be the multiplicand and the multiplier, and N to be the modulus which is usually larger than A or B. N also denotes the register where the value of the modulus is stored. N, may, in some instances, be smaller than A. We define A, B, and N as m·k=n bit long operands. Each k bit group will be called a character, the size of the group defined by the size of the multiplying device. Then A, B, and N are each m characters long. For ease in following the step by step procedural explanations, assume that A, B, and N are 512 bits long, (n=512); assume that k is 64 bits long because of the present cost effective length of such a multiplier, and data manipulation speeds of simple CPUs; and m=8 is the number of characters in an operand and also the number of iterations in a squaring or multiplying loop with a 512 bit operand. All operands are positive integers. More generally, A, B, N, n, k and m may assume any suitable values.

In non-modular functions, the N and S registers can be used for temporary storage of other arithmetic operands.

We use the symbol, ≡, to denote congruence of modular numbers, for example 16≡2 mod 7, and we say 16 is congruent to 2 modulo 7 as 2 is the remainder when 16 is divided by 7. When we write Y mod N≡X mod N; both Y and X may be larger than N; however, for positive X and Y, the remainders will be identical. Note also that the congruence of a negative integer Y, is Y+uN, where N is the modulus, and if the congruence of Y is to be less than N, u will be the smallest integer which will give a positive result.

We use the symbol, ¥, to denote congruence in a more limited sense. During the processes described herein, a value is often either the desired value, or equal to the desired value plus the modulus. For example X¥2 mod 7. X can be equal to 2 or 9. We say X has limited congruence to 2 mod 7.

When we write X=A mod N, we define X as the remainder of A divided by N; e.g., 3=45 mod 7.

In number theory the modular multiplicative inverse is a basic concept. For example, the modular multiplicative inverse of X is written as $X^{-1}$, which is defined by $XX^{-1}$ mod N=1. If X=3, and N=13, then $X^{-1}$=9, i.e., the remainder of 3·9 divided by 13 is 1.

The acronyms MS and LS are used to signify most significant and least significant when referencing bits, characters, and full operand values, as is conventional in digital nomenclature.

Throughout this specification N designates both the value N, and the name of the shift register which contains N. An asterisk superscript on a value, denotes that the value, as stands, is potentially incomplete or subject to change. A is the value of the number which is to be exponentiated, and n is the bit length of the N operand. After initialization when A is "Montgomery normalized" to $A^*$ ($A^*=2^n A$—to be explained later) $A^*$ and N are constant values throughout the intermediate step in the exponentiation. During the first iteration, after initialization of an exponentiation, B is equal to $A^*$. B is also the name of the register wherein the accumulated value which finally equals the desired result of exponentiation resides. $S^*$ designates a temporary value, and S, $S_A$ and $S_B$ designate, also, the register or registers in which all but the single MS bit of S is stored. ($S^*$ concatenated with this MS bit is identical to S.) S(i−1) denotes the value of S at the outset of the i'th iteration; So denotes the LS character of an S(i)'th value.

We refer to the process, (defined later) P(A·B)N as multiplication in the P field, or sometimes, simply, a multiplication operation.

As we have used the standard structure of a serial/parallel multiplier as the basis for constructing a double acting serial parallel multiplier, we differentiate between the summating part of the multiplier, which is based on carry save accumulation, (as opposed to a carry look ahead adder, or a ripple adder, the first of which is considerably more complicated and the second very slow), and call it a carry save adder or accumulator, and deal separately with the preloading mechanism and the multiplexer and latches, which allow us to simultaneously multiply A times B and C times D, summate both results, e.g., A·B+C·D, converting this accumulator into a very powerful engine. Additional logic is added to this multiplier in order to provide for an anticipated sense operation necessary for modular reduction and serial summation necessary to provide powerful modular arithmetic and ordinary integer arithmetic on very large numbers.

Montgomery Modular Multiplication

In a classic approach for computing a modular multiplication, A·B mod N, the remainder of the product A·B is computed by a division process. Implementing a conventional division of large operands is more difficult to perform than serial/parallel multiplications.

Using Montgomery's modular reduction method, division is essentially replaced by multiplications using two precomputed constants. In the procedure demonstrated herein, there is only one precomputed constant, which is a function of the modulus. This constant is, or can be, computed using this ALU device.

A simplified presentation of the Montgomery process, as is used in this device is now provided, followed by a complete preferred description.

If we have an odd number (an LS bit one), e.g., 10100001 (=$81_{10}$) we can always transform this odd number to an even number (a single LS bit of zero) by adding to it another fixing, compensating odd number, e.g., 1111 (=$15_{10}$); as 1111+1010001=1100000 ($96_{10}$). In this particular case, we have found a number that produced five LS zeros, because we knew in advance the whole string, 81, and could easily determine a binary number which we could add to 81, and would produce a new binary number that would have as many LS zeros as we might need. This fixing number is be odd, else it has no effect on the progressive LS bits of a result.

If our process is a clocked serial/parallel carry save process, where it is desired to have a continuous number of LS zeros, and wherein at each clock cycle we only have to fix the next bit, at each clock it is sufficient to add the fix, if the next bit would potentially be a one or not to add the fix if the potential bit were to be a zero. However, in order not to cause interbit overflows (double carries), this fix is preferably summated previously with the multiplicand, to be added into the accumulator when the relevant multiplier bit is one, and the Y Sense also detects a one.

Now, as in modular arithmetic, we only are interested in the remainder of a value divided by the modulus, we know that we can add the modulus any number of times to a value, and still have a value that would have the same remainder. This means that we can add $YN=\Sigma y_i 2^i N$ to any integer, and still have the same remainder; Y being the number of times we add in the modulus, N, to produce the required LS zeros. As described, the modulus that we add can only be odd. Methods exist wherein even moduli are defined as $2_i$ times the odd number that results when i is the number of LS zeros in the even number.

The problem solved by the Montgomery interleaved variations, is aimed at reducing the limited storage place we have for numbers, and the cost effective size of the multipliers. This is especially useful when performing public key cryptographic functions where we are constantly multiplying one large integer, e.g., n=1024 bit, by another large integer; a process that would ordinarily produce a double length 2048 bit integer.

We can add in Ns (the modulus) enough times to A·B=X or A·B+S=X during the process of multiplications (or squaring) so that we will have a number, Z, that has n LS zeros, and, at most, n+1 MS bits.

We can continue using such numbers, disregarding the LS n bits, if we remember that by disregarding these zeros, we have divided the desired result by $2_n$.

When the LS n bits are disregarded, and we only use the most significant n (or n+1) bits, then we have effectively multiplied the result by $2^{-n}$, the modular inverse of $2_n$. If we would subsequently re-multiply this result by $2^n$ mod N (or $2^n$) we would obtain a value congruent to the desired result (having the same remainder) as A·B+S mod N. As is seen, using MM, the result is preferably multiplied by $2^{2n}$ to overcome the $2^{-n}$ parasitic factor reintroduced by the MM.

Example:

A·B+S mod N=(12·11+10)mod 13=(1100·1011+1010)$_2$ mod $1011_2$.

We will add in $2_i$ N whenever a fix is necessary on one of the n LS bits.

```
        B     1011
x       A     1100
add S         1010
add A(0) · B       0000
              ----  sum of LS bit = 0 not add N
add 2⁰ (N·0)       0000
sum                0101  →0 LS bit leaves carry save adder
add A(1) · B       0000
              ----  sum of LS bit 0 - add N
add 2¹(N−1)        1101
sum           1001       →0 LS bit leaves CS adder
add A(2) · B  1011
              ----  sum LS bit = 0 don't add N
add 2²(N·0)   0000
sum           1010       →0 LS bit leaves CS adder
add A(3) · B  1011
              ----  sum LS bit = 1 add N
add 2³(N−1)   1101
sum           10001      →0 LS bit leaves CS adder
And the result is 10001 0000₂mod 13=17·2⁴ mod 13.
As 17 is larger than 13 we subtract 13, and the result is:
    17 · 2⁴ = 4 · 2⁴ mod 13.
``` formally $2^{-n}(AB+S) \bmod N = 9(12 \cdot 11+10) \bmod 13 = 4$

In Montgomery arithmetic we utilize only the MS non-zero result (4) and effectively remember that the real result has been divided by $2^n$; n zeros having been forced onto the MM result.

We have added in $(8+2) \cdot 13 = 10 \cdot 13$ which effectively multiplied the result by $2^4 \bmod 13 \equiv 3$. In effect, had we used the superfluous zeros, we can say that we have performed, $A \cdot B+Y \cdot N+S—(12 \cdot 11+10 \cdot 13+10)$ in one process, which will be described possible on a preferred embodiment.

Check—$(12 \cdot 11+10) \bmod 13=12$, $4 \cdot 3=12$.

In summary, the result of a Montgomery Multiplication is the desired result multiplied by $2^{-n}$.

To retrieve the previous result back into a desired result using the same multiplication method, we would have to Montgomery Multiply the previous result by $2^{2n}$, which we will call H, as each MM leaves us with a parasitic factor of $2^{-n}$.

The Montgomery Multiply function $P(A \cdot B)_N$ performs a multiplication modulo N of the A·B product into the P field. (In the above example, where we derived 4). The retrieval from the P field back into the normal modular field is performed by enacting P on the result of $P(A \cdot B)_N$ using the precomputed constant H. Now, if $P \equiv P(A \cdot B)_N$, it follows that $P(P \cdot H)_N \equiv A \cdot B \bmod N$; thereby performing a normal modular multiplication in two P field multiplications.

Montgomery modular reduction averts a series of multiplication and division operations on operands that are n and 2n bits long, by performing a series of multiplications, additions, and subtractions on operands that are n or n+1 bits long. The entire process yields a result which is smaller than or equal to N. For given A, B and odd N there is always a Q, such that A·B+Q·N will result in a number whose n LS bits are zero, or:

$$P \cdot 2^n = A \cdot B + Q \cdot N$$

This means that we have an expression 2n bits long, whose n LS bits are zero.

Now, let $I \cdot 2^n \equiv 1 \bmod N$ (I exists for all odd N). Multiplying both sides of the previous equation by I yields the following congruences:
from the left side of the equation:

$$P \cdot I \cdot 2^n \equiv P \bmod N; \text{ (Remember that } I \cdot 2^n \equiv 1 \bmod N)$$

and from the right side:

$$A \cdot B \cdot I + Q \cdot N \cdot I \equiv AB \cdot I \bmod N; \text{ (Remember that } Q \cdot N \cdot I \equiv 0 \bmod N)$$

therefore:

$$P \equiv A \cdot B \cdot I \bmod N.$$

This also means that a parasitic factor $I=2^{-n} \bmod N$ is introduced each time a P field multiplication is performed. We define the P operator such that:

$$P \equiv A \cdot B \cdot I \bmod N \equiv P(A \cdot B)_N.$$

and we call this "multiplication of A times B in the P field", or Montgomery Multiplication.

The retrieval from the P field can be computed by operating P on P·H, making:

$$P(P \cdot H)_N \equiv A \cdot B \bmod N;$$

We can derive the value of H by substituting P in the previous congruence. We find:

$$P(P \cdot H)_N \equiv (A \cdot B \cdot I)(H)(I) \bmod N;$$

(see that $A \cdot B \cdot I \leftarrow P$; $H \leftarrow H$; $I \leftarrow$ and any multiplication operation introduces a parasitic I)

If H is congruent to the multiple inverse of $I^2$ then the congruence is valid, therefore:

$$H = I^{-2} \bmod N \equiv 2^{2n} \bmod N$$

(H is a function of N and we call it the H parameter)

In conventional Montgomery methods, to enact the P operator on A·B, the following process may be employed, using the precomputed constant J:

1) $X = A \cdot B$
2) $Y = (X \cdot J) \bmod 2^n$ (only the n LS bits are necessary)
3) $Z = X + Y \cdot N$
4) $S = Z/2^n$ (The requirement on J is that it forces Z to be divisible by $2^n$)
5) $P \not\equiv S \bmod N$ (N is to be subtracted from S, if $S \geq N$)

Finally, at step 5):

$$P \equiv P(A \cdot B)_N,$$

[After the subtraction of N, if necessary:

$$P = P(A \cdot B)_N.]$$

Following the above:

$$Y = A \cdot B \cdot J \bmod 2^n \text{ (using only the } n \text{ LS bits);}$$

and:

$$Z = A \cdot B + (A \cdot B \cdot J \bmod 2^n) \cdot N.$$

In order that Z be divisible by $2^n$ (the n LS bits of Z are preferably zero) and the following congruence will exist:

$$[A \cdot B + (A \cdot B \cdot J \bmod 2^n) \cdot N] \bmod 2^n = 0$$

In order that this congruence will exist, $N \cdot J \bmod 2^n$ are congruent to −1 or:

$$J = -N^{-1} \bmod 2^n.$$

and we have found the constant J.

J, therefore, is a precomputed constant which is a function of N only. However, in a machine that outputs a MM result, bit by bit, provision should be made to add in Ns at each instance where the output bit in the LS string would otherwise have been a zero, thereby obviating the necessity of precomputing J and subsequently computing Y=A·B·J mod $2^n$, as Y can be detected bit by bit using hardwired logic. We have also described that this methodic can only work for odd Ns.

Therefore, as is apparent, the process described employs three multiplications, one summation, and a maximum of one subtraction, for the given A, B, N, and a precomputed constant to obtain P(A·B)N. Using this result, the same process and a precomputed constant, H, (a function of the module N) we are able to find A B mod N. As A can also be equal to B, this basic operator can be used as a device to square or multiply in the modular arithmetic.

Interleaved Montgomery Modular Multiplication

The previous section describes a method for modular multiplication which involved multiplications of operands which were all n bits long, and results which required 2n+1 bits of storage space.

Using Montgomery's interleaved reduction (as described in the aforementioned paper by Dussé), it is possible to perform the multiplication operations with shorter operands, registers, and hardware multipliers enabling the implementation of an electronic device with relatively few logic gates.

First we will describe how the device can work, if at each iteration of the interleave, we compute the number of times that N is added, using the $J_0$ constant. Later, we describe how to interleave, using a hardwire derivation of $Y_0$, which will eliminate the $J_{0+}$ phase of each multiplication {2} in the following example}, and enable us to integrate the functions of two separate serial/multipliers into the new single generic multiplier which can perform A·B+C·N+S at better than double speed using similar silicon resources.

Using a k bit multiplier, it is convenient to define characters of k bit length, there are m characters in n bits; i.e., m·k=n.

$J_0$ will be the LS character of J.
Therefore:

$$J_0 = -N_0^{-1} \mod 2^k \ (J_0 \text{ exists as } N \text{ is odd}).$$

Note, the J and $J_0$ constants are compensating numbers that when enacted on the potential output, tell us how many times to add the modulus, in order to have a predefined number of least significant zeros. We will later describe an additional advantage to the present serial device; since, as the next serial bit of output can be easily determined, we can always add the modulus (always odd) to the next intermediate result. This is the case if, without this addition, the output bit, the LS serial bit exiting the CSA, would have been a "1"; thereby adding in the modulus to the previous even intermediate result, and thereby promising another LS zero in the output string. Remember, congruency is maintained, as no matter how many times the modulus is added to the result, the remainder is constant.

In the conventional use of Montgomery's interleaved reduction, P(A·B)N is enacted in m iterations as described in steps (1) to (5):

Initially S(0)=0 (the ¥ value of S at the outset of the first iteration).
For i=1, 2 . . . m:
1) X=S(i−1)+$A_{i-1}$·B ($A_{i-1}$ is the i−1 th character of A; S(i−1) is the value of S at the outset of the i'th iteration.)
2) $Y_0 = X_0 \cdot J_0 \mod 2^k$ (The LS k bits of the product of $X_0 \cdot J_0$)
(The process uses and computes the k LS bits only, e.g., the least significant 64 bits)

In the preferred implementation, this step is obviated, because in a serial machine $Y_0$ can be anticipated bit by bit.
3) Z=X+$Y_0$·N
4) S(i)=Z/$2^k$ (The k LS bits of Z are always 0, therefore Z is always divisible by $2^k$. This division is tantamount to a k bit right shift as the LS k bits of Z are all zeros; or as will be seen in the circuit, the LS k bits of Z are simply disregarded.
5) S(i)=S(i) mod N (N is to be subtracted from those S(i)'s which are larger than N).

Finally, at the last iteration (after the subtraction of N, when necessary), C=S(m)=P(A·B)N.

To derive F=A·B mod N, the P field computation, P(C·H)N, is performed

It is desired to know, in a preferred embodiment, that for all S(i)'s, S(i) is smaller than 2N. This also means, that the last result (S(m)) can always be reduced to a quantity less than N with, at most, one subtraction of N.

We observe that for operands which are used in the process:

S(i−1)<$2^{n+1}$ (the temporary register can be one bit longer than the B or N register), B<N<$2^n$ and $A_{i-1}$<$2^k$.
By definition:

$$S(i)=Z/2^k$$

(The value of S at the end of the process, before a possible subtraction)
For all Z, Z(i)<$2^{n+k+1}$.

$$X_{max}=S_{max}+A_i B<2^{n+1}-1+(2^k-1)(2^n-1)$$

$$Q_{max}=Y_0 N<(2^k-1)(2^n-1)$$

therefore:

$$Z_{max}<2^{k+n+1}-2^{k+1}+1<2^{k+n+1}-1.$$

and as $Z_{max}$ is divided by $2^k$:

$$S(m)<2^{n-1}-2^1.$$

Because $N_{min}>2^n-2$, $S(m)_{max}$ is always less than 2·$N_{min}$, and therefore, one subtraction is all that is necessary on a final result.

$$S(m)_{max}-N_{min}=(2^{n+1}-2^1-1)-(2^n-1)=2^n-4<N_{min}.$$

Example of a Montgomery interleaved modular multiplication:

The following computations in the hexadecimal format clarify the meaning of the interleaved method:
N=a59, (the modulo), A=99b, (the multiplier), B=5c3 (the multiplicand), n=12, (the bit length of N), k=4, (the size in bits of the multiplier and also the size of a character), and m=3, as n=k·m.
$J_0$=7 as 7·9≡−1 mod 16 and H≡$2^{2 \cdot 12}$ mod a59≡44b.
The expected result is F≡A·B mod N 99b·5c3 mod a59≡375811 mod a59=$220_{16}$.
Initially: S(0)=0
Step 1

$$X=S(0)+A_0 \cdot B=0+b5c3=3f61$$

$$Y_0=X_0 \cdot J_0 \mod 2^k=7 \ (Y_0\text{-hardwire anticipated in new MAP})$$

$$Z=X+Y_0 \cdot N=3f61+7 \cdot a59=87d0$$

$$S(1)=Z/2^k=87d$$

Step 2

$X=S(1)+A_1 \cdot B=87d+9 \cdot 5c3=3c58$ $Y_0=X_0 \cdot J_0 \bmod 2^k=8.7 \bmod 2^4=8$ (Hardwire anticipated)

$Z=X+Y_0 \cdot N=3c58+52c8=8f20$ $S(2)=Z/2^k=8f2$

Step 3

$X=S(2)+A_2 \cdot B=8f2+9 \cdot 5c3=3ccd$ $Y_0=d \cdot 7 \bmod 2^4=b$ (Hardwire anticipated)

$Z=X+Y_0 \cdot N=3ccd+b \cdot a59=aea0$ $S(3)=Z/2^k=aea$, as $S(3)>N$, $S(m)=S(3)-N=aea-a59=91$ Therefore $C=P(A \cdot B)N=91_{16}$.
Retrieval from the P field is performed by computing $P(C \cdot H)N$:
Again initially: $S(0)=0$
Step 1

$X=S(0)+C_0 \cdot H=0+1 \cdot 44b=44b$ $Y_0=d$ (Hardwire anticipated in new MAP)

$Z=X+Y_0 \cdot N=44b+8685=8ad0$ $S(1)=Z/2^k=8ad$

Step 2

$X=S(1)+C_1 \cdot H=8ad+9 \cdot 44b=2f50$ $Y_0=0$ (Hardwire anticipated in new MAP)

$Z=X+Y_0 \cdot N=2f50+0=2f50$ $S(2)=Z/2^k=2f5$

Step 3

$X=S(2)+C_2 \cdot H=2f5+0 \cdot 44b=2f5$ $Y_0=3$ (Hardwire anticipated in new MAP)

$Z=X+Y_0 \cdot N=2f5+3 \cdot a59=2200$ $S(3)=Z/2^k=220_{16}$ which is the expected value of 99b 5c3 mod a59.
If at each step we disregard k LS zeros, we are in essence multiplying the n MS bits by $2^k$. Likewise, at each step, the i'th segment of the multiplier is also a number multiplied by $2^{ik}$, giving it the same rank as S(i).

It can also be noted that in another preferred embodiment, wherein it is of some potential value to know the $J_0$ constant,
Exponentiation The following derivation of a sequence [D. Knuth, *The art of computer programming*, vol. 2: Seminumerical algorithms, Addison-Wesley, Reading Mass., 1981] hereinafter referred to as "Knuth", explains a sequence of squares and multiplies, which implements a modular exponentiation.

After precomputing the Montgomery constant, $H=2^{2n}$, as this device can both square and multiply in the P field, we compute:

$C=A^E \bmod N$.

Let E(j) denote the j bit in the binary representation of the exponent E, starting with the MS bit whose index is 1 and concluding with the LS bit whose index is q, we can exponentiate as follows for odd exponents:

$A^*\Psi P(A \cdot H)N$ $A^*$ is now equal to $A \cdot 2^n$.

$B=A^*$

FOR j=2 TO q-1

$B\Psi P(B \cdot B)N$

IF E(j)=1 THEN $B\Psi P(B \cdot A^*)N$

ENDFOR $B\Psi P(B \cdot A)N$ E(0)=1; B is the last desired temporary result multiplied by $2^n$, A is the original A.

C=B

C=C-N if C≧N.

After the last iteration, the value B is ¥ to $A^E$ mod N, and C is the final value.

To clarify, we shall use the following example:

$E=1011 \rightarrow E(1)=1; E(2)=0; E(3)=1; E(4)=1;$

To find $A^{1011}$ mod N; q=4

$A^*=P(A \cdot H)N=AI^{-2}I=AI^{-1}$ mod N $B=A^*$

FOR j=2 to q $B=P(B \cdot B)N$ which produces: $A^2(I^{-1})^2 \cdot I = A^2 \cdot I^{-1}$ $E(2)=0; B=A^2 \cdot I^{-1}$ $j=3 \; B=P(B \cdot B)N=A^2(I_{-1})^2 \cdot I=A^4 \cdot I^{-1}$ $E(3)=1 \; B=P(B \cdot A^*)N=(A^4 \cdot I^{-1})(AI^{-1}) \cdot I=A^5 \cdot I^{-1}$ $j=4 \; B=P(B \cdot B)N=A^{10} \cdot I^{-2} \cdot I=A^{10} \cdot I^{-1}$ As E(4) was odd, the last multiplication will be by A, to remove the parasitic $I^{-1}$.

$B=P(B \cdot A)N=A^{10} \cdot I^{-1} \cdot A \cdot I=A^{11}$ $C=B$

A method for computing the H parameter by a reciprocal process is described in U.S. Pat. No. 5,513,133.
A Long Division Process FIG. 2 illustrates a preferred embodiment of a deterministic processing device for performing long division, using the data manipulation devices available on the processor of FIG. 1A.

Figure 2:
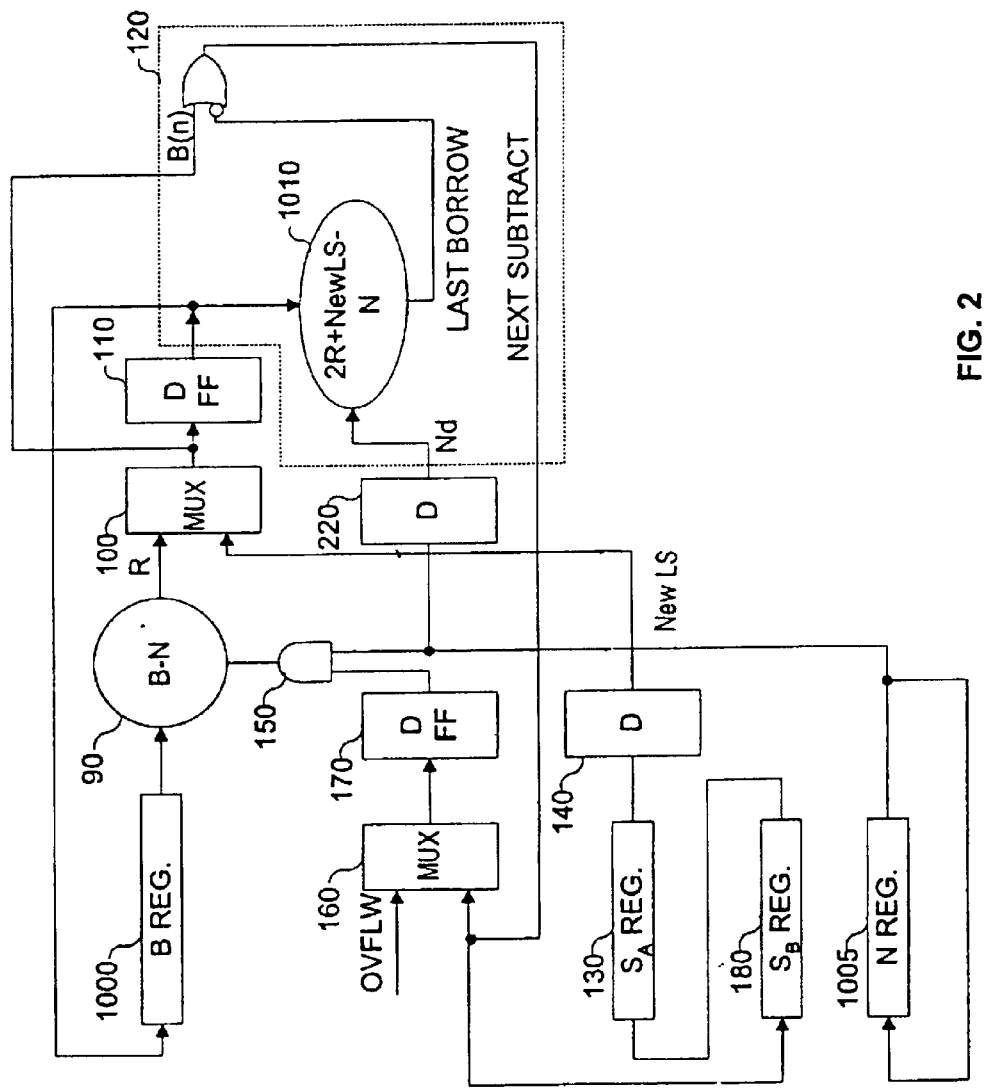
FIG. 2 is a simplified block diagram of a preferred implementation of the serial integer division apparatus of FIG. 1A which is also useful separately for serial integer division applications, particularly for very large numbers.

FIGS. 4 and 5 are examples of the operation of the apparatus of FIG. 2.

In a division process, wherein the divisor, d, is in the range of d, $2^{n-1}<d<2^n$; and the dividend, D, is in the range of D, $2^{2n-1}<D<2^{2n}$; the apparatus is used most simply. d is preloaded into the N right-shift register, 1005 (a concatenation of the $N_0$ and the $N_1$ registers, 210 and 200) in FIG. 2, the MS n bits of the dividend, D, are preloaded in the B right-shift register, (1000), and the n LS bits of D are reverse loaded into the $S_A$ right shift register (130). This is essentially, as one would arrange digits for manual long division realizing that the new LS bits are fed from $S_A$ to $S_B$ at each new trial subtraction. The $S_B$ register is preloaded with all zeros.

In the initialization iteration, the overflow flip flop 170 of FIG. 2 is initially reset. The N register, which now contains the divisor, d, is trial subtracted from B, the MS bits of D, whilst both the B and N registers are rotated; wherein their outputs are fed into the serial subtractor 90, whose output is B-fN, f=1 for subtract, f=0, for don't subtract. The quotient generator, 120, is a detector which determines if B≧N, and transmits a NEXT SUBTRACT which determines if d will be subtracted from B, in 90, in the next iteration; this signal is a one, if, and only if, B is larger than or equal to N. This NEXT SUBTRACT bit denotes success, and is the most significant bit of the quotient, and is also clocked into the $S_B$ register, 180. As this is clocked into the $S_B$ register, a zero is shifted out of the $S_B$ register, into the $S_A$ register, forcing a NEW LS BIT out of the $S_A$ register. Note, that as these registers are all right shift registers, both the quotient in $S_B$ and the dividend value in $S_A$, are held in reverse order.

In the next iterations, at the first effective clock cycle, a NEW LS BIT, shifted out of the $S_A$ precedes the output, R, of 90, thereby multiplying R by 2 and adding the value of the NEW LS BIT to 2R. This concatenated value is rotated back into the B register, and is also tested in 120, to determine if on the next round f=1 or f=0.

Finally, the remainder is in the B register, n bits of the quotient are in the $S_B$ register and the most significant bits of the quotient are in the $S_A$ register.

The most significant one of both the dividend and the divisor is preferably in the most significant bit cells of the B register and the N register, for all sizes of D and d. The number of iterations necessary to obtain a result is decreased for Ds which are smaller than $2^{2n-1}$, and is increased for ds which are smaller than $2^{n-1}$. The device is hardware driven, and firmware compensations may be provided for shifting operands when unloading the device.

Figure 3:
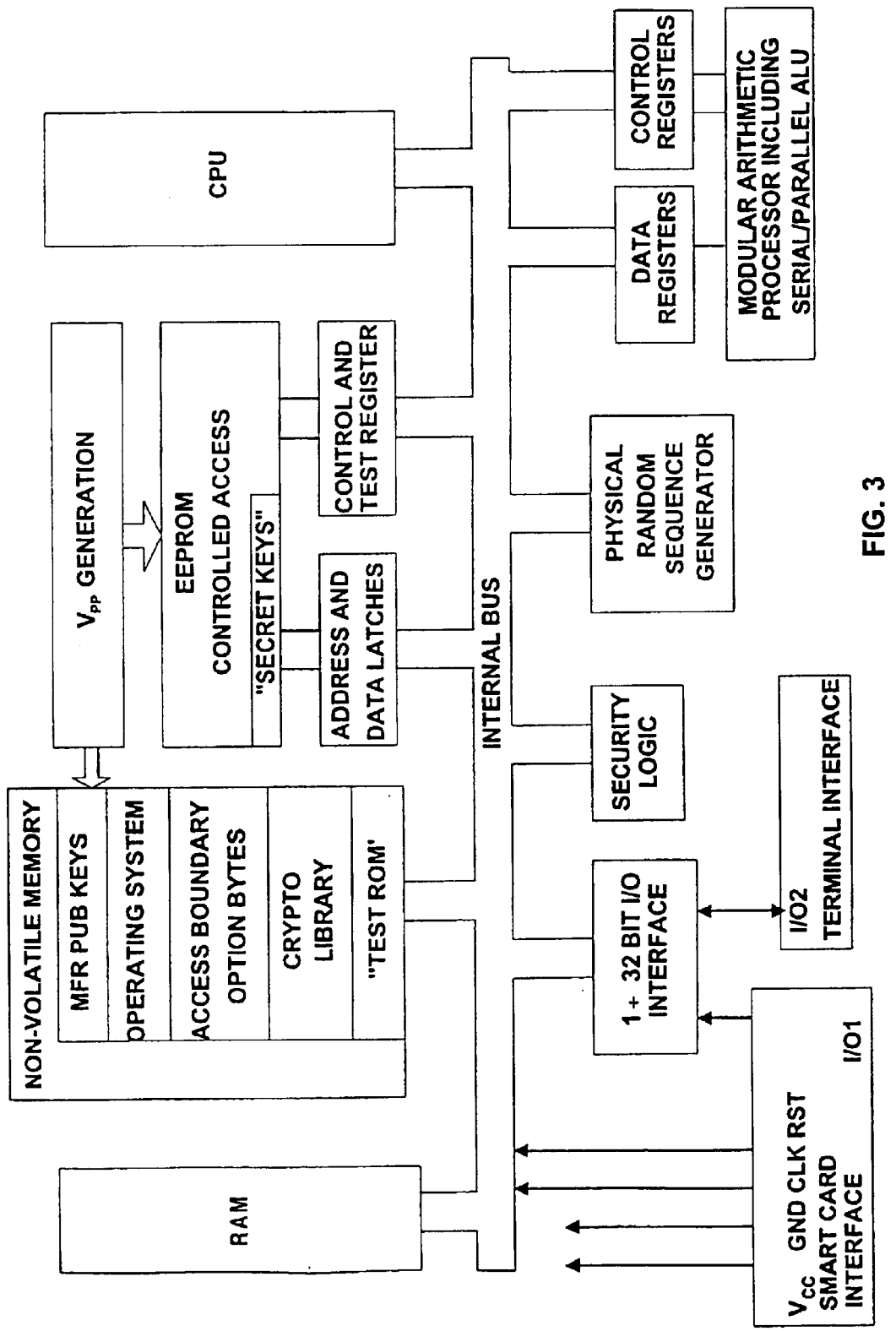
FIG. 3 is a simplified block diagram of a public key crypto-computer for smart cards or terminals which includes the serial-parallel arithmetic logic unit of FIGS. 1A–1B.

The program residing in the non-volatile memory of FIG. 3, preferably ascertains that the registers are loaded, and defines for the control register, a number of iterations necessary for a successful division process. The quotient bits are reversed, byte by byte, when processed through the reverse data out unloader, units 60 and 40.

This processor is an element useful for computing the H Parameter, and also is preferably used in computations of the Euclidean functions.

The serial integer division apparatus of FIG. 1A and the double acting multiplier of FIG. 1B which performs A×B+ C×D+S, typically do not operate simultaneously.

In the example of FIG. 4, the dividend B is 187 (10111011), the divisor N is 7 (111), and once division is carried out, the quotient is found to be 20 (10100) and the remainder is found to be 7 (111).

In the example of FIG. 5, the dividend B is 173 (10101 101), the divisor N is 5 (101), and once division is carried out, the quotient is found to be 34 (100010) and the remainder is found to be 3 (11).

A carry-save accumulator is illustrated in FIG. 5 of U.S. Pat. No. 5,513,133 to Gressel.

A serial full adder is illustrated in FIG. 7 of the above-referenced U.S. Patent to Gressel.

Figure 8:
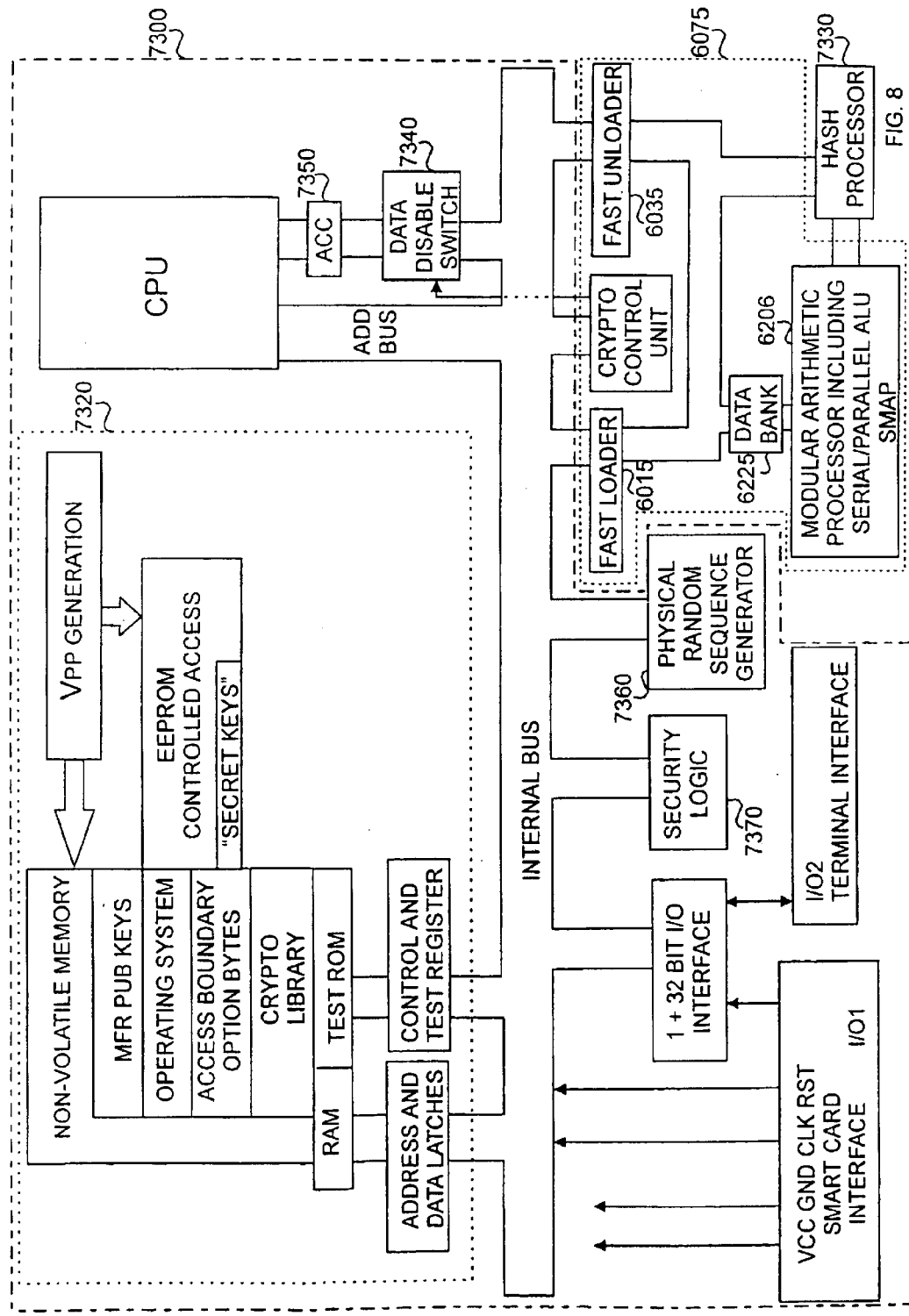
FIG. 8 is a simplified block diagram of a preferred embodiment of a complete single chip, monolithic crypto-computer which typically exists on a smart card wherein a data disable switch typically isolates the accumulator during unloading of the MAP of FIG. 6A.

A serial subtracter is illustrated in FIG. 8 of the above-referenced U.S. Patent to Gressel.

Figure 9:
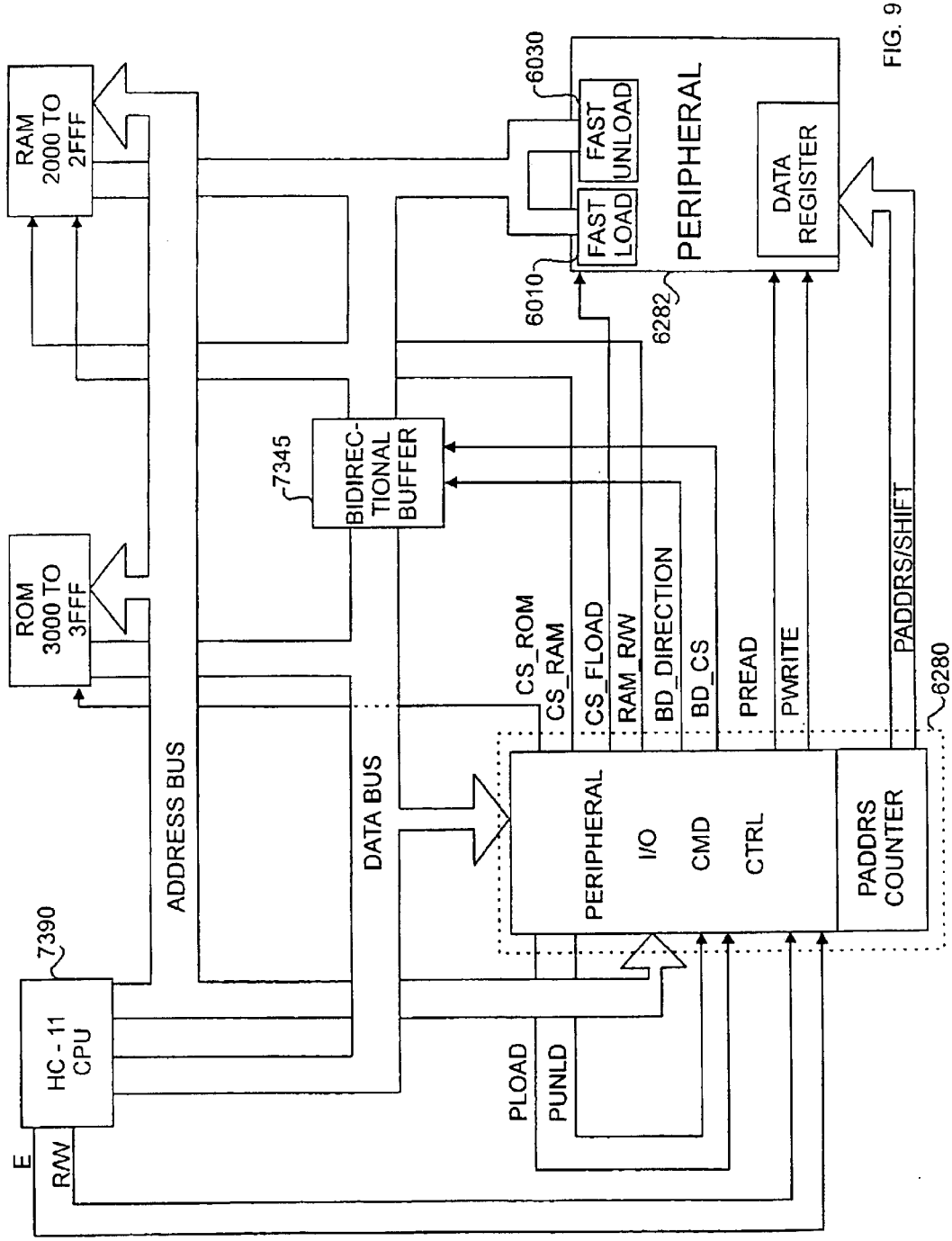
FIG. 9 is a simplified block diagram of a preferred implementation of the loader, unloader apparatus appended to a standard 8 bit CPU, wherein a bi-directional buffer controls the data flowing to and from the CPU, the volatile memory and a peripheral device according to an embodiment of this invention.

Division apparatus is illustrated in FIG. 9 of the above-referenced U.S. Patent to Gressel.

The term "normal field of integers" refers to non-negative integers e.g. natural numbers.

According to a preferred embodiment of the present invention, the system shown and described herein is operative to compute J0 by resetting A and B to zero and setting S0=1.

Figure 6A:
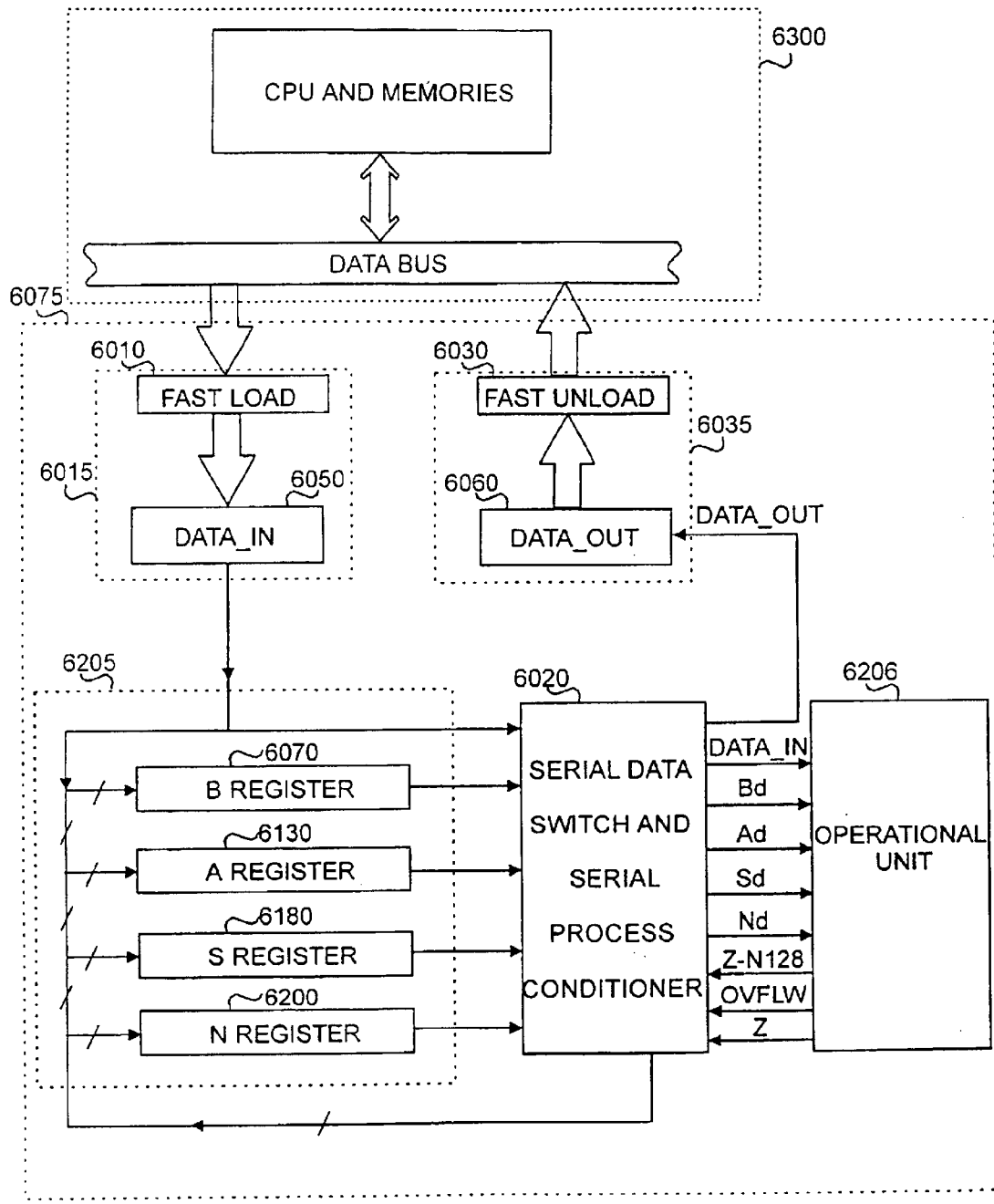
FIG. 6A is a block diagram of the apparatus according to an embodiment of the invention where the four main registers are depicted and the serial data flow path to the operational unit is shown and the input and output data path to the host CPU of FIG. 8.
Figure 7A:
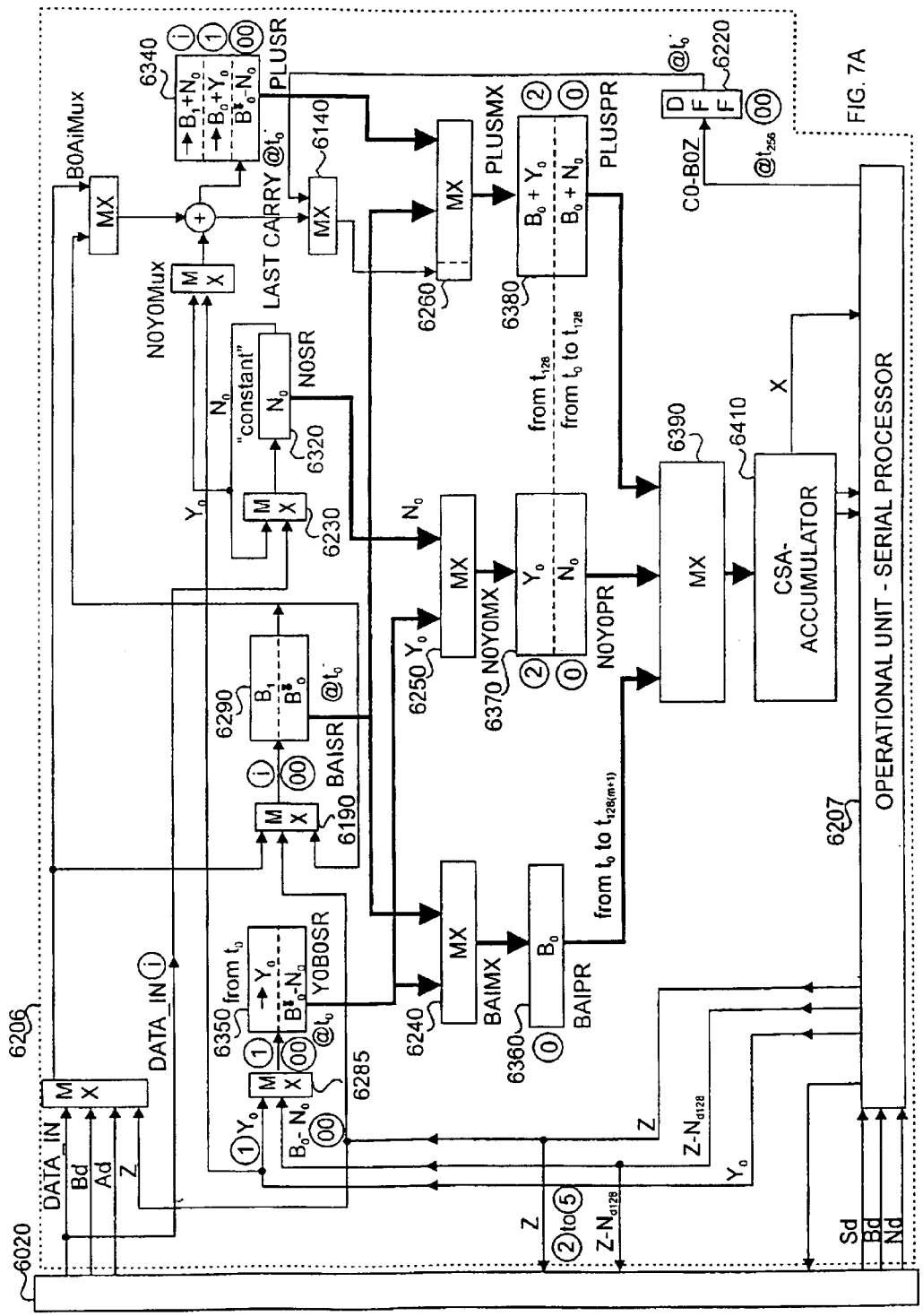
FIG. 7A is a block diagram of the main computational part of FIG. 6B, with circled numbered sequence icons relating to the timing diagrams and flow charts of FIGS. 7B, 7C, and 7D.
Figure 7B:
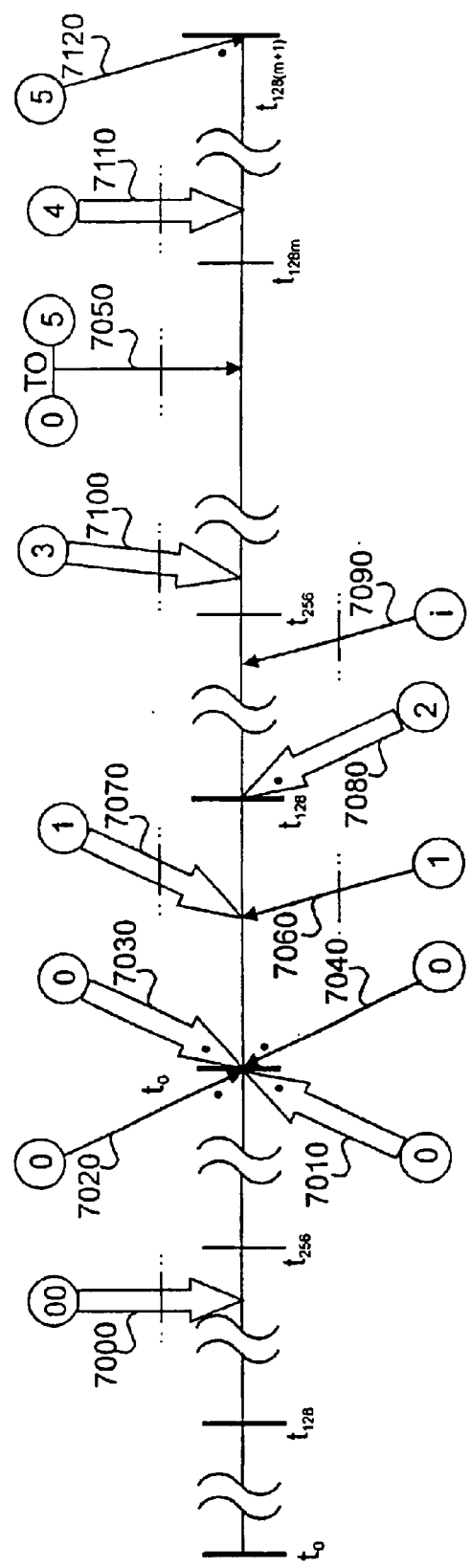
FIG. 7B is an event timing pointer diagram showing progressively the process leading to and including the first iteration of a squaring operation.
Figure 7C:
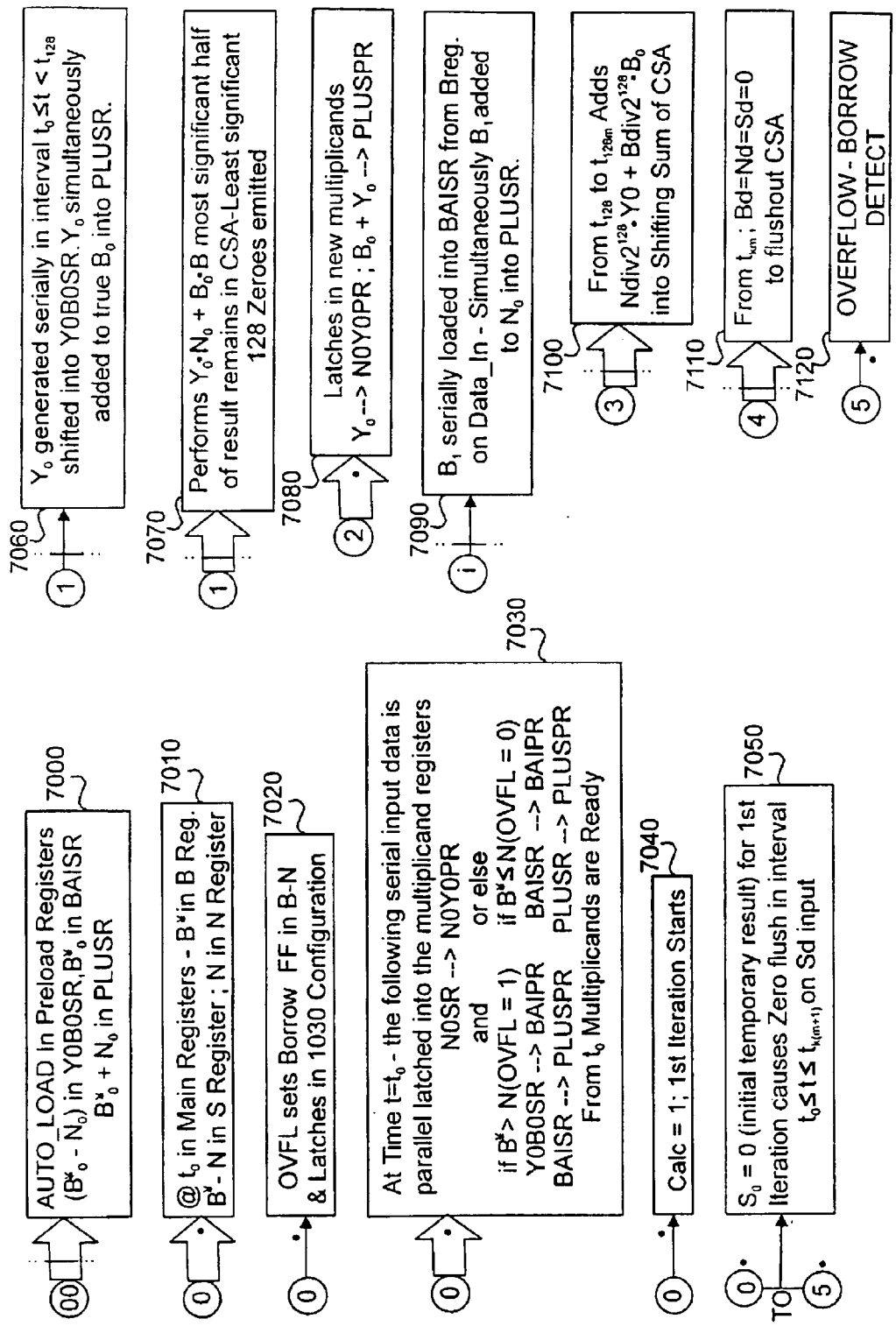
FIG. 7C is a detailed event sequence to eliminate "Next Montgomery Squaring" delays in the first iteration of a squaring sequence with iconed pointers relating to FIG. 7A, FIG. 7B and FIG. 7D.
Figure 7D:
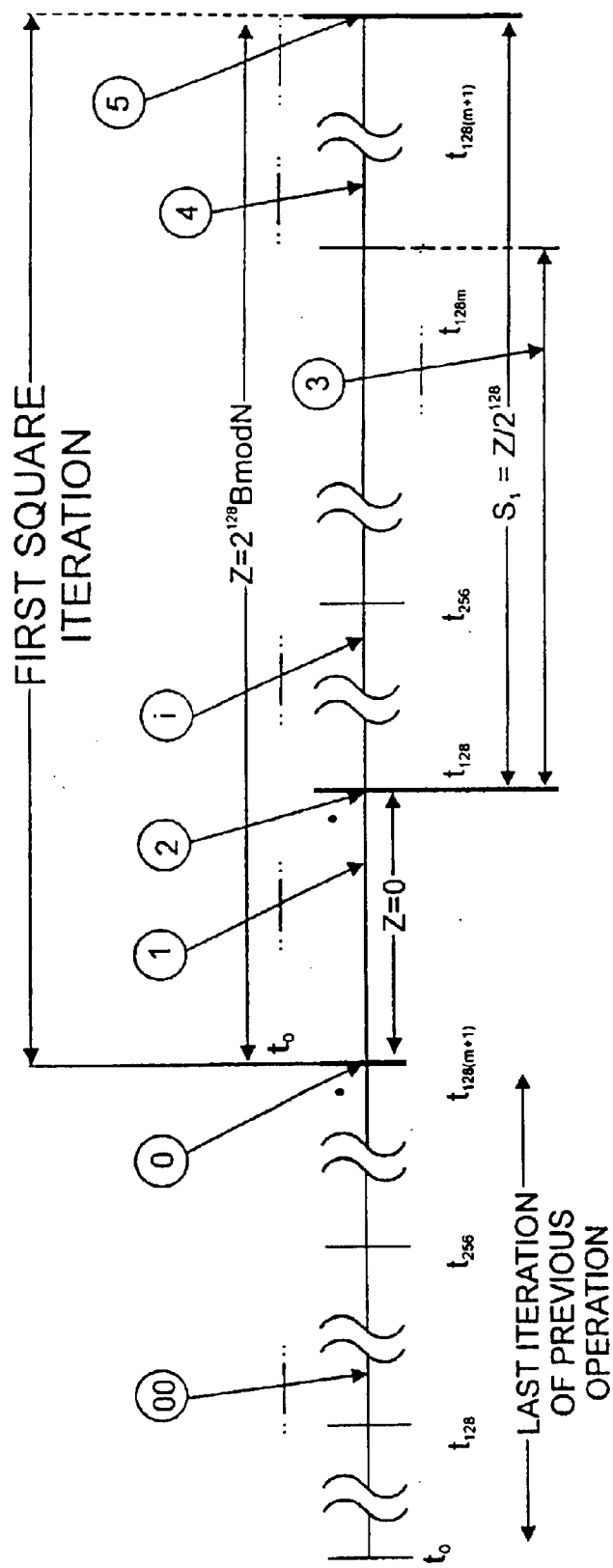
FIG. 7D illustrates the timing of the computational output, relating to FIG. 7A, FIG. 7B, and FIG. 7C.

FIGS. 6A–6B, taken together, form a simplified block diagram of a serial-parallel operational unit constructed and operative in accordance with a preferred embodiment of the present invention. The apparatus of FIGS. 6A–6B, preferably include the following components:

Single Multiplexers—Controlled Switching Elements which select one signal or bit stream from a multiplicity of inputs of signals and direct it this chosen signal to a single output. Conceptually important multiplexers are 6270, 6280, 6285, 6300, 6305, 6400, and 6420. Others are implicitly necessary for synchronizing and controls.

Multiplexers 6240, 6250, and 6260 are respectively composed of k, k, and k+1 bit cells, 6390, is an array of k+1 single multiplexers, and chooses which of the four k or k+1 inputs are to be added into the CSA, 6410.

The B (6070), S (6180), A(6130) and N (6200) are the four main serial main registers in a preferred embodiment. In a preferred embodiment, these registers are fragmented in a flexible multiplexing regime, commensurate to the lengths of operands and the bit length of CSA.

Serial Adders and Serial Subtractors are logic elements that have two serial inputs and one serial output, and summate or perform subtraction on two long strings of bits.

Fast Loaders and Unloaders, 6015, and 6030, respectively, are devices to accelerate the data flow from the CPU controller. The method of snaring data from the data bus, and forcing values into the data bus at rates preferably at more than double the speed as is normal in simple CPU controllers, is a subject of this patent.

Figure 14A:
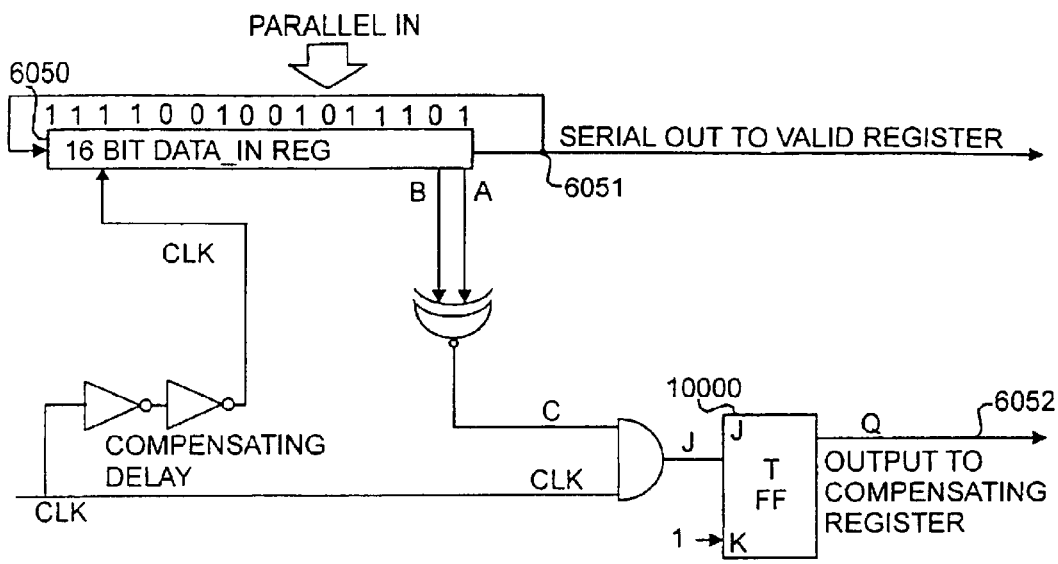
FIG. 14A is a simplified block diagram of an optional add-on to a parallel non-complemented data source such as DATA_IN, 6050, of FIG. 6A, operative to emit the inputted data to a valid register, and pseudo-data to a compensating register, thereby to achieve a close balance of signal and pseudo signal subsequently emitting from the two data receiving registers.
Figure 14D:
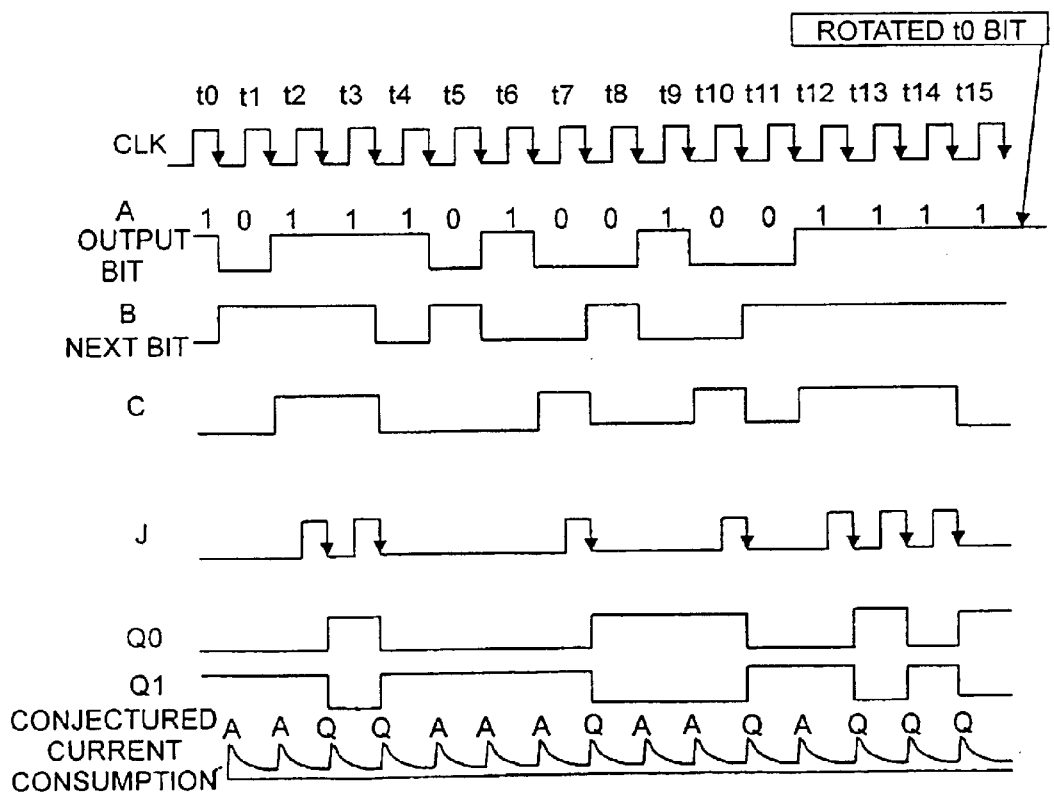
FIG. 14D is a timing diagram of the input, intermediate, and output signals of the add-on apparatus of FIG. 14A, showing conjectured current consumption where at each clock cycle there is a literal change in either the valid register or the compensating register.
Figure 14B:
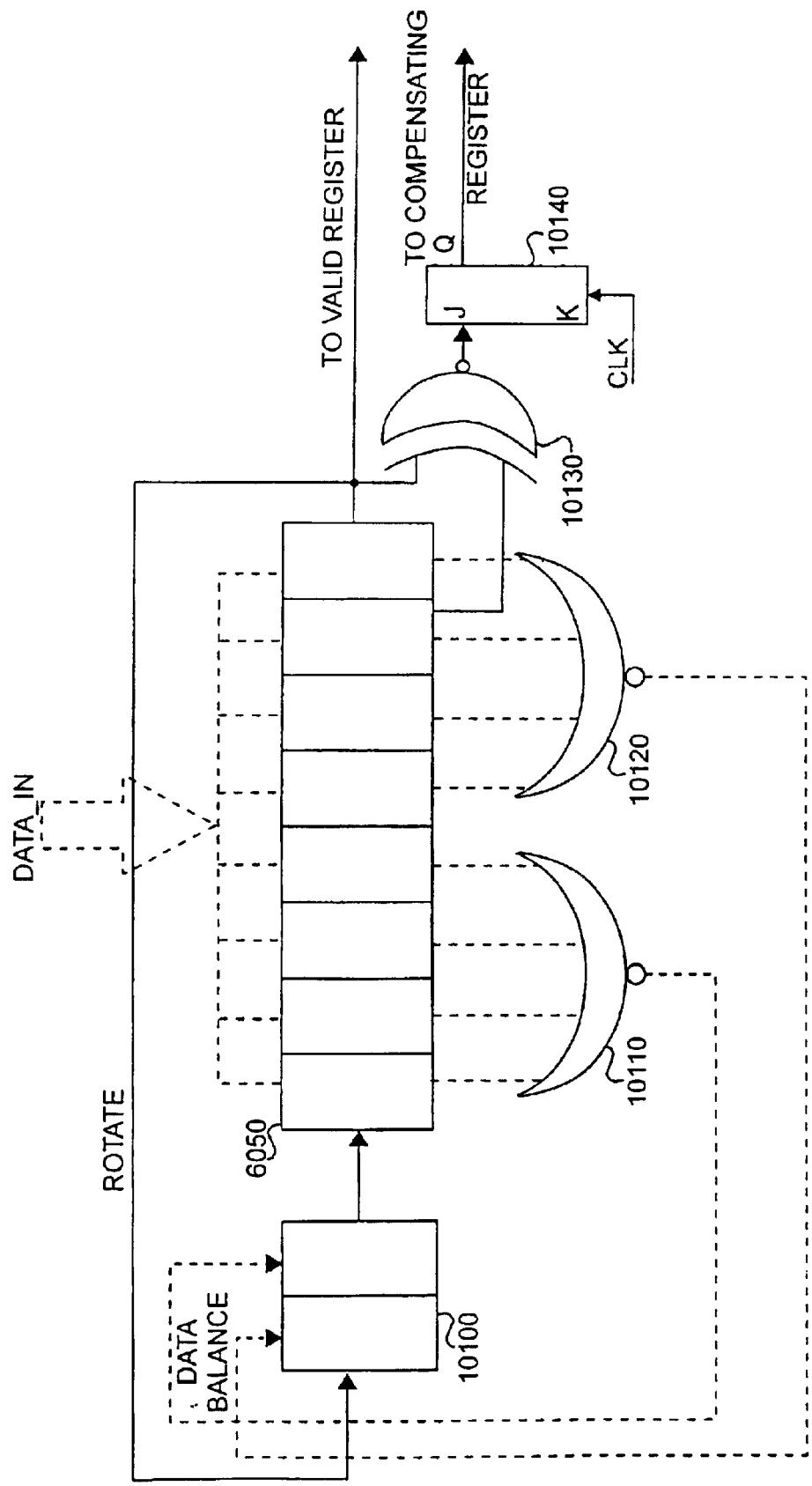
FIG. 14B is a simplified block diagram of an optional add-on to the DATA_IN, 6050, register of FIG. 6A, operative to mask received signal from an uncomplemented data source, to emit balanced signal and pseudo-signal from the rotating shift register, and to emit inputted data to a valid register, via 6051, and pseudo-data to a compensating register, via 6052, thereby to achieve a close balance of signal and pseudo signal emitting from the two data receiving registers.
Figure 14C:
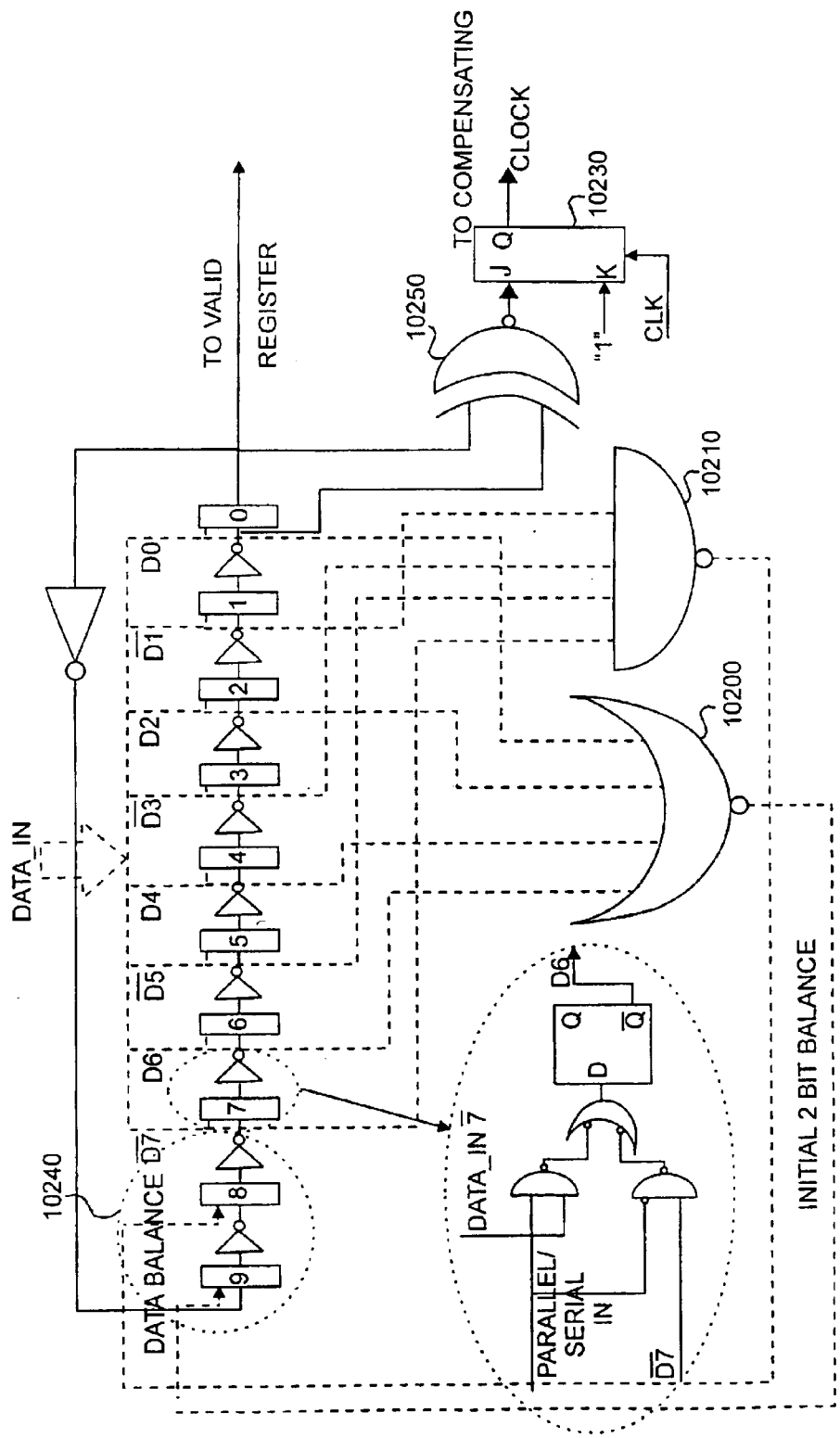
FIG. 14C is a simplified block diagram of an optional add-on to a data receiving register as of FIG. 6A, operative to mask received signal from and a semi-complemented data source, wherein alternate data bits are complemented, to emit balanced signal and pseudo-signal from the rotating shift register, and to emit the inputted data to a valid register, and pseudo-data to a compensating register, as in FIG. 14B, thereby to achieve a close balance of signal and pseudo signal emitting from the two data receiving registers.

Data In, 6050, is a parallel in serial out device, as the present specialized arithmetic logic device which is a serial fed systolic processor, and data is fed in, in parallel, and processed in serial. Methods for loading the Data_In register which typically lower the signal levels used in non-invasive current analysis are shown in FIGS. 14A, 14B, and 14C.

Data Out, 6060, is a serial-in/parallel-out device, for outputting results from the coprocessor to the CPU's memory. Identical methods for minimizing non-invasive current analysis as in FIGS. 14A, 14B, and 14C can be used to conceal data transfer values.

Flush Signals on Bd, on Sd and on Nd are made to assure that the last k+1 bits preferably flush out the MS data from the CSA.

Preload Buffers, 6350, 6290; 6320; and 6340 are serial-in parallel-out shift registers adapted to receive four possible multiplicand combinations.

Multiplicand Latches 6360; 6370; and 6380; are made to receive the outputs from the preload buffers, thereby allowing the load buffers, the temporal enablement to process the next phase of data before this data is preferably latched in as operands.

Y0 Sense, 6430, is the logic device which determines the number of times the modulus is accumulated, in order that a k bit string of LS zeros is typically emitted at Z in Montgomery Multiplications and Squares.

The k bit delay, shift register, 6470, assures that if $Z/2^k$ is larger than or equal to N, the comparison of $Z/2^k$ and N is typically made with synchronization.

The Carry Save Accumulator is almost identical to a serial/ parallel multiplier, as appears in U.S. Pat. No. 5,513,133, excepting for the fact that three different larger than zero values can be summated, instead of the single value as usually is latched onto the input of a serial/parallel multiplier.

The overflow detect, 6490, can either detect if a result is larger than or equal to the modulus, or alternately if an overflow has occurred in a natural field integer procedure.

The Serial Data Switch and Serial Process Conditioner is a logic array which switches data segments from operand registers, 6070, 6130, 6180, 6200 and synchronizes and otherwise conditions their contents including executing modular (¥) reduction.

The control mechanism is not depicted, but is preferably understood to be a set of cascaded counting devices, with switches set for systolic data flow, organized in a set of "finite state machines", FSMs.

As the standard structure of a serial/parallel multiplier is used as the basis for constructing a double acting serial parallel multiplier, a differentiation is made between the summating part of the multiplier, which is based on carry save accumulation, (as opposed to a carry look ahead adder, or a ripple adder, the first of which is considerably more complicated and the second very slow), and call it a carry save adder or accumulator, and deal separately with the preloading mechanism and the multiplexer and latches, which enable simultaneous multiplication of A times B and $Y_0$ times N, and summate both results, e.g., $A \cdot B + Y_0 \cdot D$, converting this accumulator into a powerful engine. Additional logic is added to this multiplier in order to provide for an anticipated sense operation necessary for modular reduction and serial summation necessary to provide modular arithmetic and ordinary integer arithmetic on very large numbers, e.g. 1024 bit lengths.

In a preferred embodiment, the register bank, 6205, of FIG. 6A is composed of a plurality of independent segments. The registers in the data bank unit in the first industrial embodiment are 128 bits long.

In a preferred embodiment, wherein composite moduli are used for secret cryptographic transformations while exponentiating over base A, in the computations of $A^d$ mod $(p \cdot q)$, e.g., $RS_A$ signatures, the Chinese Remainder Theorem (CRT) is employed. Typically for CRT procedures less than one half of the data segments in the data bank are utilized. These unused data segments can be exploited as random noise generators, and also as addition chain accelerators.

The first iteration of a squaring operation uses three variables as multiplicands, $B_0$, $N_0$, and $B_0+N_0$. (See FIGS. 6B and 7A and sequence diagrams in 7B, 7C, and 7D.) As previously explained, only at the end of the previous iteration, can the MAP detect whether $B^¥$ is equal to B, or to B+N. Remembering that $N_0$ resides in the N0SR, 6320, register during all modular arithmetic operations, it is understood how during this last previous iteration three new values are generated. $B^¥_0 - N_0$ is serially snared and loaded into the Y0B0SR, 6350, preload register, $B^¥_0$ is simultaneously loaded into the BAISR register, 6290, and $B^¥_0 + N_0$, which is a serial summation of the incoming $B^¥_0$ and $N_0$ and is also serially loaded, also simultaneously, into the PLUSR, 6340, register.

At the end of the previous iteration, at phase change delay time to, when the MAP can detect if $B^¥ > N$, it latches $B_0$ into the BAIPR multiplicand register, from either Y0B0SR or BAISR, latches in $N_0$ from the N0SR register into the N0PR register; and latches in $B_0+N_0$ from either the BAISR register or the PLUSR register, as is computationally obvious.

These two values, $B^¥_0$ and $B^¥_0 - N_0$ emanating during the last iteration of the earlier operation, are on-the-fly extricated, both possible values to be the multiplicand for the next squaring operation's first iteration, simultaneously summing the least significant character of the larger multiplicand value, $B^¥_0$, with the least significant character of the modulus, $N_0$, thereby to obtain a least significant portion of a largest multiplicand value which is one modulus value greater than the larger multiplicand value; and from among these three least significant characters, selecting the least significant portions of the two positive multiplicand values as $B_0$ and $B_0+N_0$, relating to the first iteration of the next modular squaring operation.

In a preferred embodiment, during the first k effective clock cycles of a squaring iteration, at each bit of accumulation, one of three values may be added into the accumulation stream emanating from the CSA, 6410; $B_0$, the k LS bits of the multiplier; $N_0$ the k LS bits of the modulus, and the summation of the two, $B_0$ plus $N_0$. $N_0$ is now in a register reserved for itself, ready to be summated with $B_0$ into the PLUSR, 6340, preload buffer, as the $B_0$ stream flows into the $B_0$ preload buffer, BAISR, 6290. However, as the MAP supplies two $B_0$ streams, $B_0^¥$ (the least significant k bit character of $B^¥$ which may be larger than the modulus), and $B_0^¥ - N_0$ which emanates from the serial comparator, Z-Nd128, 6480. In the event that $B^¥$ is larger than the modulus, $B_0^¥$ is equal to the k bit most significant bits of $B_0$ plus $N_0$ and has k+1 significant bits. However, as $B_0$ plus $N_0$ can be larger than k bits, it is shown in the detailed description of FIG. 11 where and how this overflow bit can be extracted.

Transferring data from memory to a memory mapped destination, especially when the CPU has no special function to provide Direct Memory Access (DMA), or when a peripheral device is designed to process data faster than the CPU can transfer to or from the external device, is a common problem. In the MAP which is designed to operate at a clock speed which is typically many times faster than the CPU's clock, failure to accelerate the normal data transfers typically causes data starvation to the MAP. Some computational procedures, which execute small operand computations, e.g., elliptic curve point multiplication over 255 bit moduli, where data is typically loaded and unloaded to at each short iteration, are particularly sensitive to low speed data transfers.

The normal sequence of memory to and from memory mapped peripheral data transfers with compact general purpose CPUs is typically a lengthy procedure. Data is first transferred from one memory site to the accumulator and in a second step the data is moved from the accumulator to another memory-mapped address.

In FIGS. 7A, 7B, 7C, and 7D icons are used to:
a) define "points" in time where changes of phase occur. These icons are arrows with dots near the arrow heads;
b) define procedures that occur over multiples of k effective clock cycles with arrows crossed with broken lines;
c) differentiate between serial procedures, e.g., $Y_0$ sensed bit by bit into the Y0B0SR register, 6350, with single line arrows;
d) define mass data transfers with fat arrows, e.g., latching $N_0$ into the N0Y0PR register;
e) define time with numbered circle icons.

When describing the workings of a preferred embodiment of the MAP synchronization is described in effective clock cycles, referring to those cycles during which the unit is performing an arithmetic operation, as opposed to "real clock cycles". The "real clock cycles" typically include idle cycles while new values are latched into the multiplicand registers in the Operational Unit, or when multiplexers, flip-flops, and other device settings may be altered, in preparation for new phases of operations. See FIG. 7B thick vertical lines on timing diagram, where massive data transfers are enacted.

In a preferred embodiment, a method for executing a Montgomery modular multiplication, wherein the multiplicand A which may be stored either in the CPU's volatile RAM or in the A register, 6130, the multiplier B in the B register 6070, and the modulus N in the N register, 6200; comprise m characters of k bits each, the multiplicand and the multiplier preferably not being greater than the modulus, comprises the steps of:

1) loading the multiplier B into 6070, and the modulus, N, into 6200, and $N_0$ the LS K bit character of N into the N0SR Register, 6320, there 6070 and 6200 are registers of n bit length, wherein n=m·k;
   {multiplying in normal field positive, natural, integers, N can be a second multiplier}
   {if n is larger than the number of [bit] cells in the B, N and S registers, the MAP is stopped at intervals, and values are typically loaded and unloaded in and out of these registers during the execution of an iteration, allowing the apparatus to be virtually capable of manipulating any length of modulus}
2) —setting the output of the register S to zero, in the Serial Process Conditioner, 6210;
3) —resetting extraneous borrow and carry flags (controls, not specified in the patent);
4) executing m iterations, each iteration comprising the following operations:

$$(0<i \leq m-1)$$

a) transferring the next character $A_{i-1}$ of the multiplicand A from external memory or the A register, 130, to the BAISR Load Buffer, 6290.
   b) simultaneously rotating the N0SR register, 6320, thereby outputting $N_0$ (the LS k bits of N), while rotating the contents of the Ai Load Buffer BAISR, 6290, thereby serially adding the contents of the Ai load buffer with $N_0$ into the PLUSR register, 6340.
      The preloading phase ends here. This phase is typically executed whilst the MAP was performing a previous multiplication or squaring. In the normal exponentiation process this phase is preferably consummated whilst the MAP is executing a previous iteration. Processes a) and b) can be executed simultaneously, wherein the $A_{i-1}$ character is loaded into its respective register, whilst the Ai stream is synchronized with the rotation of the $N_0$ register, thereby, simultaneously, the Ai stream and the $N_0$ stream are summated and loaded into the PLUSR register, 6340.
      A novelty of the new device is that the first character values of a squaring operation are preferably loaded before the smallest $B^Y$ positive congruent value of the next B is determined.
      At this preload stage (first iterations of a square only) values are caught serially on the fly and one value, $B^Y_0$, is summated simultaneously with $N_0$ which is resident in the N0SR register, 6320, and the result being deposited in the PLUSR, 6340, register, and $B^Y_0 - N_0$ which is output directly from the comparator 6480, is loaded into the Y0B0SR, 6350, register. At time $t_{256}$ of the last iteration of the previous square or multiply, CO_B0Z, the borrow bit from the comparator 6480, is latched into the 6220, D Flip-Flop, the non-trivial derivation of which was previously explained in the detailed description of FIG. 11.
      Squaring a quantity from the B register, is executed in a similar manner, except that the first $B_0$ characters are preferably preloaded during the previous procedure.
      Subsequent k bit $B_i$ strings are preloaded into the BAISR register, as they are fed serially into the computing section of the Operational Unit of FIG. 7A.
   a) and b) described the initial preloading of values into the Operational Unit, for an iteration. If the operation is a multiplication, a character of Ai resides in the BAISR, 6290, register and its summation with $N_0$ resides in the PLUSR, 6340 register. If the iteration is the first iteration in a squaring operation, at the outset, the borrow-detect (OVFLW from 6490), flags a next value of B to be larger or not larger than the modulus.
      On the first iteration, of a square go to c'),
      else for all other iterations, go to c).
   c) The MAP is stopped. For all iterations, with the exception of the first iteration of a squaring, the contents of preload registers, 6190, 6230, and 6340 are latched into multiplicand registers, 6360, 6370, and 6380, respectively.
   c') The MAP is stopped. For the first iteration of a square, there are two cases,
      if $B^Y$ is larger than N, the modulus
         the contents of Y0B0SR, 6350, ($B_0$) is latched into BAIPR the contents of N0SR, 6320, ($N_0$) is latched into N0PR the contents of BAISR, 6290, ($B_0+N_0$) mod $2^k$ is latched into PLUSPR, with the output of D Flip Flop, 6220, which is latched into the MS bit of PLUSPR, 6380.
      if $B^Y$ is smaller or equal to N
         the contents of BAISR, 6290, ($B_0$) is latched into BAIPR the contents of N0SR, 6320, ($N_0$) is latched into N0PR the contents of PLUSR, 6340, ($B_0+N_0$) is latched into PLUSPR. Both PLUSR and PLUSPR are k+1 bit registers.
   d) for the next k effective clock cycles
      i) at each clock cycle the Y0 SENSE anticipates the next bit of $Y_0$ and loads this bit through multiplexer, 6280, into the 6350 Y0B0SR preload buffer, while shifting out the Bi (or Ai bits), thereby simultaneously loading the Y0B0SR Buffer with k bits of $Y_0$, and simultaneously summating this value with the rotating bits of Bi (or Ai), thereby loading the 6340, PLUSR register with Bi (or Ai) plus $Y_0$.
      ii) simultaneously multiplying N0 (in N0Y0PR) by the incoming Y0 bit, and multiplying Bi (or Ai) by the next incoming bit of Bd, by means of logically choosing through the multiplexer, 6390, the desired value from one of the four values, zero (no operand added into CSA), or the contents of BAIPR, N0Y0PR, or PLUSR, to be added into the CSA. If neither the Y0 bit nor the Bd bit is one, an all zero value is multiplexed into the CSA, if only the Y0 bit is one, N0 alone is multiplexed/added into the CSA, if only the Bd bit is a one, the contents of BAIPR is added into the CSA, if both the Bd bit and the Y0 bit are ones, then the contents of the PLUSPR are added into the CSA.
      iii) then adding to this summation; as it serially exits the Carry Save k+1 Bit Accumulator bit by bit, (the X stream); to the next relevant bit of Sd through the serial adder, 6460.
   These first k bits of the Z stream are zero.
   In this first phase the result of $Y_0N_0+A_{i-1}B_0+S_0$ has been computed, the LS k all zero bits appeared on the Zout stream, and the MS k bits of the multiplying device are saved in the CSA Carry Save Accumulator; and in the 6290, 6350, and 6340 preload buffers reside the values $B_{i-1}$ (or $A_{i-1}$), $Y_0$ and $Y_0+B_{i-1}$ (or $A_{i-1}$), respectively.
   e) after the first k effective clock cycles, the Operating Unit is stopped again, and the preload buffers, Y0B0SR, 6350, and PLUSR, 6340, are latched into N0Y0PR, 6370, and PLUSPR, 6380, respectively (the value in BAIPR is unchanged).

The initial and continuing conditions for the next k(m−1) effective clock cycles are:

the multipliers are the bit streams from Bd, starting from the k'th bit of B and the remaining bit stream from Nd, also starting from the k'th bit of N, the CSA emits the remainder of bits of $Y_0$ times N div $2^k$ which are summated to the last (m−1)k bits of S.

Nd, delayed k clock cycles in unit 6470, is subtracted by a serial subtractor from the Z stream, to sense if the result (which is to go into the B and/or S register) is larger than or equal to N.

f) for these k(m−1) effective clock cycles:

the $N_0$ Register, 6210, is rotated synchronously with incoming Bi or Ai bits, loading BAISR, and PLUSR as described previously.

for these k(m−1) effective clock cycles, the remaining MS bits of N now multiply $Y_0$, the remaining MS B bits continue multiplying $B_{i-1}$ or $A_{i-1}$. If neither the N bit nor the B bit is one, an all zero value is multiplexed into the CSA. If only the Nd bit is one, $Y_0$ alone is multiplexed/added into the CSA. If only the Bd bit is a one, $B_{i-1}$ or $A_{i-1}$ is added into the CSA. If both the Bd bit and the Nd bits are ones, then $B_{i-1}$ (or $A_{i-1}$)+$Y_0$ are added into the CSA.

As simultaneously the serial output from the CSA is added to the next k(m−1) S bits through the adder, unit 6460, which outputs the Z stream;

the $Z/2^k$ output stream being the first non-zero k(m−1) bits of Z.

The Z stream is switched into the S, temporary register, for the first m−1 iterations;

On the last iteration, the Z stream, which, disregarding the LS k zero bits, is the final $B^Y$ stream. This stream is directed to the B register, to be reduced by N, if necessary, as it is used in subsequent multiplications and squares;

On the last iteration, Nd delayed k clock cycles, is subtracted by a serial subtractor from the Z stream, to sense if the result, which goes into B, is larger than or equal to N.

At the end of this stage, all the bits from the N, 6200, B, 6070, and S, 6180 registers have been fed into the operational arithmetic logic unit, FIG. 6B, and the final k+1 bits of result are in the CSA, 6410, ready to be flushed out.

g) the device is stopped. Sd, Bd, and Nd are set to output zero strings, to assure that in the next phase the last k+1 most significant bits are flushed out of the CSA.

If this is the last iteration, Nd, delayed k clock cycles in 6470, is subtracted from the Z stream, synchronized with the significant outputs from X, to sense if the result which goes into the B register is larger than or equal to N. 6480 and 6490 comprise a serial comparator device, where only the last borrow and m−1'th bit are saved.

h) The device is clocked another k cycles, completely flushing out the CSA, the first k−1 bits exiting Z to the output S register, if the result is not final, and to B, if this is the last iteration in the multiplication operation.

i) The overflow sense determines, on the first m−1 iterations, if the MS output bit of S is one, and sets the serial data conditioner, 6020, to modular reduce the values leaving the data register bank, if necessary, on the last iteration the overflow senses if B≧N, and transmits indication to the overflow flip flop on the $B^Y$−N serial subtractor.

j) is this the last iteration
NO, return to c)
YES continue to k)

k) the correct value of the result can exit from Bd, wherein if S(m) was larger than or equal to N, N is subtracted from the stream emitting from the last result.

$Y_0$ bits are anticipated in the following manner in the Y0S-Y0SENSE unit, 6430, from five deterministic quantities:

i the LS bit of the BAIPR Multiplicand Register AND the next bit of the Bd Stream, $A_0 \cdot B_d$;

ii the LS Carry Out bit from the CSA; $CO_0$;

iii the $S_{out}$ bit from the second LS cell of the CSA; $SO_1$;

iv the next bit from the S stream, $S_d$, v the Carry Out bit from the 6460, Full Adder; $CO_Z$;

These five values are XORed together to produce the next $Y_0$ bit; $Y_{0i}$:

$$Y_{0i}=A_0 \cdot B_d \oplus CO_0 \oplus SO_1 \oplus S_d \oplus CO_Z.$$

If the $Y_{0i}$ bit is a one, then another N of the same rank (multiplied by the necessary power of 2), is typically added, otherwise, N, the modulus, is typically not added.

More specifically, the figures depict several layers of logical concepts necessary for understanding the devices in totality. In all cases, the clock signal motivates the control of the circuit, and the resets revert the device to an initial state.

Figure 10:
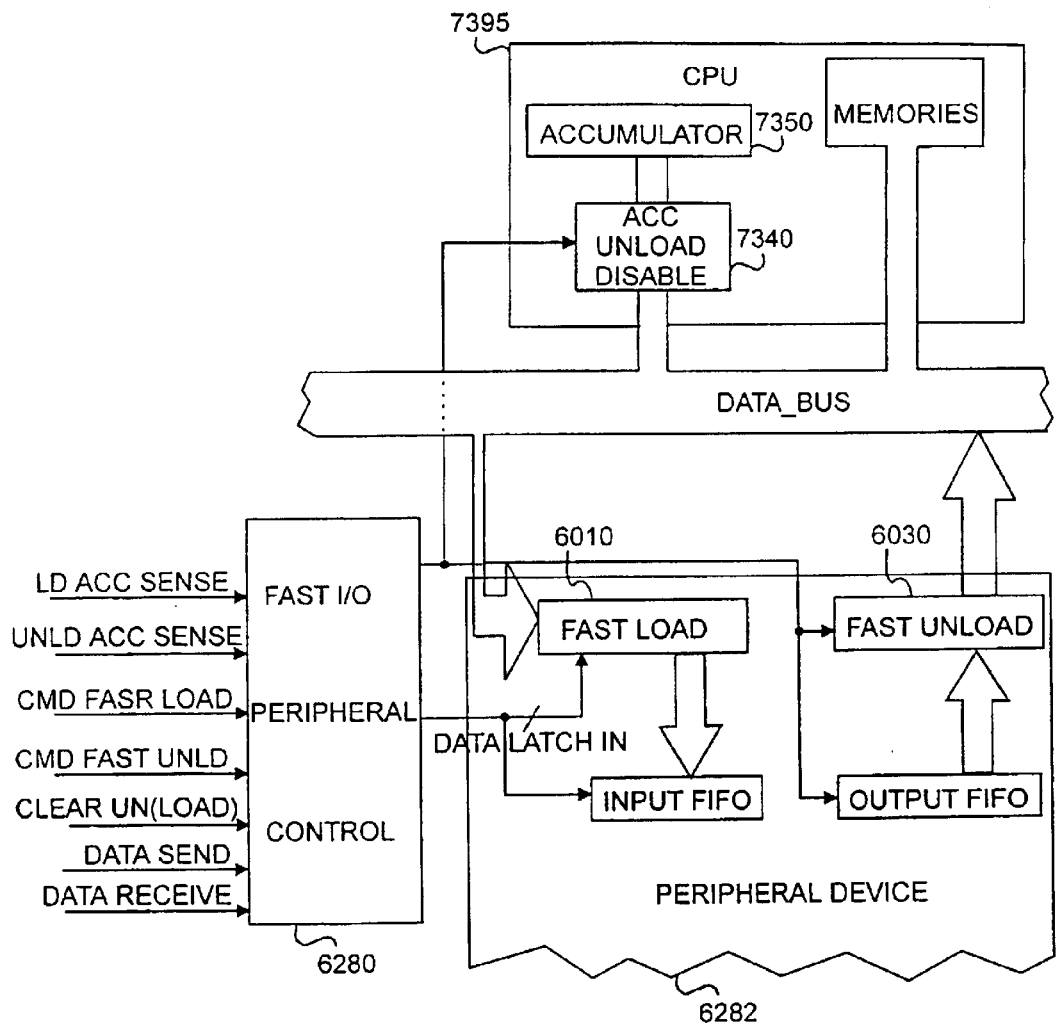
FIG. 10 is a block diagram with explicit controls for moving data into and out of a peripheral device, 6282, as per FIG. 8.

Methods for increasing memory throughput to and from peripherals and hardware configurations are illustrated in FIGS. 8, 9 and 10:

Accelerated data manipulation is preferably implemented between the CPU and this or other peripheral device, for functions which are performed on operands longer than the natural register size of the peripheral device memory. Functions are typically performed at reduced processing times using the peripheral's register bank memory in conjunction with the CPU memories. In particular, a preferable novel embodiment to load and unload operands is useful for any CPU peripheral where batches of data are transferred, i.e., memory to peripheral device, and to and from peripheral device and memory. This enhancement is preferable where direct memory access, DMA, apparati are not intrinsic to the particular controller. Generally, this is disclosed in published PCT/IL98/00148, in general terms.

Three configurations are illustrated in FIGS. 8, 9 and 10 of peripheral devices which receive and transmit data with single commands using standard type CPUs. In the following explanations, assume that the loader and unloader transmit data parsed in bytes to and from the data bus.

In particular, for loading a peripheral device's input mechanism, it is sufficient to flag the peripheral to latch onto any data directed to the CPU's accumulator, 7350 in FIGS. 8 and 10. The logic to discontinue transfers is preferably with any CLEAR command. These processes preferably can be accelerated using double byte operand data transfer commands, such as POP from stack commands on Intel type CPU's where two bytes are transferred at each command sequence. This type of enhancement is most advantageous, as most compact CPUs do not have efficient memory to memory commands. In the most general case, data words are moved from external memory byte by byte, or word by word, with a first command of source memory to CPU accumulator and in a second command from the CPU accumulator to target memory. For most cryptographic uses on the MAP design, from three to several hundred times more data is loaded into the peripheral than is unloaded from the peripheral. The loading sequence typically requires no alterations in the core CPU, whereas the unloading sequence requires a physical disconnection of the data lines on the accumulator, 7350, typically with an "Accumulator Unload Disable", of FIGS. 8 and 10, or with a "Bi-directional Buffer", 1345 of FIG. 9. The former is a preferable implementation for a monolithic cryptoprocessor, and the latter is a preferable implementation for an embodiment including a CPU with external memories and peripherals.

The method for accelerated loading of batches of data preferably involves commands that transmit from memory addresses to a memory-mapped destination. In a preferred embodiment the destination is the data loading mechanism of the MAP. The procedure consists of sending data that is desired to be loaded into the memory-mapped destination, from the memory addresses to the accumulator. As the accumulator is not read, this has no effect on the procedure. During this data batch transfer, the memory-mapped destination, e.g., the Fast Loader apparatus, 6015, of the MAP, 6010 of FIGS. 6A, 6B, 8, 9, and 10 is set to read data from the data bus, as the data is written to, but preferably is not used by the accumulator. Subsequent to a batch of such data having been snared by the memory-mapped destination, the memory-mapped destination is reset to cease reading data from the CPU bus by sending a clear command to the peripheral device.

Accelerated loading is preferably executed using a procedure that has as few as possible time consuming conditional branch loops. Each batch of data is preferably loaded or unloaded with a flat code procedure, wherein each explicit memory move is called by a separate command. This speed may be limited by a peripheral driven by a low frequency clock unable to receive data at the rate that the CPU can move data.

A pseudo-code program comprising a preferred embodiment of a method for fast loading N bytes/words of data with an 8 bit microcontroller of memory to a peripheral follows:

| PSEUDO COMMANDS - FAST LOADING MEMORY TO PERIPHERAL [SMAP] | | | |
|---|---|---|---|
| CTRL_REG CONTROL | < | CMD_FAST_LOAD; SETS PERIPHERAL ; TO ACCEPT ALL VALID DATA ; FROM DATA BUS. | |
| ACC | < | [ADDR1] | ; ADDRESS MAY BE STACK |
| ACC | < | [ADDR2] | ; WHEREIN TWO BYTES ARE |
| ACC | < | [ADDR3] | ; TRANSMITTED SEQUENTIALLY |
| ACC | < | [ADDR4] | ; OR ANY MEMORY MAPPED ; ADDRESS |
| ACC | < | [ADDRi] | ; DATA IS SNARED INTO MAP'S ; DATA_IN |
| ACC | < | [ADDRN] | ; N WORDS/BYTES LOADED. |
| CTRL_REG | < | CMD_CLEAR; HALTS FAST LOAD- CEASES ; SNARING DATA FROM BUS | |

For many peripheral devices, unloading is the more time consuming than loading. In a computing device where there is no efficient direct memory to memory transfer logic apparatus, use of an accumulator to memory command, where the accumulator is disconnected and the peripheral transmits data directly to a memory address, is a preferable efficient embodiment. In such a case, the command to output [unload] data disconnects the DATABUS from the CPU's accumulator, 7350, whilst such data is being transferred from the peripheral device to a memory address. Such a command now directs all data from the peripheral device to the designated memory area.

A preferred embodiment for accelerated unloading data from a memory-mapped source, usually a peripheral port address, operative to embodiments illustrated in FIGS. 8, 9 and 10 comprises:

a) sending a first command from the CPU, 7380, 7390 and 7395 of FIGS. 8, 9 and 10 respectively to disable the connection to the data bus from the CPU's accumulator, 7350. Disabling is achieved in FIG. 8 or FIG. 9, using a disabling switch, 7340 or a bidirectional buffer, 7345, as in the implementation of FIG. 8. Either configuration effectively disconnects the accumulator from the data bus whilst the peripheral is unloading;

b) simultaneously a cue is provided to the memory-mapped source to unload its data onto the data bus to be read by the memory at the specified address, e.g., of the MAP's data unloading mechanism, 6035. This first command triggers the MAP to serial shift the first byte of data to the unloader, by rotating the data shift-register segment. The register is now ready to dispatch the next byte, following this initialization;

c) a series of commands to move data from accumulator to specific memory addresses is issued. At each command, data is moved from the source peripheral to the specific memory destination address, whilst in the case of the MAP, at each byte of data transferred, the data shift-register segment is rotated 8 bits, and until, the last byte is to be read;

d) a last byte read command is cued to the MAP peripheral. At this command the data register which unloads does not rotate, as it has already made a complete rotation. The last byte of data from the data batch is transferred. A final command is transmitted by the CPU to re-enable the accumulator's data connection to the CPU's data bus; and, preferably, simultaneously causing the memory-mapped destination to cease unloading its data onto the data bus.

A pseudo-code program for fast unloading N bytes of data from a peripheral to a sequence of addresses with an 8 bit microcontroller is as follows:

| PSEUDO COMMANDS - FAST UNLOADING PERIPHERAL TO MEMORY | | | |
|---|---|---|---|
| CTRL_REG | < | CMD_FAST_UNLOAD; DISCONNECTS ACC, CONNECTS ; DATA_OUT TO MEMORY MAPPED DESTINATION. ; SHIFT REGISTER IS ROTATED ONE BYTE AND ; DATA_OUT HAS BYTE READY TO BE READ. | |
| [ADDR1] | < | ACC | ; PERIPHERAL TRANSMITS |
| [ADDR2] | < | ACC | ; INSTEAD OF ACCUMULATOR, 7350 |

-continued

PSEUDO COMMANDS - FAST UNLOADING PERIPHERAL TO MEMORY

| | | | |
|---|---|---|---|
| [ADDR3] | < | ACC | ;EACH TRANSFER TRIGGERS ; SHIFT OF OF DATA REGISTER AND OUTPUTS ; BYTE TO MEMORY ADDRESS |
| [ADDR4] | < | ACC | ; |
| [ADDRi] | < | ACC | ; |
| CTRL_REG | < | CMD_LAST_READ | ; LAST READ COMMAND |
| [ADDRN] | < | ACC | ; N BYTES UNLOADED. |
| CTRL_REG | < | CMD_CLEAR; | HALTS FAST UNLOAD- ; PERIPHERAL CEASES TRANSMISSION |

A "data snare" which captures data on the fly for a memory mapped peripheral is depicted in FIGS. 9 and 10. Such a snare is to be implemented on the new MAP smart card integrated circuit. The snare reduces this two step operation into a single step operation, or even better, if the source memory address is the stack of the CPU, where preferably, a POP command emits a double operand, sequentially, during the period when the receiving peripheral port has been set to snare data which the microcode program of the CPU dictates to be read by the accumulator. Stated differently, when the peripheral is set to receive a batch of data, it sequentially reads in all data from the data bus which is directed to the accumulator. If no other provisions are made, this means that the accumulator and the peripheral port typically receives the same data from the databus. The data in the accumulator is altered [trashed], each time a new word is transferred to it. Alternately, a compare command may be used, which exercises the CPU but does not alter the contents of the accumulator. The Data_In register preferably transfers the data to a first-in first-out, FIFO, type memory. In the implementation of FIGS. 6A and 6B, the Data_In register is a byte-wide parallel-in/serial-out register programmed to accept data from the CPU's databus. Subsequent to the transfer of a byte, the Data_In register automatically shifts the data out serially to the targeted register in the data register bank. Upon completion of a batch transfer, the "data snare" is cleared, so as not to transfer extraneous data to the Data_In register.

The logic for the carry bit on the first iteration of a squaring procedure, when $S^¥>N$ is now disclosed, proving the intuitive exposition of FIG. 11:

Finding this carry bit is only necessary when $S_0^¥$ is multiplexed from the BAISR register into the PLUSMX preload register, which only happens when $S^¥>N$. In such a case $S_0^¥$ is made to represent $S_0+N_0$ whose carry-out bit, c, may be a one or a zero.

To demonstrate how a change of summation procedure changes the carry bit—assume:

$A_0=3$; $B_0=7$; $C_0=13$; $k=4$; and $x_1=((A_0+B_0) \bmod 16+C_0) \bmod 16=((10)+13) \bmod 16=7$ $x_2=((A_0+C_0) \bmod 16+B_0) \bmod 16=((0)+7) \bmod 16=7$ The carry out bits $c_{x1}=1$ and $c_{x2}=0$ are not the same, albeit $x_1=x_2$ as modular addition is associative.

Where $0 \leq S_0^¥ < 2^k$; $0 < N_0 < 2^k$; and $S^¥>N$—it is sufficient to prove that:

If $S_0^¥<N_0$; c=1 (see step II) and if $S_0^¥ \geq N_0$; c=0 (see step III). To provide a proper carry out bit which appears after 2k effective clock cycles I where $S^¥>N \therefore S_0+N_0=(S_0^¥-N_0)+N_0$.

II if $S_0^¥<N_0$

IIa $S_0^¥=N_0-e$; $(2^k-1)>e>1$ because $(-e) \bmod 2^k=2^k-e$

IIb $S_0+N_0=(S_0^¥-N_0) \bmod 2^k+N_0$
 $S_0+N_0=(N_0-e-N_0) \bmod 2^k+N_0$
 $S_0+N_0=-e \bmod 2^k+N_0$
 $S_0+N_0=2^k-e+S_0^¥+e$
 $S_0+N_0=2^k+S_0^¥ \geq 2^k$ IIc c=1 as $S_0^¥ \geq 0$ III where $S_0^¥ \geq N_0$ IIIa $S_0^¥=N_0+e$; $2^k>e \geq 0$ IIIb $(S_0^¥-N_0) \bmod 2^k+N_0=(N_0+e-N_0)+N_0=N_0+e=S_0^¥$ IIIc c=0 as $S_0^¥<2^k$ The borrow bit of $Z-N_{128d}$ @ $t_{256}=1$ if $S_0^¥<N_0$.

The truth table, of FIG. 11 demonstrates the types of combinations of $S_0^¥$ and $N_0$, offering an additional, more intuitive approach than the above formal analysis.

The current decoupling method of FIGS. 12A, 12B, 12C, and 12D is now described:

A basic preferred method for masking of revealing signals is to lower the signal to noise ratio, SNR, by lowering the current consumption of individual cells. This can most easily be achieved by reducing the number of transistors in a cell, by reverting to dynamic shift register cells with feed back hold, and by using similar standard flip flops.

Another step for effective masking to further lower signal to noise ratio is to balance low current signals with compensating similar current dissipating pseudo-signals, in order to establish an apparent even average amplitude signal plus pseudo-signal (noise) value, as is shown in FIGS. 13 and 14

These methods can attain a very low signal to noise ratio, but the circuit continues to broadcast low level sensitive signals which can be analyzed using very fast current sensors, and statistical analysis.

To mask these low-level sensitive signals, a decoupling energy regulator is preferably implemented.

Figure 12A:
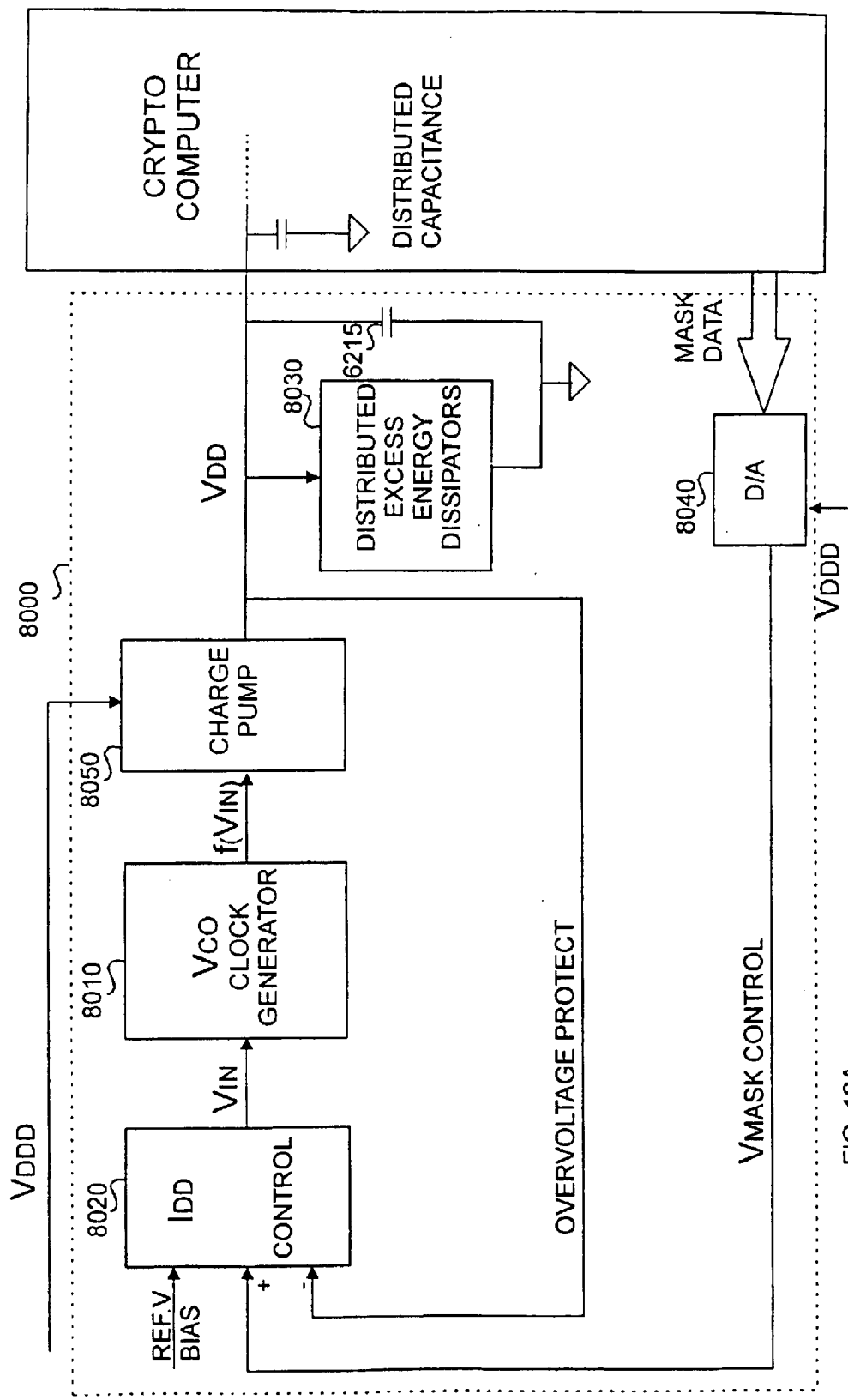
FIG. 12A is a simplified block diagram of a preferred embodiment of a current decoupler which feeds current to the cryptocomputer of FIG. 8, operative to hide non-invasive detection of secret sequences.
Figure 12B:
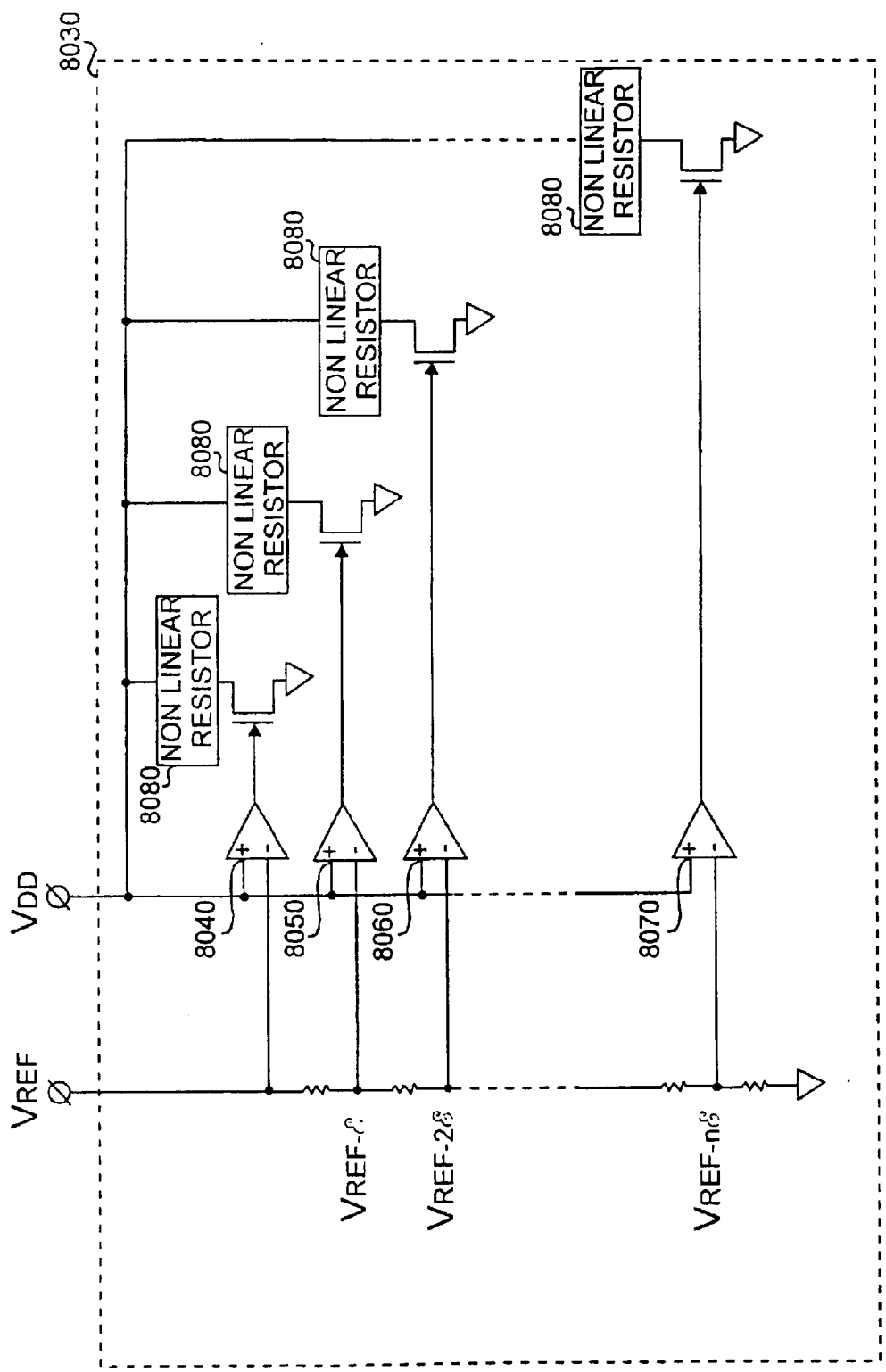
FIG. 12B is a block diagram of a preferred embodiment of one of the excess energy dissipators included in FIG. 12A, in which comparators, 8040, 8050, et al, activate current dissipation on CMOS transistors.

A preferred embodiment of a method to decouple the current input into the chip from the current consumed by the computing elements in the cryptocomputer is demonstrated in FIGS. 12A and 12B. The decoupling is accomplished by having a single or a plurality of programmed current pumps, 8500, inputting excessive current into the circuit, with disbursed resistors, 8030, and capacitors, 8100, serving as low pass filters and to dissipate energy.

In the preferred embodiment of a current decoupler of FIG. 12A, a programmable amount of excessive current is "forced" into $V_{DD}$. The device is composed of standard elements used in low powered ICs, e.g., D to A's (digital to analogue voltage converters), 8040, voltage controlled digital oscillators (VCOs), 8010, and charge pumps, devices commonly used by chip designers practiced in the art.

In a preferred embodiment, the VCO has a constant voltage reference input to assure that the charge pump supplies sufficient energy to power the basic CPU, the MAP and other peripherals, for exercising unmasked crypto-operations, such as hashing, verification, etc., and for devices that do not require DPA protection.

The VCO emits ones and zeroes at a frequency which is a function of its input voltage. At each cycle the charge pump delivers a quant of charge to the voltage line of the cryptocomputer. The higher the frequency emanating from the VCO, the larger the pulsating current flowing into the chip. Care is typically exercised to prevent invasive disconnection of the MASK DATA, 8090, increment.

In another preferred embodiment, where a plurality of charge pumps are disbursed over the face of the circuit for security reasons, the amount of dissipation can be regulated by changing the number of pumps working as decouplers.

FIG. 12B, depicts a preferred embodiment of an energy dissipator. Note that the transistor is in depletion mode with its gate tied to source. Note the graph of current as a function of voltage, which shows that, typically in such a configuration, the current dissipation is least affected by voltage changes.

Figure 12C:
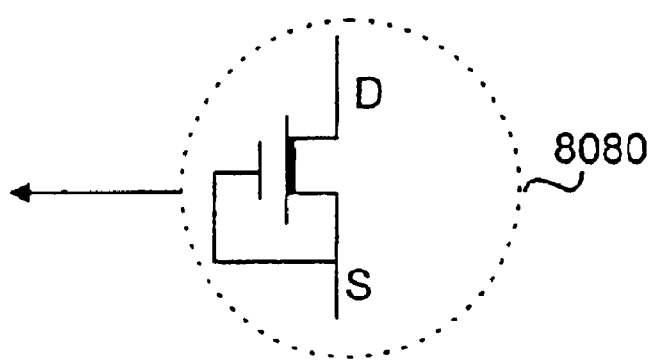
FIG. 12C is a preferred embodiment of a non-linear resistor, 8080, as is typically implemented in microelectronic circuits.

FIG. 12C illustrates the configuration of a depletion mode CMOS transistor, used in conventional microelectronic circuits to emulate a resisting element. Note that the source and the gate are connected.

Figure 12D:
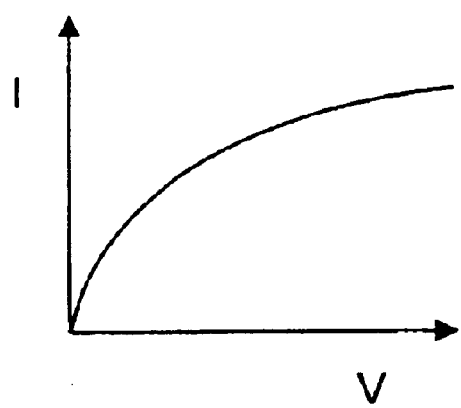
FIG. 12D is a conceptual graph of the current (I) to voltage (V) relationship of a depletion mode CMOS non-linear resistor.

FIG. 12D illustrates the voltage to current ration in the transistor configuration of FIG. 12C. Note that in this non-linear configuration the dissipated current is nearly constant in a range of interest.

The time constant of the distributed capacitance and the resistive load of the cryptocomputer is preferably far greater than the longest pulsating cycle of the VCO, to maintain a reasonably regulated supply voltage to the device.

An example of a potentially dangerous, drastic intrinsic lowering of current consumption in a Montgomery sequence, in this, and previous MAPs is demonstrated. There are two single bit serially multipliers, $B_d$ and $N_d$. (The serial $N_d$ stream, in methods using the Chinese Remainder Theorem, is a secret factor of the composite modulus.) A judicious assumption is that the hacker is able to execute, in a probed environment, many sequences, as might be necessary for such attacks, wherein recurring features can be statistically recorded. At a clock cycle, if both the $B_d$ and the $N_d$ bits are equal to zero, the contents of not one of the three operands in 6360, 6370 or 6380, is summated into the CSA. Not adding in an operand to the CSA causes a drop in energy consumption in the Operational Unit, as there are fewer changes of polarity of carry ins, and fewer changes in the S outputs of the full-adders. On this design of the MAP, after testing on unmasked chips using random Bd's, after a few hundred test, all zeroes which occur in the Nd stream of ones and zeroes, could be detected and the secret modulus, from the k'th bit to the m·k'th bit can be detected.

A preferred method to make a first approximation balance on this drop in current, which recedes and then rises to a normal average, is to simultaneously manipulate a similar random sequence dissipating complex of similar gate structures. In the preferred embodiment described in FIGS. 13A, 13B, and 13C such a balancing device is described. At each of the following one or two clock cycles as the CSA generates more signal, less pseudo signal is preferably added to compensate for successive rises in the CSA current consumption. This change is typically programmed into the devices described in FIGS. 13A, 13B, and 13C. Another preferred embodiment, which is not described in these figures, is to purposefully skip a single clock addition, while masking a random current dissipation by rotating a noise generator of the type depicted.

Figure 13A:
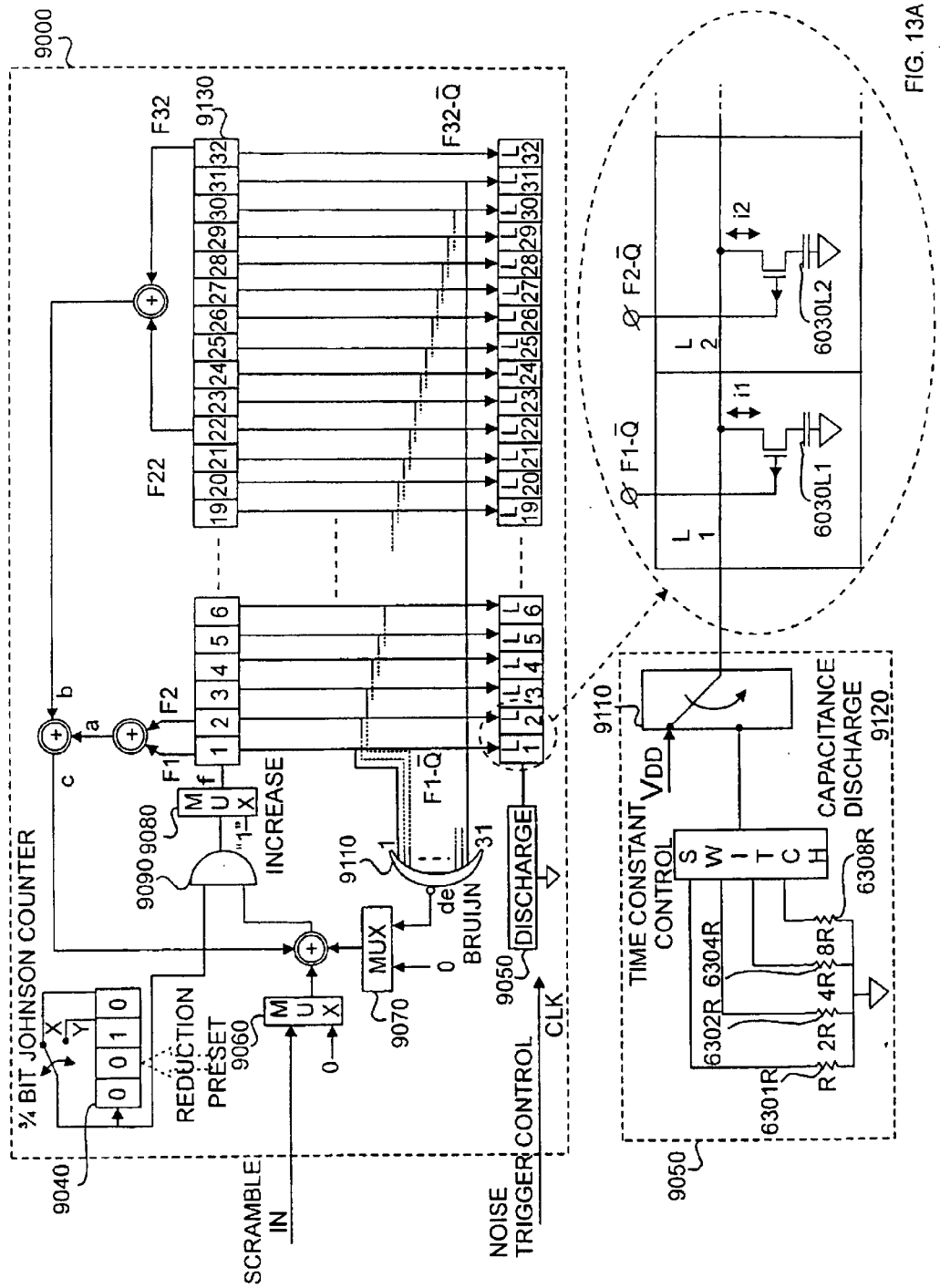
FIG. 13A is a block diagram of a preferred embodiment of a programmable random high-speed non-linear current dissipator, operational to mask specific MAP sequences, the entire circuit which typically resides appended to the shift registers of an SHA-1 hash processor, 7330, of FIG. 8.
Figure 13B:
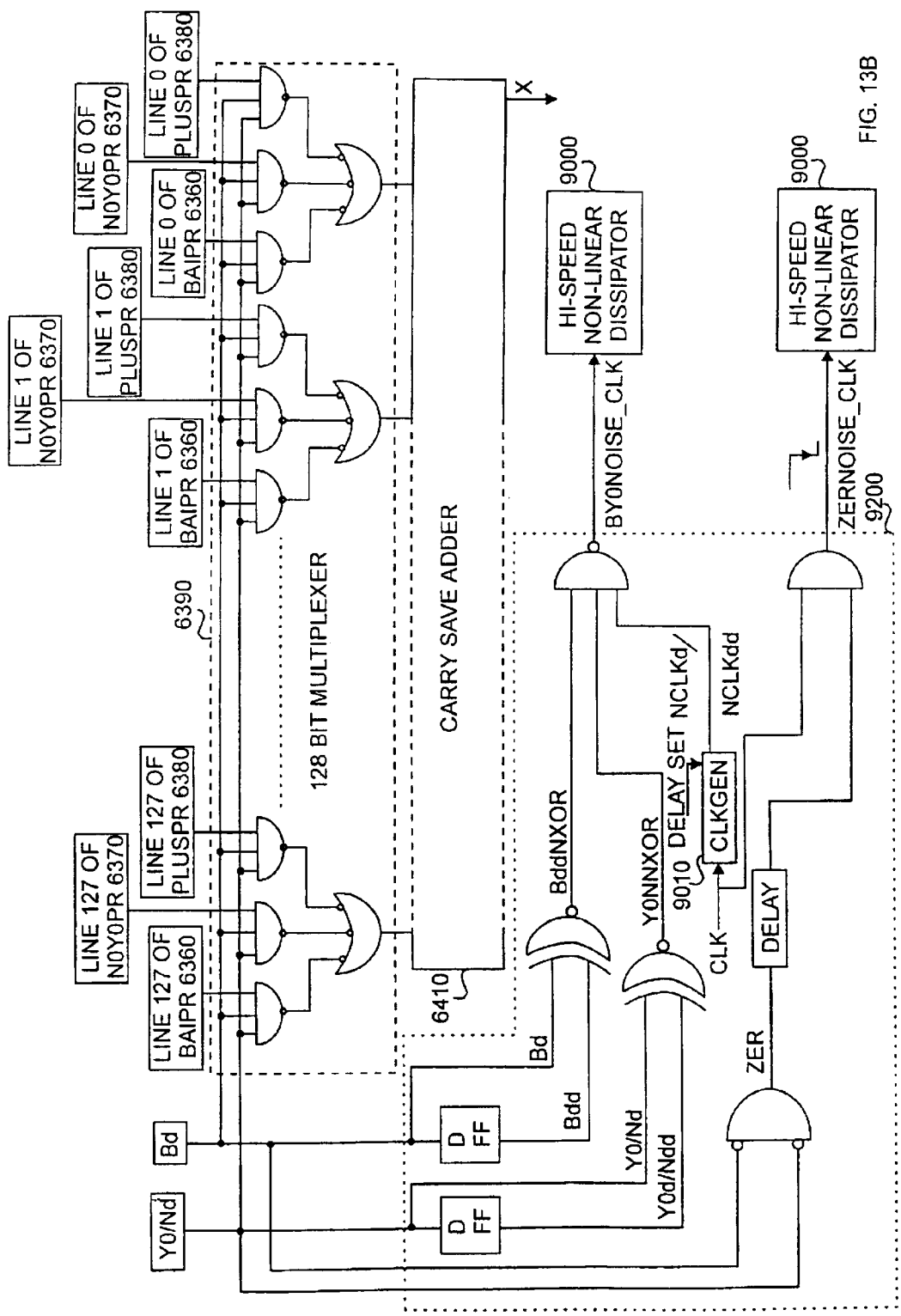
FIG. 13B is a simplified block diagram of an optional add-on to the multiplexer 6390, feeding the carry save accumulator of FIGS. 6B and 7A, comprising circuitry operative to trigger a pseudo-signal in the energy dissipator, 9000, of FIG. 13A.
Figure 13C:
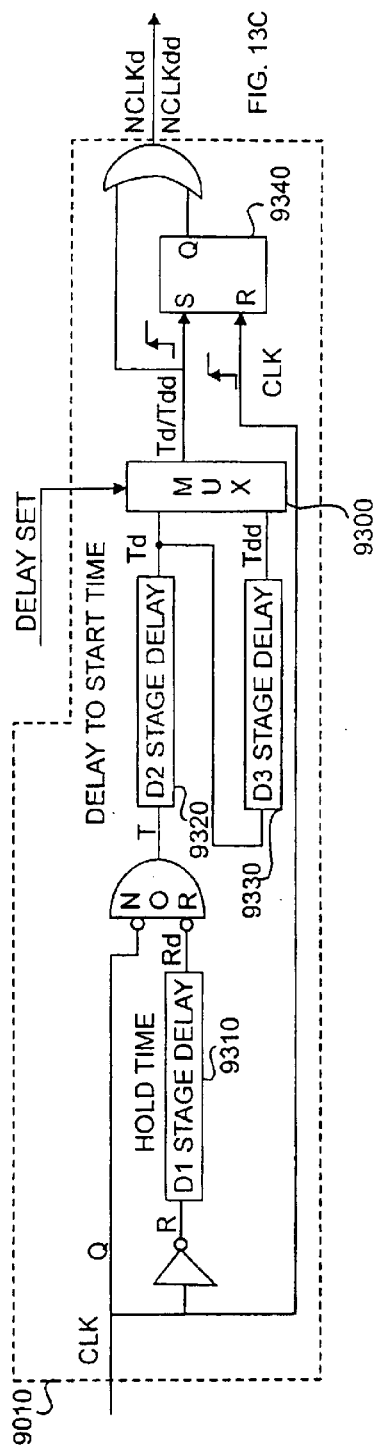
FIG. 13C is a simplified block diagram of the Clock Delay circuit, CLKGEN, 9010, of FIG. 13B, operative to trigger pseudo-signal noise precisely synchronized to generate pseudo-signal, emulating valid signal to resist differential power analysis of computational signals, of FIG. 13B.
Figure 13D:
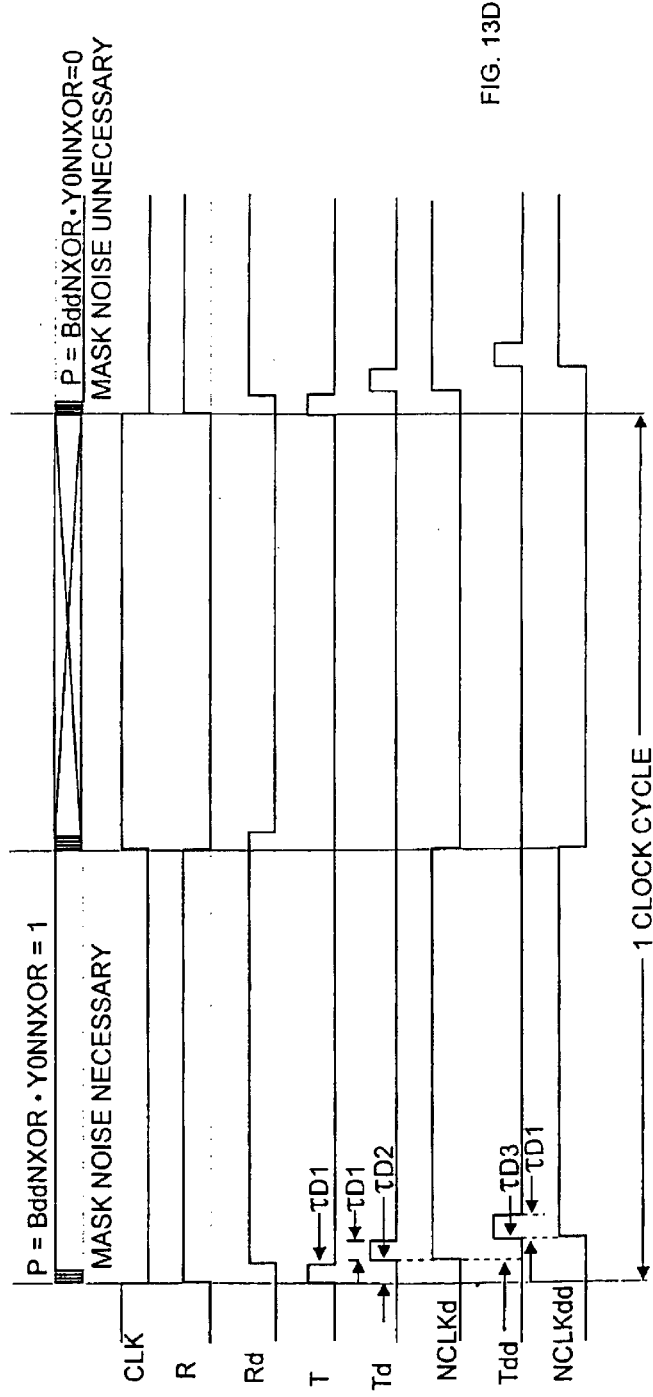
FIG. 13D is a simplified timing diagram of the circuit diagrams of FIGS. 13B and 13C, demonstrating the logic of generating noise in FIG. 13B, and the fine tuning of the stage delays 9310, 9320, and 9330, as implemented in FIG. 13C.

Random current compensation can be added in a preferred implementation, if the gate structure of the additive noise generator is a maximum length feedback shift register where each cell typically produces a variable current, subject to the data in the cell's being a one or a zero. In FIG. 13A, B, and C the pseudo-signal is adapted to the individual functions and sequences to generate pseudo-signal by:

1) The choice of the initial contents of shift-register 9130, the number of ones and zeroes. More or all ones maintains a normal sequences, more or all zeroes decrements the number of ones being fed back into AND gate 9090,
2) The number of ones in the Johnson Counter, 9040, fewer ones typically will reduce the feedbacks of "current consuming ones" in the de Bruijn feedback register,
3) The sequence input on SCRAMBLE_IN, which is input into multiplexer, 9060, and change the contents of 9130 in a random fashion,
4) And the choice of the dissipators 6301R, 6302R, 6304R, and 6308R, which if they are sufficiently large, determine the status of the remaining charges on the random capacitors, 6030L1 to 6030L32, (only 6030L1 and 6030L2 are depicted), at the end of a clock cycle, which determines an approximation of the amount of dissipation which results on the next clock cycle, by limiting the amount of additional charge which is typically added to the load capacitance devices on the next cycle The "pseudo-signal anticipator", 9200 of FIG. 13B actuates the following three noise clock triggers:

1) When the $Y_0$ serial signal is generated, 9200 senses if there has been a change of polarity of the literals, either $Y_0$ or Bd, which could, on the average, change all of the logic signals entering and exiting the 6390 multiplexer. Because of the long propagation delay caused by the five logic signals which determine $Y_0$, the signal can be sampled only when $Y_0$ is reasonably settled, commensurate to the number of delay stages in the Y0SENSE, 6430. Under such circumstances, D2 Stage Delay, 3320, and D3 Stage Delay, 9330 of FIG. 13C are concatenated by multiplexer 3300 and the sampling signal is delayed by Tdd. The D1 Stage Delay, 9310 determines the width of the pulse which ensures an effective trigger to the SR flip flop, 9340.
2) After the k'th effective clock cycle, when the $Y_0$ signal has already latched into the 6390 input, 9200 continues sensing if there has been a change of polarity of the "new" multiplier literals, Nd or Bd. This, again, could potentially, on the average change all of the logic signals entering and exiting the 6390 multiplexer. Under such circumstances, only the D2 Stage Delay, 9320, is necessary to insure synchronization and the sampling signal is delayed by Td.
3) During the approach to second half of the clock cycle, when $Y_0$ (or Nd) and Bd are stable, the ZER signal senses if both $Y_0$ (or Nd) and Bd are zero, in order to trigger pseudo signal to compensate for the fewer carry signals which are generated in the CSA. ZERNOISE_CLK triggers noise on the second half of the clock cycle.

Other examples of reduced current during computations in a MAP sequences, are typically those caused by MAP clock delays in inaugurating CSA summations caused by computational delays in the serial data process conditioner, 6020. Other delays are caused by pauses between phases in a sequence when operands are multiplexed into 6360, 6370 and 6380. Further lowering of CSA current consumption is effected during the last k bit effective clock cycles. During this phase zero strings are fed simultaneously on the $S_d$ and on the multiplier lines of $B_d$ and $N_d$ to flush out the CSA cells FIG. 13A is a preferred embodiment of a rotating register which can generate random noise. The statistics of the noise is typically altered by changing both the initial condition by preloading flip-flops F1 to F32 with ones and zeroes, auspiciously, and feeding in external random or colored random values, via the noise reducer AND gate, 9090. A 32-cell device is typically used for many cryptographic implementation of hash standards, e.g., Secured Hash Standard, SHA, (ANSI X9.30-2 standard—FIPS 180-1). These hash registers are typically not computing while the MAP is executing computations in the GF(p) field, and are preferably generating pseudo-signal noise.

In a preferred embodiment, when multiplexer 9060 is set to input zeroes, and the cells of a Johnson Counter (which is a simple shift register counting mechanism with a revolving one to trigger a count "done") are all set to ones, the thirty two bit shift register with the four XORed feedbacks, is configured as a n=32 bit non-linear de Bruijn maximum length non-linear feedback shift register. This produces a pseudo-random sequence which is $2^{32}$ bits long. If each of the loads L1 to L32, tapped onto the 32 cells has a pseudo-random capacitive load, e.g., the value of each capacitor (see 6030L1 and 6030L2 in 3000) is preferably a bias value, plus a pseudo random sequence of values relating to numbers one to 32. Assuming normal variance in capacitors, the total capacitive load of the device is typically impossible to anticipate at any clock cycle.

The difference between an ordinary linear maximum length feedback shift register, (LFSR), and nLFSR, a non-linear de Bruijn feedback shift register, FIG. 13A, is that a conventional LFSR locks [ceases to progress, as it does not insert a MS one], when it has an "all zero" value in its cells. The addition of the "de Bruijn" NOR gate feedbacks a zero on a sequence of 00 . . . 001 (a single LS one), and feedbacks a one on a sequence of all zeroes. An nLFSR has all of the $2^{32}$ possibilities of distribution of zeroes and ones in the 32 flip-flops, and the sequence of occurrence of these numbers has what is defined as a pseudo-random occurrence. Pseudo-randomness is in the sense that an oracle who has no knowledge of the origin of the sequence, and who only knows the number of ones in each cycle, and is unable to sense the length of a cycle, is thus unable to differentiate between this sequence and a truly random sequence, and is therefore unable to accurately estimate the placement of ones in the secret sequence. Each of the capacitive loads as a pseudo-random capacitance, causing an undetectable analog dissipation sequence, dependent on the initial condition of the register.

In a simple 32 bit nLFSR as in FIG. 13A, the input to F1, the first flip flop is signal c. Signal c is the XORed feedback of the outputs of flip-flops F1, F2, F22 and F32. The de Bruijn sequence is attained by appending an (n−1) input NOR gate, (32−1) in 3000, wherein all flip-flops from F1 to F31 are sampled and produce a one, when all inputs are zero. The nLFSR is forced to all zero when c is one and the de Bruijn NOR gate output is one. This can only happen when all flip-flops are equal to one except the last cell in the register, i.e. F32 in 8A, (000 . . . 0001). This all zero condition is followed by (1000 . . . 0000), as c is now equal to 0 and the de Bruijn NOR gate output is one.

The QNOT outputs of all flip-flops each are input to a P channel FET transistor; wherein each flip-flop switches in a load L1 to L32, when its Q output is a one, and switch 9100 is set to $V_{DD}$.

The 30Lx capacitors can be discharged when switch, 9100 is toggled from $V_{dd}$ to discharge on any combination of 6301R, 6302R, 6304R or 6308R load resistor. For maximum pseudo-signal, load capacitors are typically set to an RC time constant small enough to enable complete discharge in less than a single cycle. A random graduated decrementing discharge can be achieved by reducing the number of ones in the Johnson counter. An immediate large increment can be achieved by setting the 9080 multiplexer to input a constant one. Additional capacitance can be achieved by adding a metal layer to the IC, wherein charges can be placed on varied size "plates".

Typical energy dissipation in CMOS devices is caused by loading of the input gates of transistors and the picosecond transition of gate polarity as the $V_{dd}$ to $V_{ss}$ path is partially short circuited. These devices can be preset with random or set sequences to mask varied MAP operations.

Another step for effective masking to further lower signal to noise ratio is to balance low current signals while compensating similar current dissipating pseudo-signals, in order to establish an apparent even average amplitude signal plus pseudo-signal (noise) values.

Additionally, an astute hacker working on an unmasked circuit can learn both data and the computational sequences during unmasked transfers of data from a memory address to the CPU Accumulator, to the DATA_IN register or conversely, from the DATA_OUT register to a memory location or to the CPU. In Parallel exchanges of data, when sensed over millions of measurements, a hacker can sense slight differences of current consumption arising from the variations of single transistors. Serial transfers of data into shift registers that also make marked changes in current consumption, caused by the number of changes of status of literals from one to zero, and zero to one of the individual cells in a register. The hacker can learn what values are transferred, assuming only minimal variations in transistors of the accumulator.

FIGS. 14A, 14B, and 14C depict preferred embodiments methods for masking parallel data transfers on varied buses to latches, and shift registers, and from serial outputs to shift register segments.

In FIG. 14A, a preferred method for masking the data which is transmitted to a shift register segment. The goal is to cause a literal change at each clock, either on the output line to a valid register, or on the output line to an unused compensating data segment. In the architecture of the MAP, which is designed for use with the Chinese Remainder Theorem, where preferably all sensitive computations are performed using only parts of the data bank, there are unused portions of data segments which can be used as compensating registers, to transmit pseudo-signals. When signal C=1 (C=A NXOR B) signifies that there is no change on the next output, and that a change of polarity emits from T flip-flop 10000. The sum total of polarity changes of two ideal data segments loaded with such a mechanism, composed of a valid register and a compensating register, when rotated together typically closely approximate a single data register wherein all adjacent cells have reversed polarity ( . . . 0 1 0 1 0 1 . . . ). The timing diagrams of FIG. 14A, demonstrate this addition of superfluous literal changes of polarity to a compensating register.

FIG. 14B demonstrates a typical parallel to serial input to a serial processing device. Two 4 input NOR gates, 10110 and 10120, each output a one if the input to a nibble is all zeroes. If the nibble input is all zeroes, then a one is input into a cell in the DATA_BALANCE, 10100. Rotation of the register preferably dissipates an indistinguishably constant energy pattern. The NXOR output, 10130, of the device performs the same function as the NXOR of FIG. 9A, and assures literal polarity changes on sequential clocks.

FIG. 14C demonstrates a parallel to serial device wherein the "odd" bits on the parallel input bus are complemented, and the even bits are uncomplemented, a common practice on internal CPU databuses. These "odd" data bits are input into the 4 input NAND gate, 10200, and the "even" bits are input into the 4 input NOR gate, 10210. 10210 outputs a zero to the DATA_BALANCE, 10240, when the complemented inputs are all ones, guaranteeing that the complemented nibble typically adds a load to the DATA_BALANCE for an all zero input. The output to the valid register is an uncomplemented string, and the output to the compensating register actuates a polarity change at clock cycles where there is no polarity change in the output to valid register.

Figure 15:
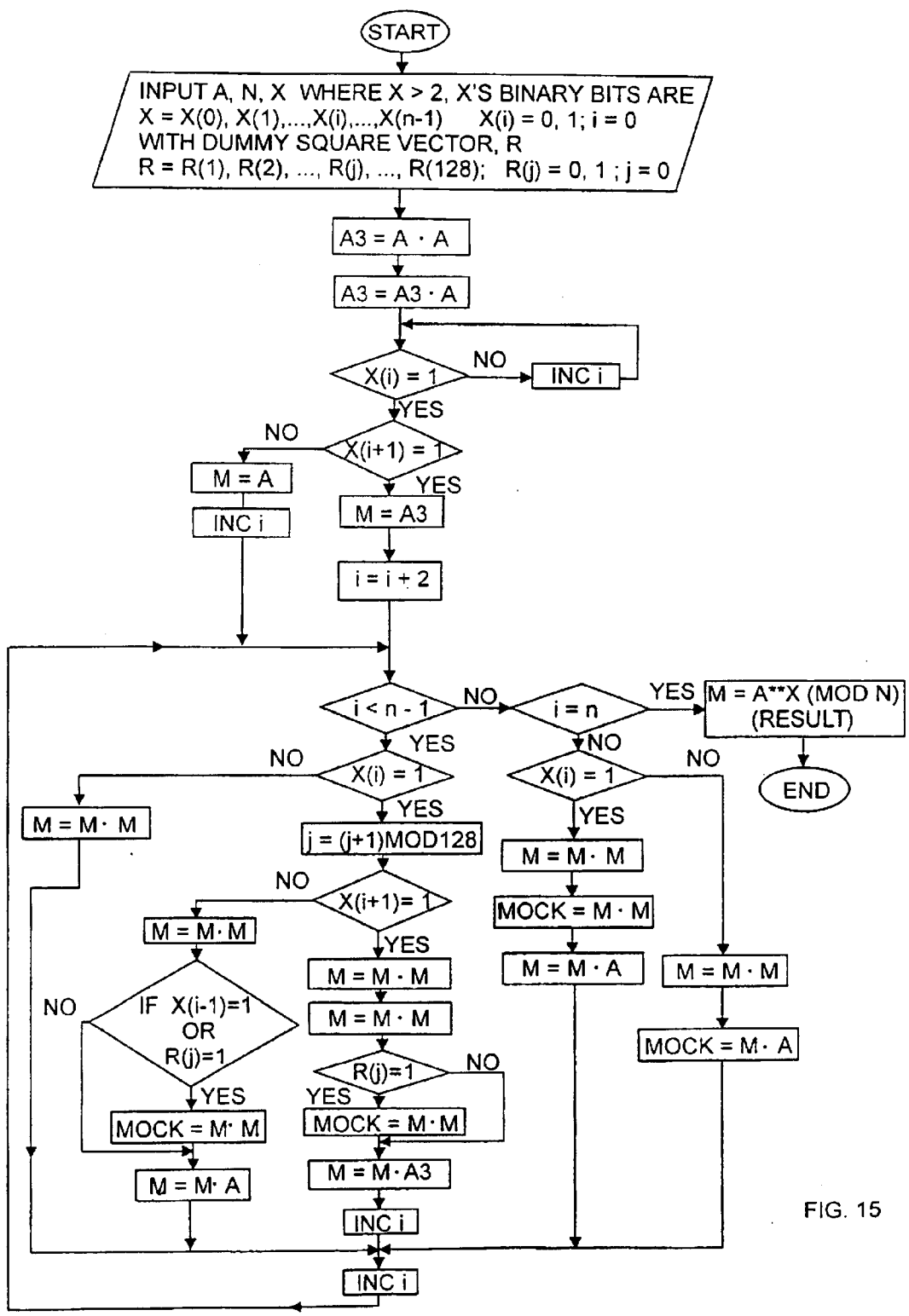
FIG. 15 is a simplified flow chart illustrating a preferred method for systematic sequencing of insertions of mock squares, which are placed before preferred multiplication operations in a sliding window exponentiation, and thereby masking an accelerated exponentiation sequence.

Reference is now made to FIG. 15 which demonstrates a cost effective method which is executed to establish firmware and hardware procedures for varied functions in a sequence, to be timewise identical and energywise very similar, irrespective of the sequence being performed. Preferred procedures include methods for simultaneously performing one operation whilst mocking a second operation. At each instance that preparation for a squaring sequence is made, a mocked preparation necessary for a multiplication is preferably simultaneously implemented. Conversely, when preparation for a multiplication is necessary, a mocked preparation necessary for a squaring typically is simultaneously implemented.

For the most difficult to protect mass implementations of smart cards; e.g., satellite TV and DVD readers, such masking alone is typically insufficient. On such applications the hacker need only clone one device in order to break a cryptosystem.

Superfluous mock squaring operations are typically inserted in a predefined constant random pattern, before multiplication operations. It is reasonable to assume that an adversary is able to detect a multiplication, but cannot differentiate between the M·$A^3$ and M·A sequence. It is reasonable to assume that in a masked system the hacker cannot differentiate between a mock squaring and a real squaring, and that he knows the strategy of FIG. 15. Typically when executing an exhaustive search, sometimes called a "brute force" method, to learn a secret sequence, the hacker uses an ordered trial and error procedure.

Using an addition chain computational method, where all multiplications are either a temporary result multiplied by A or a temporary result multiplied by $A^3$, on a sequence of 512 bits, there are, on the average of about 160 multiplication operations each always preceded by a valid squaring operation. Of these multiplication operations there are typically twenty, which when not hidden, divulge a series (three or more) of odd consecutive ones, e.g., 011 10, 01111 10, 0111111 10, etc. It is, therefore, typically imperative to hide a string of odd ones with a dummy square. Note the example of an inserted mock in i=10'th iteration of the following. 20 out of 160 possible mock squares before multiplies typically entails $2^{83}$ possible combinations which the hacker attempts to detect [times $2^{160}$ equiprobable multiplies, which he now cannot detect].

In the above-mentioned computations, it is especially cost effective to store two powers of the base A; $A^1$ and $A^3$. (In Montgomery MAPs the initial A is preferably A multiplied by $2^n$ Mod N.) Storing $A^3$ is typically without cost in initialization, as for most composite moduli applications, where the bit length of the two moduli are equal (length n/2), the two least significant bits are ones. Such numbers are Blum integers preferably used in public key exponentiation algorithms. $A^3$ is the first multiplication performed in such an exponentiation.

In the following analysis the nine most common "zero bounded sequences" and the average appearances of these sequences are shown where mock squares are preferably inserted, and the obvious average occurrences in any sequence, and the average occurrences in a 512 bit sequence, without "end effects".

The first line in the entries of the sequence column, 01 . . . 10 is the sequence as it appears in the exponentiation sequence and the lettered sequence second line.

The second line is the sequence of squares, multiplies and mock squares. If the adversary cannot differentiate between multiply by A and multiply by $A^3$, and cannot differentiate between a square and a mock square, this is as strong as a conventional sequence, wherein every square is followed by a multiply or by a mock multiply. Note, every mult is preceded by a squaring operation, either mock or real.

Additional mock squares can be inserted before $A^3$ multiplication procedures and are typically undetected. The dollar sign, $, signifies a dummy square.

| Average occurrences Sequences of Bounded "1"s | Average in 512 random bits | Average Fraction of occurences of sequence | Average A mults in this sequence | Average $A^3$ mults in this sequence | Average A mults in a 512 bit sequences | Average $A^3$ mults in 512 bit sequences | Average Imperative mock squares in 512 bits |
|---|---|---|---|---|---|---|---|
| 0 1 0<br>SSAS | 64 | 1/8 | 1 | 0 | 64 | 0 | |
| 0 1 1 0<br>SSS$A^3$S | 32 | 1/16 | 0 | 1 | 0 | 32 | |
| 0 1 1 1 0<br>SSS$A^3$S$AS | 16 | 1/32 | 1 | 1 | 16 | 16 | 16 |
| 0 1 1 1 1 0<br>SSS$A^3$SS$A^3$S | 8 | 1/64 | 0 | 2 | 0 | 16 | |
| 0 1 1 1 1 1 0<br>SSS$A^3$SS$A^3$S$AS | 4 | 1/108 | 1 | 2 | 4 | 8 | 4 |
| 0 1 1 1 1 1 1 0<br>SSS$A^3$SS$A^3$SS$A^3$S | 2 | 1/256 | 0 | 3 | 0 | 6 | |
| 0 1 1 1 1 1 1 1 0<br>SSS$A^3$SS$A^3$SS$A^3$SS$AS | 1 | 1/512 | 1 | 3 | 1 | 3 | 1 |

-continued

| Average occurrences Sequences of Bounded "1"s | Average in 512 random bits | Average Fraction of occurences of sequence | Average A mults in this sequence | Average $A^3$ mults in this sequence | Average A mults in a 512 bit sequences | Average $A^3$ mults in 512 bit sequences | Average Imperative mock squares in 512 bits |
|---|---|---|---|---|---|---|---|
| 0 1 1 1 1 1 1 1 0 $SSSA^3SSA^3SSA^3SSA^3S$ | 0.5 | 1/1024 | 0 | 4 | 0 | 2 | |
| 0 1 1 1 1 1 1 1 1 0 $SSSA^3SSA^3SSA^3SSA^3S\$AS$ | 0.025 | 1/2048 | 1 | 4 | 1 | 1 | 1 |
| Average total | | | | | 86 | 84 | 22 |

The following shows the average number of iterative operations on 512 bit and 256 bit sequences that a hacker typically performs in an exhaustive search, wherein only "imperative" mock squares are added, and where additional mock sequences are inserted. This typically helps to prepare a strategy based on assumptions as to how the power consumption is masked.

$\begin{bmatrix} n \\ k \end{bmatrix} =$ Number of different positions of k units in n units (Combinations of k's in n).

$\begin{bmatrix} 160 \\ 80 \end{bmatrix} = 2^{154}$; Assuming that $A \cdot M$ and $A^3 \cdot M$ multiplications are undistinguishable, in a 512 bit sequence there are more than $2^{154}$ different equiprobable combinations of a mix A and $A^3$.

$\begin{bmatrix} 160 \\ 20 \end{bmatrix} = 2^{83}$; Number of possible mock combinations to be verified if there are 20 imperative mock squares in exactly 160 possible positions in the sequence and a total of more than $2^{237}$ equiprobable combinations, including undistinguishable multiplications.

$\begin{bmatrix} 160 \\ 36 \end{bmatrix} = 2^{119}$; Number of possible mock combinations to be verified if there are 35 mocks randomly and imperatively placed, and a total of more than $2^{273}$ equiprobable combinations, including undistinguishable multiplications.

$\begin{bmatrix} 80 \\ 40 \end{bmatrix} = 2^{77}$; Assuming that $A \cdot M$ and $A^3 \cdot M$ multiplications are undistinguishable, in a 256 bit sequence there are more than $2^{77}$ different equiprobable combinations of A and $A^3$.

$\begin{bmatrix} 80 \\ 10 \end{bmatrix} = 2^{41}$; Combinations of 10 imperative mock squares out of 80 possible squares, in exactly 80 possible positions in the sequence and a total of more than $2^{115}$ different equiprobable combinations, including undistinguishable multiplications.

$\begin{bmatrix} 80 \\ 40 \end{bmatrix} = 2^{77}$; Combinations of 40 out of 80 squares are mock, and a total of more than $2^{154}$ different probable combinations, including undistinguishable multiplications.

Stated in another way, if different value mults cannot be distinguished and mock squares cannot be differentiated from real squares, then using the simple sliding window procedure for exponentiation is more efficient than the conventional methods of U.S. Pat. No. 5,742,530, and complies with accepted levels of security. If the hacker cannot distinguish between a square and a multiply, masking mock squares and multiplies are irrelevant.

Assuming that the hacker cannot distinguish between A and $A^3$, there are, typically in a 512 bit sequence there are 160 multiplications, and typically 21 are preferably masked.

The flow-chart of FIG. 15 illustrates an exponentiation using an addition chain based on A and $A^3$, where Mock Squares are inserted optionally in the sequence according to the relevant j bits of random vector R, and also when necessary to prevent the hacker from detecting a string of three consecutive ones in the exponentiation sequence. Assuming that in a 512 bit exponentiation, using an addition chain of A and $A^3$, on the average of 80 multiplication procedures are typically eliminated, and typically, there is a sacrifice of about 20 mock squarings to make the A multiplier indistinguishable from the $A^3$ multiplier. About 8% in computation time is typically eliminated. If another 15 mock squares are added, the computation time saved is typically about 6%.

These sequences are potentially more valuable for an implementation where a strategy has been established in which every square is followed by either a mock multiply, or a real multiply. Note the typically reduced multiplication procedures (real and dummies) of an average of two thirds (about 335 for 512 bit exponentiations). Only those mocks which are deemed necessary to wend of an exhaustive search are typically inserted.

The following exponentiation sequence follows the method of flow chart of FIG. 15, with notations, as to where dummy squares are inserted in sequences that otherwise are easily detected. Insertions of dummy multiplications using the sliding window sequences are more difficult to insert, as they are preferably preceded by two squares.

All "imperative" mock squares have been inserted, and in addition, mock squares have been inserted as ordained by the ones in the R(j) vector.

| X | 0 | 1 | 1 | 0 | 0 | 0 | 1 | 0 | 1 | 1 | 1 | 0 | 0 | 1 | 1 | . | . |
|---|---|---|---|---|---|---|---|---|---|---|---|---|---|---|---|---|---|
| i | 0 | 1 | 2 | 3 | 4 | 5 | 6 | 7 | 8 | 9 | 10 | 11 | 12 | 13 | 14 | . | . |

| R(j) | 0 | 0 | 0 | 0 | 1 | 1 | ... |
|---|---|---|---|---|---|---|---|
| j | 0 | 1 | 2 | 3 | 4 | 5 | ... |

| i | j | X(i) | R(j) | X(i+1) | Process | Present value | Can be mock square? | Can be mock mult? |
|---|---|---|---|---|---|---|---|---|
| 0 | 0 | | | 1 | $A3 = A \cdot A$ | $A3 = A^2$ | $N_0$ | $N_0$ |
| 0 | 0 | | | 1 | $A3 = A3 \cdot A$ | $A3 = A^3$ | $N_0$ | $N_0$ |

-continued

| | | | | | | | | |
|---|---|---|---|---|---|---|---|---|
| 1 | — | 1 | | | M | 3 | $M = A^3$ | $N_0$ | $N_0$ |
| 1 | | 1 | 1 | | | | | | |
| 3 | 1 | 0 | | 0 | M · M | | $A^6$ | $N_1$ | $N_2$ |
| 4 | | 0 | | 0 | M · M | | $A^{12}$ | $N_1$ | $N_2$ |
| 5 | | 0 | | 1 | M · M | | $A^{24}$ | $N_1$ | $Y_3$ |
| 6 | | 1 | | 0 | M · M | | $A^{48}$ | $N_1$ | $N_2$ |
| | 2 | 1 | 0 | 0 | M · A | | $A^{49}$ | Y | $N_3$ |
| 7 | | 0 | | | M · M | | $A^{98}$ | $N_1$ | $N_3$ |
| 8 | | 1 | | 1 | M · M | | $A^{196}$ | $N_1$ | $N_3$ |
| 9 | 3 | 1 | 0 | | M · A3 | | $A^{395}$ | Y | $N_3$ |
| 10 | | 1 | | 0 | M · M | | $A^{790}$ | $N_1$ | $N_3$ |
| | 4 | | 1 | 0 | MOCK · M | | | I | |
| | | | | | M · A | | $A^{791}$ | $N_1$ | $N_3$ |
| 11 | | 0 | | | M · M | | $A^{1582}$ | $N_1$ | $N_3$ |
| 12 | | 0 | | | M · M | | $A^{3164}$ | $N_1$ | Y |
| 13 | | 1 | | 1 | M · M | | $A^{6328}$ | $N_1$ | Y* |
| | | | | | M · M | | $A^{12656}$ | — | Y** |
| | 5 | | 1 | | MOCK · M | | | — | $N_3$ |
| 14 | | 1 | 1 | — | M · A3 | | $A^{12659}$ | $N_1$ | $N_3$ |
| Y | $N_x$ | | | x | | | I | | |

\* If previous process was not a mock mult.
\*\* If previous two processes were not mock mults.

Reason why:

$N_0$—Initialization.

$N_1$—Mock Square before a real or another Mock Square reveals a repetitive identical process.

$N_2$—First Mult preferably follows at least one-square and precedes two squares.

$N_3$—Next Mults are typically preceded by two squares (pseudo or real) and followed by two squares (pseudo or real).

$I_1$—A mult following a single square reveals a sequence of three ones.

All possibilities are not equiprobable, as the hacker may develop statistical methods to differentiate to limited exactness between dummies and valid procedures. However, in many instances, proper masking typically will make combinations impossible to detect. Generally giving statistical weights to the first and last few bits is less troublesome, and the law of large numbers typically gives the hacker a first estimate on the number of ones and zeroes in an exponent.

In the following, $ denotes an undetectable dummy square, S denotes a valid squaring procedure and $A^x$ denotes a multiply, which can be by either $A^3$ or A, each with approximately the same prevalence. Note the seven strings that produce the same perception of a sequence of S/$ and $A^x$; assuming that the hacker cannot differentiate between a valid square, S, and a mock square, $, and also cannot differentiate between A and $A^3$.

computational masking. In such cases, preferably, the entire sequence may be hidden, as the key lengths for cost effectiveness are preferably smaller. In Elliptic Curve computations, addition and doubling are very different operations, "timewise" and in the use of MAP resources. However, as in a working system, the modulus and the point of origin $P_0$ are universal constants, and the points added are the same for all users. The secret sequence is typically arbitrary, and is generally set by security considerations. Generally from 80 bits long to 100 bits long, depending on the security necessary in a given device; e.g., a smart card might have an 80 significant bit secret exponent, where a bank or credit card, may have 100 to 120 bit secret exponents. If this sequence could be successfully masked, and if it were perfectly random, save for the MS bit, a hacker typically needs an average of $2^{79}$ to $2^{99}$ exhaustive search trials, to establish the secret sequence.

As the point of origin is always the same, and as the key lengths are smaller than in RSA, in a preferred embodiment the values of the first fifteen points on the curve (1·P0, 2·P0, 3·P0, . . . , 14·P0, 15·P0) are stored in easily accessed, nonsecret nonvolatile memory, programmed on the cryptocomputer chip during manufacture or issuance.

For elliptic curve computation in preferred embodiments, points are defined with three-dimensional coordinates; consequently, ten or more variables are stored in sub-divided MAP data registers. When executing elliptic curve computations, the many step point additions and many step squarings can easily be mocked, as mock results can be trashed in unused register segments, without modifying valid temporary results.

```
0  111101   0       0  11101   0        0  010101   0
S  SSAxSSAxSSAx  S     S  SSAxS$AxSSAx  S    S  SSAxSSAxSSAx  S 0  10101   0        0  110101   0       0  11111   0
S  S$AxSSAxSSAx  S     S  SSAxSSAxSSAx  S     S  SSAxSSAxS$Ax  S 0  111111   0
S  SSAxSSAxSSAx  S
```

Figure 16:
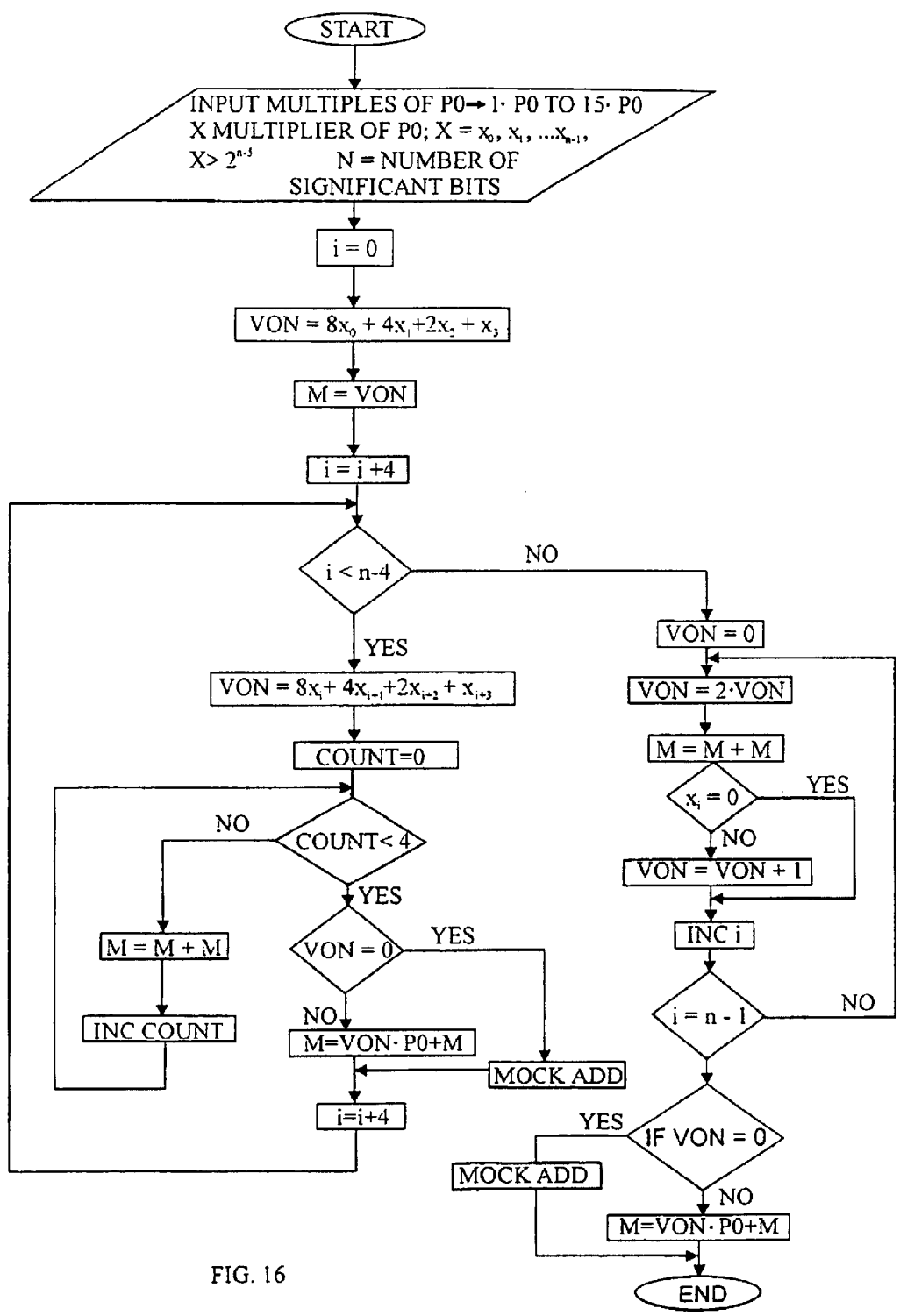
FIG. 16 is a simplified flow chart illustrating a preferred method for systematic sequencing of elliptic curve point additions implemented with regular insertions of additions of simple multiples of the point of origin, thereby masking the secret scalar multiplication string while accelerating a point multiplication sequence.

A preferred method for masking and accelerating point multiplication sequences illustrated in FIG. 16 is now described:

In Elliptic Curve Cryptosystems (ECC), wherein the key lengths are considerably smaller, the sequences of point addition and point doubling, pose a different problem of In this sequence, it is assumed that the adversary knows that a point addition is being performed, but that he cannot detect which of the fifteen points is being added into the sequence or if the mock value addition result is subsequently being trashed.

Using the fifteen points stored in memory for point additions, reduces the number of point additions in a scalar point multiplication by about 46%.

The following example, following the flow chart in FIG. 16, demonstrates multiplying the elliptic curve point $P_0$ by the binary scalar x. Point doubling is performed at each index step, i, point addition (or mock point addition for binary 0 0 0 0) is performed at every fourth indexed step.
x=1 1 0 0 0 1 0 1 1 1 0 $1_2$=\$c 5 d=$3165_{10}$
i=0 1 2 3 4 5 6 7 8 9 10 11 index

| I= | X= | Process | Temp Value | Remarks |
|---|---|---|---|---|
| 0 | 1 | — | | |
| 1 | 1 | — | | |
| 2 | 0 | — | | |
| 3 | 0 | Add 12 · $P_0$ (1100) | 12 · $P_0$ | Value at $4^{th}$ bit |
| 4 | 0 | Point Double | 24 · $P_0$ | |
| 5 | 1 | Point Double | 48 · $P_0$ | |
| 6 | 0 | Point Double | 96 · $P_0$ | |
| 7 | 1 | Point Double | 192 · $P_0$ | |
| 7 | — | Add 5 · $P_0$ (0101) | 197 · $P_0$ | Value at $8^{th}$ bit |
| 8 | 1 | Point Double | 394 · $P_0$ | |
| 9 | 1 | Point Double | 788 · $P_0$ | |
| 10 | 0 | Point Double | 1576 · $P_0$ | |
| 11 | 1 | Point Double | 3152 · $P_0$ | |
| 11 | — | Add 13 · $P_0$ (1101) | 3165 · $P_0$ | Value at $12^{th}$ bit |

If at steps, i=7, or i=11, the four bit nibbles are equal to zero (0000), a mock addition is typically performed.

During the above sequence method of scalar point multiplication, every fourth point doubling is followed by a point addition, or a mock point addition. Addition chains are cost effective in accelerating and security masking for discrete log cryptographic methods, where a single exponential base, defined here as α, is used by all members of the system. Here, all powers of this exponential base, from α up to α to the power $2^y-1$, are stored in non-volatile memory. y is the number of squares formed prior to a multiplication by either $\alpha^0=1$ or one of the stored powers.

An example of a masking addition chain follows where a is the exponential base X is the exponent.
x=0 1 1 0 0 0 1 0 1 1 1 0 0 0 0 0=$62e0_{16}$=$25312_{10}$
i=0 1 2 3 4 5 6 7 8 9 10 11 112 13 14 15

| I= | X= | Process | Temp Value | Remarks |
|---|---|---|---|---|
| 0 | 0 | — | $\alpha^0 = 1$ | |
| 1 | 1 | — | $\alpha^0$ | |
| 2 | 1 | — | $\alpha^0$ | |
| 3 | 0 | — | $\alpha^0$ | |
| 3 | — | Mult $\alpha^6 \cdot \alpha^0$ | $\alpha^6$ | Value at $4^{th}$ bit |
| 4 | 0 | Square $\alpha^6$ | $\alpha^{12}$ | |
| 5 | 0 | Square $\alpha^{12}$ | $\alpha^{24}$ | |
| 6 | 1 | Square $\alpha^{24}$ | $\alpha^{48}$ | |
| 7 | 0 | Square $\alpha^{48}$ | $\alpha^{96}$ | |
| 7 | — | Mult $\alpha^2 \cdot \alpha^{96}$ | $\alpha^{98}$ | Value at $8^{th}$ bit |
| 8 | 0 | Square $\alpha^{98}$ | $\alpha^{196}$ | |
| 9 | 0 | Square $\alpha^{196}$ | $\alpha^{392}$ | |
| 10 | 1 | Square $\alpha^{392}$ | $\alpha^{784}$ | |
| 11 | 0 | Square $\alpha^{784}$ | $\alpha^{1568}$ | |
| 11 | — | Mult $\alpha^{14} \cdot \alpha^{1568}$ | $\alpha^{1582}$ | Value at $12^{th}$ bit |
| 12 | 0 | Square $\alpha^{1582}$ | $\alpha^{3164}$ | |
| 13 | 0 | Square $\alpha^{3164}$ | $\alpha^{6328}$ | |
| 14 | 0 | Square $\alpha^{6328}$ | $\alpha^{12656}$ | |
| 15 | 0 | Square $\alpha^{12656}$ | $\alpha^{25312}$ | Value at $16^{th}$ bit |
| 15 | — | Mult $\alpha^0 \cdot \alpha^{25312}$ | $\alpha^{25312}$ | Dummy Mult |

Note: Values in Boldface, e.g., $\alpha^{14}$, are precomputed and stored in non-volatile memory.
In Montgomery arithmetic, all intermediate values are multiples of $2^n$ mod N, and final values are multiplied by 1 mod N, to retrieve from the P field.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

It is appreciated that the software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

What is claimed is:

1. A microelectronic apparatus for performing modular multiplication, squaring and reduction, the apparatus multiplying a multiplicand A by a multiplier B over a modulus N, wherein B is a serial fed multiplier having no more than k bits, multiplicand A comprises no more than k bits, and N comprises no more than k bits, the apparatus comprising:

a first (B) register operative to store the multiplier B;

a modular multiplication device accepting multiplicands each having no more than k bits, the modular multiplication device including a single accumulation device at least k+1 bits long and operative to repeatedly receive a multiplicand and simultaneously output a bit;

a digital logic sensing detector operative to anticipate that a non-zero bit would be about to be output from the single accumulation device and to determine a number of times, Y0, that the modulus N should be added into the single accumulation device so as to force the non-zero bit to zero, the modular multiplication device being operative, during a first phase, to switch multiplicand values, in turn, into the single accumulation device, and to receive, bit by bit, contents of the (B) register and the Y0 value from the digital logic sensing detector, thereby to force the k first output bits of the single accumulation device to zero, the multiplicand values which are to be switched in turn into the accumulation device comprising at least one value but not more than two values selected from the group consisting of the following three values: (a) an all-zero string value; (b) a multiplicand A; and (c) at least a portion of the modulus N; and an output transfer mechanism, operative in a last phase to unload a final modular multiplication result from the accumulation device.

2. Apparatus according to claim 1 for performing interleaved modular multiplication and reduction in a plurality of interleaved iterations, wherein the Y0 value is saved, and wherein the multiplicand values switched in turn into the accumulation device in the first phase comprise at least one value but not more than two values selected from the group consisting of the following three values: (a) an all-zero string value; (b) a multiplicand A; and (c) a k-bit least significant portion of the modulus N;

the apparatus also comprising a second (S) register operative to store a temporary result S from an iteration i for use during a subsequent iteration i+1 and an n-bit third (N) register operative to store the modulus N, wherein n is larger than k;

the modular multiplication device being operative, in a first phase of each iteration, to multiply one of a plurality of k bit slices of multiplicand A, by multiplier B, the modular multiplication device being operative, during a second phase between the first and last phases, to switch into the single accumulation device, in turn, multiplicand values, and to receive multiplier values from the B and N registers, the multiplicand values switched in turn into the accumulation device comprising at least one value but not more than two values selected from the group consisting of the following three values: (a) an all-zero string value; (b) a portion of the multiplicand A; and (c) the Y0 value as saved from the first phase;

the apparatus also comprising a serial addition device operative, during each iteration, to summate the temporary result value S in the second (S) register with the bit output of the accumulation device, thereby to generate a new temporary result for a next in turn iteration.

3. Apparatus according to claim 2, operative to anticipate a Y0 value using the following concurrent one-bit values:

i) a least significant bit of the multiplicand A ANDed to a bit concurrently output from the (B) register;

ii) a least significant carry out bit from the accumulation device;

iii) an "S out" summation bit from a second least significant cell of the accumulation device;

iv) a concurrent bit from the previously computed temporary result; and v) a carry out bit from the serial addition device.

4. Apparatus according to claim 1 wherein the output of the single accumulation device is fed out serially, wherein the digital logic sensing detector is operative to anticipate whether the modulus value (N) is to be added into the single accumulation device.

5. Apparatus as in claim 4 wherein the accumulation device comprises a plurality of cells, wherein k least significant zeroes egress from the modular multiplication device and wherein the apparatus also comprises a logic device which controls the modular multiplication device and which uses the following three quantities to anticipate a next Y0 bit:

i) the least significant bit of multiplicand A ANDed to the bit concurrently output from the (B) register;

ii) a least significant carry-out bit from the accumulation device; and iii) an "S out" summation bit from a second least significant cell of the accumulation device.

6. A method for performing modular multiplication, squaring and reduction, including multiplying a multiplicand A by a multiplier B over a modulus N, wherein B is a serial fed multiplier having no more than k bits, multiplicand A comprises no more than k bits, and N comprises no more than k bits, the method comprising:

storing a multiplier B in a first (B) register;

providing a modular multiplication device accepting multiplicands having no more than k bits, the modular multiplication device including a single accumulation device at least k+1 bits long and operative to repeatedly receive a multiplicand and simultaneously output a bit;

anticipating that a non-zero bit is about to be output from the single accumulation device and determining a number of times, Y0, that the modulus N should be added into the single accumulation device so as to force the non-zero bit to zero, during a first phase, switching into the single accumulation device, in turn, multiplicand values, and receiving, bit by bit, the contents of the (B) register and the Y0 value, thereby to force k first output bits of the single accumulation device to zero, the multiplicand values switched in turn into the accumulation device comprising at least one value but not more than two values selected from the group consisting of the following three values: (a) an all-zero string value; (b) a multiplicand A; and (c) at least a portion of the modulus N; and in a last phase, unloading a final modular multiplication result from the accumulation device.

7. A method according to claim 6 for performing interleaved modular multiplication and reduction in a plurality of interleaved iterations, wherein the Y0 value is saved, and wherein the multiplicand values switched in turn into the accumulation device in the first phase comprise at least one value but not more than two values selected from the group consisting of the following three values: (a) an all-zero string value; (b) a multiplicand A; and (c) a k-bit least significant portion of the modulus N, the method also comprising:

providing a second (S) register operative to store a temporary result S from an iteration for use during a subsequent iteration i+1 and an n-bit third (N) register operative to store the modulus N, wherein n is larger than k;

the modular multiplication device being operative, in the first phase of each iteration, to multiply one of a plurality of slices of multiplicand A by multiplier B, the modular multiplication device being operative, during a second phase between the first and last phases, to switch into the single accumulation device, in turn, multiplicand values, and to receive multiplier values from the (B) and (N) registers, the multiplicand values switched in turn into the accumulation device comprising at least one value but not more than two values selected from the group consisting of the following three values: (a) an all-zero string value; (b) a portion of the multiplicand A; and (c) the Y0 value as saved from the first phase, the method also comprising summating, during each iteration, the temporary result value S from the second (S) register with the bit output of the accumulation device, thereby to generate a new temporary result for a next in turn iteration, and in a last phase, unloading a final modular multiplication result from the accumulation device.

* * * * *